United States Patent
Wang et al.

(10) Patent No.: US 12,492,980 B2
(45) Date of Patent: Dec. 9, 2025

(54) ANTIBODY COMBINATION FOR ONE-STEP SCREENING AND/OR DIAGNOSIS OF CLONAL DISEASES AND RELATED APPLICATION

(71) Applicants: SYNARC RESEARCH LABORATORY (BEIJING) LTD., Beijing (CN); HEBEI YANDA LU DAOPEI HOSPITAL, Langfang (CN)

(72) Inventors: Hui Wang, Beijing (CN); Man Chen, Beijing (CN); Aixian Wang, Beijing (CN); Meiwei Gong, Beijing (CN); Xueying Wu, Beijing (CN); Junyi Zhen, Beijing (CN); Qing Du, Beijing (CN); Ya Guo, Beijing (CN)

(73) Assignees: SYNARC RESEARCH LABORATORY (BEIJING) LTD., Beijing (CN); HEBEI YANDA LU DAOPEI HOSPITAL, Langfang (CN)

( * ) Notice: Subject to any disclaimer, the term of this patent is extended or adjusted under 35 U.S.C. 154(b) by 717 days.

(21) Appl. No.: 17/880,371

(22) Filed: Aug. 3, 2022

(65) Prior Publication Data
US 2023/0074613 A1 Mar. 9, 2023

(30) Foreign Application Priority Data
Aug. 23, 2021 (CN) .......................... 202110965537.1

(51) Int. Cl.
C07K 16/00 (2006.01)
C07K 16/28 (2006.01)
(Continued)

(52) U.S. Cl.
CPC .......... *G01N 15/14* (2013.01); *C07K 16/2803* (2013.01); *C07K 16/2887* (2013.01); *C07K 16/289* (2013.01); *C07K 16/2896* (2013.01)

(58) Field of Classification Search
CPC .......... G01N 15/1459; G01N 2800/60; G01N 2333/70596
See application file for complete search history.

(56) References Cited

U.S. PATENT DOCUMENTS 10,222,376 B2 * 3/2019 Gerber ................. C12Q 1/6886
11,571,457 B2 * 2/2023 van Dongen .... G01N 33/57484
(Continued)

FOREIGN PATENT DOCUMENTS

CN 204142732 U * 2/2015
CN 107422122 12/2017
(Continued)

*Primary Examiner* — Nathan A Bowers

(57) ABSTRACT

Disclosed are an antibody combination for one-step screening and/or diagnosis of clonal diseases and application thereof. The antibody combination includes eight groups of antibodies, and is a set of flow cytometry detection panels for one-step screening and/or diagnosis of clonal diseases, and 5-tube parallel is used for one sample, the first group of antibodies and the second group of antibodies are used for samples in different flow cytometry tubes, the third group of antibodies and the sixth group of antibodies are used for samples in the same flow cytometry tube, the fourth group of antibodies and the seventh group of antibodies are used for samples in the same flow cytometry tube, and the fifth group of antibodies and the eighth group of antibodies are used for samples in the same flow cytometry tube.

10 Claims, 20 Drawing Sheets

(51) Int. Cl.
   *G01N 15/00*    (2024.01)
   *G01N 15/14*    (2006.01)

(56) References Cited

U.S. PATENT DOCUMENTS

| | | | |
|---|---|---|---|
| 2003/0152558 A1* | 8/2003 | Luft | C12N 5/0606 |
| | | | 435/366 |
| 2008/0057505 A1* | 3/2008 | Lin | G01N 33/54346 |
| | | | 435/7.25 |
| 2013/0142787 A1* | 6/2013 | Chang | A61P 37/06 |
| | | | 530/387.3 |
| 2018/0356418 A1 | 12/2018 | Capocasale et al. | |

FOREIGN PATENT DOCUMENTS

| | | |
|---|---|---|
| CN | 207181240 | 4/2018 |
| CN | 109655616 | 4/2019 |
| CN | 109884313 | 6/2019 |
| CN | 112578117 | 3/2021 |
| CN | 112630438 | 4/2021 |
| CN | 112666062 | 4/2021 |
| WO | WO-2016005548 A1 * | 1/2016 |

* cited by examiner

ANTIBODY COMBINATION FOR ONE-STEP SCREENING AND/OR DIAGNOSIS OF CLONAL DISEASES AND RELATED APPLICATION

TECHNICAL FIELD

The present disclosure relates to an antibody combination for one-step screening and/or diagnosis of clonal diseases and related application, which belongs to the technical field of hematological examination.

BACKGROUND

The clonal diseases herein generally refer to a group of diseases related to aberrant cells, which is not only limited to malignant tumors, but also includes uniformly proliferation of some kind of cells caused by chronic infection or genetic abnormalities, or other factors, such as paroxysmal nocturnal hemoglobinuria (PNH), aplastic anemia (AA), pure red AA, rare normal polymorphism, as well as common pre-leukemic lesions, immunodeficiency, or the like. Malignant tumor is one of the important diseases resulting to human death. The total incidence of malignant diseases is more than 0.1%, which including various acute leukemia (AL), lymphoma, metastatic cancer, chronic myeloid neoplasms, and PNH, etc. However, with the prolonged life expectancy and the aging of the population, it is increasing year by year. Although targeted immunotherapy and other treatments are currently available, malignant tumors are still the main diseases causing high mortality. For patients with tumors and other clonal diseases, precise diagnosis is the only way to accurately treatment. In addition, many tumors can be screened early, diagnosed early, and treated early aiming to acquire prolonged survival and even complete response (CR). Therefore, it is urgent to establish a highly sensitive screening and detection technology for malignant tumors and clonal or other related diseases. The clonal or other related diseases include pre-leukemic lesions such as monoclonal B-cell lymphocytosis (MBL) and monoclonal gammopathy of undetermined significance (MGUS), some rare normal human polymorphisms such as FCγ receptor IIIβ gene mutations, and other immune deficiencies, and the incidence of these diseases are higher than that of malignant diseases. The incidence of MBL is 3.5%-17% in people older than 40 years old in Europe and the United States, and 1% of MBL with high white blood cell will progress to chronic lymphocytic leukemia or mature B cell lymphoma every year. The incidence of MGUS is 3% in people older than 50 years old and 5% in people older than 70 years old. The incidence of FCγ receptor IIIβ gene mutation in the population is about 0.1%-0.2%.

Flow cytometry was developed in the 1970s and entered the field of hematological diagnosis at the end of the last century. With the advancement of technology and the corresponding progress in immunology and oncology, the detection field has become wider and wider, at the same time flow cytometry has become an indispensable and important technology in clinical and scientific research. Especially in the diagnosis of malignant tumors, because of its high rapidity, sensitivity, specificity and cost performance, flow cytometry has become the primary detection method for leukemia, lymphoma, metastatic cancer, PNH and other clonal diseases, in many of which are applied as the gold standard, and in some fields even as the exclusive detection method. The early screening of diseases, the health management of pre-leukemic lesions, and the early diagnosis and early treatment of malignant tumors have become the most concerned issues of the whole society with the prolongation of people's life expectancy bring by the continuous emergence of new technologies and the improvement of clinical treatment effect. Flow cytometry detection plays a crucial role in the screening and detection of most tumors and pre-leukemic lesions.

However, the current overall application status of flow cytometry is not ideal. Due to its highly technical difficulty, complicated detection panels, lack of standardization of detection process, excessively manual participation, and difficulty in staff training, these factors are bottlenecks that impede the widespread promotion and application of this technology. In particular, the correct selection of antibodies and high-sensitivity observation are the keys to preventing misdiagnosis, because the essence of flow cytometry is to use antibodies to detect diseases. Therefore, finding a general and efficient detection panel and analysis method is urgent and vital to solve these problems.

In order to figure out the difficulties, researchers have made some explorations, including the panel launched by the Euroflow since 2012, but the euroflow panel still has the following defects. Firstly, it is a two-step method based on the first-step screening, which makes the first-step judgment very important. If the personnel make a mistake in the first-step judgment, it will lead to the error of antibody selection in the second step. Secondly, the first step of the two-step method is relatively simple, and it is impossible to cover all disease screenings, so it is easy to miss diagnosis. Thirdly, the two-step method needs many workloads and may cause individual differences in the panel selection, which is not conducive to the automation of pre-processing, automatic sample loading and other processes, as well as the development of multi-dimensional software analysis such as flowjo and artificial intelligence. Fourthly, the focus is on the diagnosis of common hematological tumors such as acute leukemia and lymphoma. It rarely involves metastatic cancer, and the detection efficiency of rare tumors and pre-leukemic lesions is not high. Fifthly, the vast majority of clinical patients go to the doctor with symptoms such as anemia, leukopenia, and cytopenia. It is difficult to confront such a situation that there is no clinical information, and even other tests cannot provide effective information.

After investigation, until now there is no simpler and more feasible panel that can be applied by flow cytometry to screen majority of clonal diseases (including tumor, AA, pure red AA, rare normal polymorphism, as well as common pre-leukemic lesions, immune deficiency, or the like) by flow cytometry.

SUMMARY

One object of the present disclosure is to provide an antibody combination suitable for screening and/or diagnosing most clonal diseases by a one-step method with or without any clinical information.

Another object of the present disclosure is to provide the application of the antibody combination in screening and/or diagnosing clonal diseases.

The "clonal diseases" in the present disclosure is a group of diseases related to various cell abnormalities that can be detected and prompted by flow cytometry in a broad sense, which is not limited to tumors, but also includes PNH, AA, pure red AA, rare normal polymorphisms, as well as common pre-leukemic lesions, immune deficiencies, or the like.

In an embodiment, the present disclosure provides an antibody combination, including: the first group of antibodies, the second group of antibodies, the third group of antibodies, the fourth group of antibodies, the fifth group of antibodies, the sixth group of antibodies, the seventh group of antibodies and the eighth group of antibodies;

the first group of antibodies includes anti-CD7 antibody, anti-CD117 antibody, anti-CD3 antibody, anti-CD4 antibody, anti-CD5 antibody, anti-CD8 antibody, anti-CD56 antibody, anti-CD45 antibody, and anti-CD2 antibody;

the second group of antibodies includes anti-CD16 antibody, anti-CD117 antibody, anti-CD34 antibody, anti-CD13 antibody, anti-CD33 antibody, anti-HLA-DR antibody, anti-CD11b antibody, and anti-CD45 antibody;

the third group of antibodies includes anti-CD22 antibody, anti-CD34 antibody, anti-CD117 antibody, anti-CD38 antibody, and anti-CD45 antibody;

the fourth group of antibodies includes anti-CD64 antibody, anti-CD34 antibody, anti-CD42a antibody, anti-CD14 antibody, and anti-CD45 antibody;

the fifth group of antibodies includes group A of antibodies and/or group B of antibodies; the group A of antibodies includes anti-CD38 antibody, anti-CD19 antibody, anti-CD10 antibody, anti-CD20 antibody, anti-CD56 antibody, anti-CD45 antibody, and anti-CD5 antibody; the group B of antibodies includes anti-CD34 antibody, anti-CD19 antibody, anti-CD10 antibody, anti-CD20 antibody, anti-CD38 antibody, and anti-CD45 antibody;

the sixth group of antibodies includes anti-nuclear TdT antibody and anti-cytoplasmic CD3 antibody;

the seventh group of antibodies includes anti-cytoplasmic MPO antibody;

the eighth group of antibodies includes anti-cytoplasmic κ antibody and anti-cytoplasmic λ antibody;

the antibody combination is a set of flow cytometry detection panels for one-step screening and/or diagnosis of clonal diseases, and 5-tube parallel is used for one sample, the first group of antibodies and the second group of antibodies are used for the same sample in different tubes, the third and the sixth group of antibodies are used for the same sample in the same tube, the fourth and the seventh group of antibodies are used for the same sample in the same tube, and the fifth and the eighth group of antibodies are used for the same sample in the same tube. In the present disclosure, the group A of antibodies in the fifth group of antibodies are used to detect samples from individuals older than 30 years old, and the group B of antibodies in the fifth group of antibodies are used to detect samples from individuals younger than 30 years old.

The antibody combination of the present disclosure can be applied to one-step screening and/or diagnosis of various clonal diseases by flow cytometry. The clonal diseases for screening and diagnosis can include, malignancies, PNH, AA, pure red AA, pre-leukemic lesions, normal human polymorphisms, immunodeficiencies, and the like. In actual applications, using a 5-tube parallel protocol for one sample, each tube is gated with lineage antibodies or blast and immature cell antibodies in combination with SSC and/or CD45, respectively, and corrected with the relevant marker combinations, which can effectively select cells of various lineages and stages (especially when the proportion of blast/tumor cells is low such as chronic myeloid neoplasms or other diseases), even including rare tumors, pre-leukemic lesions, and normal polymorphisms, thereby improving detection efficiency, forming standardization, reducing the probability of misdiagnosis, and providing convenience for automation and artificial intelligence in the future.

According to some embodiments of the present disclosure, the anti-cytoplasmic κ antibody and the anti-cytoplasmic λ antibody are polyclonal antibodies, and other antibodies are monoclonal antibodies.

According to some embodiments of the present disclosure, each antibody is a fluorescence-labeled antibody. In the first group of antibodies, anti-CD7 antibody, anti-CD117 antibody, anti-CD3 antibody, anti-CD4 antibody, anti-CD5 antibody, anti-CD8 antibody, anti-CD56 antibody, anti-CD45 antibody, and anti-CD2 antibody are labeled with fluorescence in the order of FITC, PE, PerCP-Cy5.5, PE-Cy7, APC, APC-Cy7, BV421, V500, and BV605. In the second group of antibodies, anti-CD16 antibody, anti-CD117 antibody, anti-CD34 antibody, anti-CD13 antibody, anti-CD33 antibody, anti-HLA-DR antibody, anti-CD11b antibody, and anti-CD45 antibody are labeled with fluorescence in the order of FITC, PE, PerCP-Cy5.5, PE-Cy7, APC, APC-Cy7, BV421, and V500. In the third group of antibodies, anti-CD22, anti-CD34, anti-CD117, anti-CD38, and anti-CD45 antibodies are labeled with fluorescence in the order of PE, PerCP-Cy5.5, PE-Cy7, BV421, and V500. In the fourth group of antibodies, anti-CD64 antibody, anti-CD34 antibody, anti-CD42a antibody, anti-CD14 antibody, and anti-CD45 antibody are labeled with fluorescence in the order of PE, PerCP-Cy5.5, APC, APC-Cy7, and V500. In the fifth group of antibodies, anti-CD38 antibody, anti-CD19 antibody, anti-CD10 antibody, anti-CD20 antibody, anti-CD56 antibody, anti-CD45 antibody, and anti-CD5 antibody in the group A of antibodies are labeled with fluorescence in the order of PerCP-Cy5.5, PE-Cy7, APC, APC-Cy7, BV421, V500, and BV605; anti-CD34 antibody, anti-CD19 antibody, anti-CD10 antibody, anti-CD20 antibody, anti-CD38 antibody, and anti-CD45 antibody in the group B of antibodies are labeled with fluorescence in the order of PerCP-Cy5.5, PE-Cy7, APC, APC-Cy7, BV421, and V500. In the sixth group of antibodies, anti-nuclear TdT antibody and anti-cytoplasmic CD3 antibody are labeled with fluorescence in the order of FITC and APC. In the seventh group of antibodies, anti-cytoplasmic MPO antibody is labeled with fluorescence FITC. In the eighth group of antibodies, anti-cytoplasmic κ antibody and anti-cytoplasmic λ antibody are labeled with fluorescence in the order of FITC and PE. In the present disclosure, different antibodies are labeled with specific fluorescence, when the antibody combination of the present disclosure is applied to one-step screening and/or diagnosis of clonal diseases, all fluorescences in each channel can achieve excellent staining effect.

According to some embodiments of the present disclosure, each antibody component is commercially available. Each antibody should meet the requirements of relevant industry standards.

According to some embodiments of the present disclosure, the first group of antibodies is a mixture of anti-CD7 antibody, anti-CD117 antibody, anti-CD3 antibody, anti-CD4 antibody, anti-CD5 antibody, anti-CD8 antibody, anti-CD56 antibody, anti-CD45 antibody, and anti-CD2 antibody in a volume ratio of 5:5:5:3:2:3:3:3:3. The second group of antibodies is a mixture of anti-CD16 antibody, anti-CD117 antibody, anti-CD34 antibody, anti-CD13 antibody, anti-CD33 antibody, anti-HLA-DR antibody, anti-CD11b antibody, and anti-CD45 antibody in a volume ratio of 5:5:5:3:2:3:3:3. The third group of antibodies is a mixture of anti-CD22 antibody, anti-CD34 antibody, anti-CD117 antibody, anti-CD38 antibody, and anti-CD45 antibody in a volume ratio of 5:5:3:3:3. The fourth group of antibodies is a mixture of anti-CD64 antibody, anti-CD34 antibody, anti-CD42a antibody, anti-CD14 antibody, and anti-CD45 antibody in a volume ratio of 5:5:2:3:3. In the fifth group of antibodies, the group A of antibodies is a mixture of anti-CD38 antibody, anti-CD19 antibody, anti-CD10 antibody, anti-CD20 antibody, anti-CD56 antibody, anti-CD45 antibody and anti-CD5 antibody in a volume ratio of 5:3:2:3:3:3:3; the group B of antibodies is a mixture of anti-CD34 antibody, anti-CD19 antibody, anti-CD10 antibody, anti-CD20 antibody, anti-CD38 antibody, and anti-CD45 antibody in a volume ratio of 5:3:2:3:3:3. The sixth group of antibodies is a mixture of anti-nuclear TdT antibody and anti-cytoplasmic CD3 antibody in a volume ratio of 2:2. The eighth group of antibodies is a mixture of anti-cytoplasmic κ antibody and anti-cytoplasmic λ antibody in a volume ratio of 2:2. The mixing ratio of each antibody refers to the value under the condition that the titers are basically equivalent.

The present disclosure further provides a kit, including the first container, the second container, the third container, the fourth container, the fifth container, the sixth container, the seventh container and the eighth container, each container respectively contains the first group of antibodies, the second group of antibodies, the third group of antibodies, the fourth group of antibodies, the fifth group of antibodies, the sixth group of antibodies, the seventh group of antibodies and the eighth group of antibodies of the antibody combination of the present disclosure. In the present disclosure, when the fifth group of antibodies includes the group A of antibodies and the group B of antibodies, the group A of antibodies and the group B of antibodies are accommodated in different fifth containers, respectively.

According to some embodiments of the present disclosure, the kit of the present disclosure can further include one or more of accessories used in flow cytometer test, such as, lysing agent, fix & perm solution, buffer, and tubes. These reagents and consumables are commercially available. The fix & perm solution is a kind of permeabilization reagent used for intracellular stain including permeabilization reagent α and permeabilization reagent β. Different reagent materials are accommodated in different containers.

The kit of the present disclosure can be used for one-step screening and/or diagnosis of clonal diseases, including most malignant tumors, PNH, AA, pure red AA, pre-leukemic lesions, immunodeficiency, normal human polymorphism and other clonal diseases.

Another aspect of the present disclosure further provides an application of the antibody combination as described above in a preparation of a sample on the flow cytometer for one-step screening and/or diagnosis of clonal diseases. The clonal diseases include most malignant tumors, PNH, AA, pure red AA, pre-leukemic lesions, immunodeficiency, normal human polymorphism and the like.

According to some embodiments of the present disclosure, preparing the sample on the flow cytometer for one-step screening and/or diagnosing clonal diseases includes the following steps:

step 1: adding samples to be tested to five flow cytometry tubes of tube I, tube II, tube III, tube IV, and tube V, respectively, making them into a single cell suspension, and ensuring the number of cells is $1\times10^6$ to $1\times10^7$ cells per tube;

step 2: adding phosphate buffer to tube IV and tube V, mixing well, incubating at 37° C., and removing supernatant by centrifugation;

step 3: adding the first group of antibodies in the antibody combination as described above to the tube I obtained in step 1, adding the second group of antibodies in the antibody combination as described above to the tube II obtained in step 1, adding the third group of antibodies in the antibody combination as described above to the tube III obtained in step 1, adding the fourth group of antibodies in the antibody combination as described above to the tube IV obtained in step 2, adding the group A or group B of antibodies in the fifth group of antibodies in the antibody combination as described above to the tube V obtained in step 2, and incubating each flow tube in dark at room temperature;

step 4: adding permeabilization reagent α to the tube III, the tube IV, and the tube V after incubation in step 3, and continuing to incubate in dark at room temperature;

step 5: adding 1×lysing agent to the tube I and the tube II after incubation in step 3, adding 1×lysing agent to the tube III, the tube IV, and the tube V after incubation in step 4, and continuing to incubate in dark at room temperature;

step 6: centrifuging each flow tube after incubated in step 5 and removing the supernatant;

step 7: adding permeabilization reagent β and the sixth group of antibodies in the antibody combination as described above to the tube III after removing the supernatant in step 6, adding the permeabilization reagent β and the seventh group of antibodies in the antibody combination as described above to the tube IV after removing the supernatant in step 6, adding the permeabilization reagent β and the eighth group of antibodies in the antibody combination as described above to the tube V after removing the supernatant in step 6, and incubating in dark at room temperature; and step 8: adding PBS buffer to the tube I and the tube II after removing the supernatant in step 6, and adding PBS buffer to the tube III, the tube IV, and the tube V after incubation in step 7, removing the supernatant after centrifugation, resuspending cells in PBS buffer to obtain the sample on the flow cytometer.

In the present disclosure, for the description of the operation steps, unless it is specifically noted or it can be clearly determined from the context of the description that there is a sequence relationship, the sequence of the description is not used to limit the sequence of the actual operations of these steps.

According to some embodiments of the present disclosure, the sample to be tested can be bone marrow or peripheral blood, and can also be used for tissue samples, body fluid samples and other samples that can prepare single live cells and are suitable for flow cytometry detection.

According to some embodiments of the present disclosure, in step 1, the volume of the sample in each tube should not exceed 160 μl (If the number of peripheral blood cells in patients is so low that the volume needed is more than 160 μl, then a step of centrifugation and concentration is added before the step 1).

According to some embodiments of the present disclosure, the dosage of each reagent can refer to the conventional dosage in the filed or the dosage recommended by the merchant.

According to some embodiments of the present disclosure, the amount of the first group of antibodies is 16-64 μl/tube, the amount of the second group of antibodies is 15-60 μl/tube, the amount of the third group of antibodies is 10-40 μl/tube, the amount of the fourth group of antibodies is 9-36 μl/tube, the amount of the fifth group of antibodies is 11-44 μl/tube, the amount of the sixth group of antibodies is 2-8 µl/tube, the amount of the seventh group of antibodies is 3-10 µl/tube, and the amount of the eighth group of antibodies is 2-8 µl/tube.

According to some embodiments of the present disclosure, the operation of the above step 2 can be selectively repeated one or more times as required. According to some embodiments of the present disclosure, the amount of PBS added each time is 2-3 ml/tube, and the centrifugation conditions may be 1000-2000 rpm (or 300-450 g) for 5 minutes.

According to some embodiments of the present disclosure, the incubation time in step 2 may be 5-30 minutes.

According to some embodiments of the present disclosure, the incubation time in step 3 may be 10-30 minutes.

According to some embodiments of the present disclosure, in step 4, the incubation time may be 5-20 minutes. The amount of permeabilization reagent α can be added according to the recommended dose of the manufacturer, usually 100 µl/tube.

According to some embodiments of the present disclosure, in step 5, the incubation time may be 5-30 minutes. The amount of 1×lysing agent added is 2-3 ml/tube.

According to some embodiments of the present disclosure, in step 6, the incubation time is about 10-30 minutes. The centrifugation conditions may be 1000-2000 rpm (or 300-450 g) for 5 minutes.

According to some embodiments of the present disclosure, in step 7, the amount of permeabilization reagent β can be added according to the recommended dose of the manufacturer, usually 50 µl/tube.

According to some embodiments of the present disclosure, in step 8, the amount of PBS buffer added for washing is 2-3 ml/tube. The centrifugation conditions may be 1000-2000 rpm (or 300-450 g) for 5 minutes. The amount of PBS buffer for resuspension is 0.5-1 ml/tube.

According to some embodiments of the present disclosure, when resuspending cells for flow cytometry detection, in the tube I the different gate is set by two parameters of CD45/SSC, CD117/SSC, CD4/SSC, CD56/SSC, CD7/CD45, CD56/CD45, CD5/CD45, respectively; in the tube II the different gate is set by two parameters of CD45/SSC, CD117/SSC, CD34/SSC, HLA-DR/CD45, respectively; in the tube III the different gate is set by two parameters of CD45/SSC, TdT/SSC, CD22/SSC, CD34/SSC, CD117/SSC, CD38/SSC, cCD3/CD45, respectively; in the tube IV the different gate is set by two parameters of CD45/SSC, CD34/SSC, CD42a/CD45, respectively; in the tube V the different gate is set by two parameters of CD45/SSC, CD19/SSC, CD20/SSC, CD38/SSC, CD56/CD45, respectively (for the patients younger than 30 years old, in the tube V the different gate is set by two parameters of CD45/SSC, CD19/SSC, CD20/SSC, CD34/SSC, CD38/SSC, respectively). By these gating methods, almost all kinds of cells can be highlighted and analyzed, including blasts, myeloblasts, B cells, mature lymphocytes, plasma cells, maturing granulocytes, monocytes, CD42a positive platelets or megakaryocytes, and CD45dim or −/CD56+ cells, which may be metastatic cancer cells, malignant plasma cells, blastic plasmacytoid dendritic cells (BPDC), malignant megakaryoblasts, other leukemias or lymphomas, etc.

In another aspect, the present disclosure provides a device for one-step screening and/or diagnosis of clonal diseases, including a detection unit and an analysis unit, wherein:

the detection unit includes a set of reagents to detect different cells from an individual sample by flow cytometry, and obtain the data; the reagents are the antibody combinations of the present disclosure;

the analysis unit is the protocols to analyze the data obtained by the detection unit.

According to some embodiments of the present disclosure, the application process of the detection unit includes: using the antibody combination of the present disclosure to process the samples waiting for examination, prepare the cells for being acquired by flow cytometer, and perform flow cytometry detection. The analysis process of the analysis unit includes: analyzing the detection results to diagnose (including assist in diagnose) most malignant tumors, clonal diseases, pre-leukemic lesions, immunodeficiency and/or normal human polymorphisms and the like.

According to some embodiments of the present disclosure, when the device of the present disclosure is used for one-step screening and/or diagnosis of clonal diseases, the gating analysis of each flow tube can be performed according to the following operations:

when performing flow cytometry detection, gating the tube I according to the following methods: setting the single cell (nonadherent) gate P1 and the live cell gate P2 to obtain all single live cells; using CD45/SSC to set each blood cell gate (including eosinophils) in the P2 gate; in the P2 gate, gating with CD117/SSC to detect immature myeloid, and gating with CD117 strong expression (str)/SSC to detect mast cells, setting lymphocyte gate with CD45/SSC to observe expression patterns formed by CD2/CD7, CD4/CD3, CD4/CD8, and CD3/CD5 in it to detect T cells, CD3/CD56, CD4/CD8, CD2/CD7, and CD3/CD5 in it to detect NK cells, gating with SSC medium/CD4dim to detect dendritic cells and monocytes, gating with CD45dim or −/CD56+ to detect metastatic carcinoma, plasma cell neoplasm (PCN), blastic plasmacytoid dendritic cell neoplasm (BPDCN), acute leukemia (AL), or chronic lymphoproliferative disorders (CLPD);

when performing flow cytometry detection, gating the tube II according to the following methods: setting the single cell (nonadherent) gate P1 and the live cell gate P2 to obtain the single live cells; using CD45/SSC to set each blood cell gate in the P2 gate; in the P2 gate, gating with CD117/SSC to detect immature myeloid, gating with CD117 strong expression/SSC to detect mast cells, and gating with CD34/SSC and HLA-DR/CD45 to detect blasts, gating with CD45/SSC to detect granulocytes in differentiation stage, and gating with CD45/SSC and correction with HLA-DR/CD45 and CD11b/HLA-DR to detect monocytes;

when performing flow cytometry detection, gating the tube III according to the following methods: setting the single cell gate P1 and the live cell gate P2 in sequence, and in the P2 gate, using CD45/SSC to set each blood cell gate; in the P2 gate, gating with CD117/SSC to detect immature myeloid, gating with CD117 strong expression/SSC to detect mast cells; gating with CD34/SSC to detect blasts; gating with TdT/SSC to detect lymphoblasts; gating with CD22/SSC to detect B cells; using CD45/cCD3 to modify the lymphocyte gate set by CD45/SSC to detect T cells;

when performing flow cytometry detection, gating the tube IV according to the following methods: setting the single cell gate P1 and the live cell gate P2 in sequence, and in the P2 gate, using CD45/SSC to set each blood cell gate, gating with CD42a/CD45 to observe platelets/megakaryocytes, and gating with CD34/SSC to observe blasts;

when performing flow cytometry detection, gating the tube V according to the following methods:

the tube V stained with antibodies of group A: setting the single cell gate P1 and the live cell gate P2 to obtain the single live cells; using CD45/SSC to set each blood cell gate in the P2 gate; in the P2 gate, gating with CD19/SSC to detect B cells (including all stages of B cells); gating with CD20/SSC to detect mature B cells; gating with CD38bri/SSC and/or CD38bri/CD45dim to detect plasma cells; gating with CD45dim or –/CD56+ to detect metastatic carcinomas, plasma cell neoplasm (PCN), blastic plasmacytoid dendritic cell neoplasm (BPDCN), acute leukemia (AL) and chronic lymphoproliferative disorders (CLPD) cells; or the tube V stained with antibodies of group B: setting the single cell gate P1 and the live cell gate P2 to obtain the single live cells; using CD45/SSC to set each blood cell gate in the P2 gate; in the P2 gate, gating with CD19/SSC to detect B cells (including all stages of B cells); gating with CD20/SSC to detect mature B cells; gating with CD38bri/SSC and/or CD38bri/CD45dim to detect plasma cells; gating with CD34/SSC to detect blasts.

According to some embodiments of the present disclosure, the analysis unit may further include a module for further determining the disease according to the gated analysis and detection results (the judgment according to the present disclosure includes screening, assist diagnosis, and diagnosis). In the present disclosure, by combined multi-marker gating methods, the displayed groups of cells are compared with the corresponding normal cells to find out tumor cells, or clonal diseases such as PNH, and pre-leukemic lesions such as MBL and MGUS. When the proportion of blasts and granulocytes and/or nucleated erythrocytes are significantly decreased, a diagnosis of AA or pure red AA is suggested; when the percentage of more than one lymphocyte subsets are abnormal, immunodeficiency is the suspicious diagnosis; complete loss of CD16 in mature granulocytes suggests a normal human polymorphism of FCγ receptor IIIβ gene mutation. Specifically, the present disclosure can be used to rapidly and comprehensively screen/diagnose almost all clonal diseases and other abnormalities in one step, such as: 1. acute leukemia (AL), including: B cell-acute lymphoblastic leukemia/lymphoblastic lymphoma (ALL/LBL), T-ALL/LBL, acute myeloid leukemia (AML), blastic plasmacytoid dendritic cell neoplasm (BPDCN), and acute leukemia of ambiguous lineage (ALAL), which mainly including: mixed phenotype acute leukemia (MPAL), acute undifferentiated leukemia (AUL) and acute leukemia of ambiguous lineage, not otherwise specified (ALAL, NOS); 2. various mature lymphocytic tumors, such as B cells chronic lymphoproliferative disorders (CLPD), T-CLPD, NK-CLPD, and plasma cell neoplasm (PCN); 3. chronic myeloid neoplasms, including: myelodysplastic syndrome (MDS), myeloproliferative neoplasms (MPN), MDS/MPN, mastocytosis, eosinophilia-related diseases, or the like; 4. paroxysmal nocturnal hemoglobinuria (PNH); 5. various solid tumors circulate to bone marrow and/or peripheral blood, including solid tumors of epithelial and neuromuscular origin; 6. Pre-leukemia lesions such as monoclonal B-cell lymphocytosis (MBL) and monoclonal gammopathy of undetermined significance (MGUS); 7. certain rare normal human polymorphisms such as FCγ receptor IIIβ gene mutation; 8. aplastic anemia (AA), including pure red blood cell AA; 9. abnormal immune cell subsets, including primary immunodeficiency diseases (PIDs) or abnormal immune cell subsets caused by therapies, infections, or the like.

According to some embodiments of the present disclosure, when analyzing the five-tubes' results from one sample, for each tube some universal blood cell gates set by CD45/SSC are used to initially screen whether the percentages of each group of cells (mature lymphocytes, monocytes, maturing granulocytes, and nucleated red blood cells) are in normal ranges comparing to normal specimens, whether there is a large group of tumor cells, if yes then further combined with other markers in each tube to judge their character. Specifically, the diagnosis of various diseases can be carried out in the following ways:

(1) Judgment of acute leukemia: The CD45/SSC gated images in each tube of normal specimens are mainly composed of lymphocyte gate (lym), monocyte gate (mono), granulocyte gate (gra), and nucleated erythrocyte gate (NEC). A small area of CD45dim/SSClow (blast hole) is surrounded by these cells like a question mark, but in acute leukemia, an obvious group of cells appears in this position, with a percentage of no less than 20%. At this point, the following judgments are made further according to the situation:

① AML: Tube I, tube II, tube III, and tube IV are the key to diagnosing these diseases. A group of obvious tumor cells are detected by CD117/SSC gate in the tube I, with a proportion of no less than 20%. This group of cells is located in the blast hole on the CD45/SSC dot plot, and does not express the T lineage markers CD3 and CD8, but may aberrant express one or two of CD7, CD56, CD4, CD2, and CD5. Tube II can detect the same group of tumor cells seen in tube I in CD117/SSC, CD34/SSC, HLA-DR/CD45, CD45/SSC gate, and express early markers CD34, CD117, and HLA-DR, and myeloid markers CD13 and CD33. Tube III can detect the same group of tumor cells as tubes I and II when gated on CD117/SSC, CD34/SSC and CD45/SSC, expressing early markers CD34, CD117, and CD38, not expressing specific T lineage markers cCD3 and B lineage markers CD22. The same group of tumor cells as the previous tubes can be detected in the CD34/SSC and CD45/SSC gates of the tube IV, and most subtypes express MPO and/or CD64. In group A of tube V (older than 30 years old) CD45/SSC gate can detect the same group of tumor cells as the previous tubes, expression of CD38 (CD38 is strongly expressed by plasma cells, intermediately expressed by immature cells or aggressive B cell lymphoma), but does not express mature B-lineage markers CD20, cκ, and cλ. In group B of tube V (younger than 30 years old) CD45/SSC and CD34/SSC gate can see the same group of tumor cells as in previous tubes. Tumor cells express the early marker CD38, but do not express the mature B lineage markers CD20, cκ and cλ.

② B-ALL: Tube III and tube V are the key to screening/diagnosing these diseases. A group of tumor cells with the proportion of no less than 20% appears in the blast hole of CD45/SSC in the tube I, and this group of tumor cells does not express all other markers of the tube I. CD34/SSC, HLA-DR/CD45, and CD45/SSC gates in tube II detect the same group of tumor cells as tube I, and do not express the myeloid markers CD117, CD16, and CD11b. CD45/SSC, CD34/SSC, TdT/SSC, CD22/SSC in tube III can detect a group of obvious tumor cells, which are the same detected in tube I and tube II, expressing the B cell marker CD22 and early markers CD34, CD38 and/or TdT, but not expressing the specific T lineage marker cCD3 and myeloid marker CD117. Tube IV does not express specific myeloid markers MPO, CD64, CD14 and CD42a except that CD45/SSC and CD34/SSC detects the same group of blasts as the previous three tubes. CD45/SSC and CD19/SSC gate in group A of tube V (older than 30 years old) can detect the same group of tumor cells as the first four tubes. CD45/SSC, CD19/SSC, CD34/SSC gate in group B of tube V (younger than 30 years old) can detect the same group of tumor cells as previous four tubes, and in most cases they express CD10 not mature B lineage markers cκ or cλ.

③ T-ALL: Tube I and tube III are the key to screening/diagnosing these diseases. In tube I, a group of tumor cells can be detected by CD45dim/SSClow (blast hole), CD45dim/CD7 and CD45dim/CD5, with a proportion of more than 20%. The CD45/SSC gate in tube II detects the same group of tumor cells as tube I, and does not express the myeloid markers CD16 and CD11b. A group of obvious tumor cells can be detected in CD45/SSC, cCD3/SSC, TdT/SSC in tube III with CD45dim, cCD3 and TdT positive, which are the same group of cells detected in tube I and tube II, expressing the early marker CD38, but not expressing the specific B lineage marker CD22. The same group of blasts as the previous three tubes can be detected by CD45/SSC in tube IV, they does not express specific myeloid markers MPO, CD64, CD14 and CD42a. The same group of tumor cells as the previous four tubes could be detected in the blast hole of CD45/SSC in group A of tube V (older than 30 years old) and group B of tube V (younger than 30 years old).

④ ALAL: Find tumor cells according to the above methods, make sure the expressions of markers, and diagnose according to Proposals for the immunological classification of acute leukemias. European Group for the Immunological Characterization of Leukemias (EGIL) (1995) and WHO Classification of Tumours of Haematopoietic and Lymphoid Tissues (2008/2017). If the lineage markers are over-expressed and the MPAL criteria are met, MPAL is considered. If only one or less of the unspecific lineage markers are expressed, consider AUL; cases that do not meet AUL or MPAL will be diagnose acute unclassifiable leukemia.

⑤ B-LBL is similar to B-ALL, T-LBL is similar to T-ALL, the difference is that the proportion of bone marrow tumor cells is less than 20%.

⑥ BPDCN: Tube I, tube II, and group A of tube V are the key to diagnosing these diseases. CD45dim or –/CD56+ gate in tube I and group A of tube V will detect tumor cells. The same group of tumor cells can also be found in the CD4/SSC dot plot of tube I and CD45dim/HLA-DR of tube II. Tumor cells can be detected in the CD45/SSC blast wells of each tube, and the tumor cells express CD4dim, CD56, and HLA-DR.

⑦ Acute megakaryoblastic leukemia (AML-M7): Tube IV is the key to screening/diagnosing such diseases. Tumor cells are found in CD45/CD42a in the tube IV. Unlike platelets, the FSC of tumor cells are larger than that of lymphocytes. In FSC/SSC dot plots tumor cells form a group with a center, and tumor cells can be detected in the blast hole of CD45/SSC dot plots in each tube.

(2) Diagnosis of lymphoma: Lymphoma is divided into high proportion and low proportion. Most of the cases involving bone marrow are low proportion. Specifically, they can be determined by referring to the following methods:

① B-CLPD: Tube V is the key to screening/diagnosing these diseases. In tube I, B-CLPD with a high proportion of tumor cells will have an enlarged lymphocyte gate in CD45/SSC dot plot. In it the proportion of T and NK cells may decrease, which expressing CD3, CD2, CD7, CD4, CD8, and CD56 in the CD2/CD7, CD3/CD5, CD4/CD8, CD4/CD3, CD3/CD56 dot plots, suggesting that there is a group of mature lymphocytes that do not express T and NK markers. In tube II, B-CLPD with a high proportion of tumor cells will have the same enlarged lymphocytes gate in CD45/SSC dot plot as in tube I. In tube III, B-CLPD with a high proportion of tumor cells will have the same enlarged lymphocyte gate in CD45/SSC dot plot as tube I and tube II, and obvious tumor cell populations can be seen in CD22/SSC gate, not expressing the myeloid marker CD117, the T-lineage marker cCD3, and the early markers CD34, TdT, and CD38 (unless there is small B lymphoma with plasma cell differentiation or aggressive B cell lymphoma such as Burkitt lymphoma/leukemia or diffuse large B cell lymphoma). In tube V, B-CLPD with a high proportion of tumor cells will have the same enlarged lymphocyte gate in CD45/SSC dot plot as the previous tubes. In group A of tube V (older than 30 years old), tumor cells can be observed by CD19/SSC and CD20/SSC gates (the reason for double gating is to prevent misdiagnosis because in about 5% of B-CLPD cases the malignant cells are negative for one of these B markers, and the proportion is as high as 13% to 100% after CD19 and CD20 targeted immunotherapy). Depending on the subtype, CD5 (chronic lymphocytic leukemia, mantle cell lymphoma, or other CD5+ small B cell lymphoma or diffuse large B cell lymphoma), CD10 (follicular lymphoma, Burkitt lymphoma, or CD10+ diffuse large B cell lymphoma), CD38 (small B lymphoma with plasma cell differentiation or aggressive B cell lymphoma, such as Burkitt lymphoma or diffuse large B cell lymphoma), or none (other B-cell lymphomas) are expressed, respectively. cκ or cλ is monoclonally expressed, or neither is expressed. The NK lineage marker CD56 is not expressed. In group B of tube V (younger than 30 years old), tumor cells can be observed by CD19/SSC and CD20/SSC gates (the reason for double gating is to prevent misdiagnosis because in about 5% of B-CLPD cases the malignant cells are negative for one of these B markers, and the proportion is as high as 13% to 100% after CD19 and CD20 targeted immunotherapy). Depending on the subtype, CD10 (follicular lymphoma, Burkitt lymphoma, or CD10+ diffuse large B cell lymphoma), CD38 (small B lymphoma with plasma cell differentiation or aggressive B cell lymphoma sch as Burkitt lymphoma or diffuse large B cell lymphoma), or none (other B-cell lymphomas) are expressed, respectively. cκ or cλ is monoclonally expressed, or neither is expressed. The blast marker CD34 is negative.

② PCN: Tube V is the key to screening/diagnosing these diseases. Plasma cells can be detected by CD38bri/SSC and/or CD45dim gate in tube III. Group A of tube V (older than 30 years old) is the focus of the diagnosis of plasma cell neoplasms. Plasma cells can be detected by CD38bri/SSC and/or CD45dim gate, most of which express CD56 abnormally, and CD45/CD56 gate will detect the same population of tumor cells. Normal plasma cells express CD19, CD45, but not express CD56, since they are polyclonal, the ratio of cκ/cλ is between 0.5 and 2. Malignant plasma cells often do not express CD19 and CD45, abnormally express CD56, cκ or cλ is monoclonally expressed, or neither is expressed, and a few cases abnormally acquire CD20.

③ T-CLPD: Tube I is the key to screening/diagnosing these diseases. The percentage of cells in lymphocyte gate in CD45/SSC dot plot is normal or increased, and within the lymphocyte gate, abnormal expression pattern can be seen in the dot plots of CD2/CD7, CD3/CD5, CD4/CD8, CD4/CD3, and CD3/CD56. One or more of the following abnormalities will occur in T-CLPD, of which the abnormal expression of CD4 and CD8 is prerequisite: ① Loss of one or more T cell antigens (such as CD2, CD3, CD5 or CD7); ② Changes in the fluorescence intensity of common expressed antigens, including enhancement and reduction; ③ aberrant CD4 and CD8 subsets, for example, a single positive cell group appears, or the proportion of CD4+/CD8+ or CD4−/CD8− cells in T cells is significantly increased; ④ Consistent expression of antigens that are expressed in small amount or not expressed under normal circumstances: fully expression of CD117 and/or CD56, or the like. In tube II, tube III, tube IV, tube V, T-CLPD with a high proportion of tumor cells will have the same enlarged lymphocyte gate in CD45/SSC dot plot as tube I. However, it should be noted that in some cases of T-CLPD tumor cells may locate outside the lymphocyte gate in CD45/SSC dot plot due to changes in CD45 expression intensity and SSC of tumor cell, therefore it is necessary to correct the lymphocyte gate with the aid of CD45/CD7 and CD45/CD5 in tube I and CD45/cCD3 in tube III to confirm that all cells expressing at least one of these three markers are within the lymphocyte gate.

④ NK-CLPD: Similar to T-CLPD, tube I is the key to screening/diagnosing these diseases. The percentage of cells in lymphocyte gate set by CD45/SSC is normal or increased, and within the lymphocyte gate, the abnormal expression patterns can be seen in the dot plots of CD2/CD7, CD3/CD5, CD4/CD8, and CD3/CD56. In NK-CLPD, one or more of the following abnormalities will occur, of which CD8 must be abnormal: ① one of CD2 and CD7 is lost; ② The fluorescence intensity of common expressed antigens changes, including enhancement and weakening; ③ The expression of CD8 changes, all negative or all positive; ④ Consistent expression of antigens with a small amount of expression or no expression under normal conditions: such as fully expression of CD117. In tube II, tube III and tube IV, NK-CLPD with a high proportion of tumor cells will have the same enlarged lymphocyte gate in CD45/SSC dot plot as the tube I. Group A of tube V uses SSC/CD56 to gate tumor cells which could be detected in cases with a high proportion of tumor cells. It should be known that in some cases of NK-CLPD tumor cells may locate outside the lymphocyte gate in CD45/SSC dot plot due to changes in CD45 expression intensity and SSC of tumor cell. Therefore, it is necessary to use the CD56/SSC gates in tube I and group A of tube V to search for tumor cells with SSCbri and/or CD56bri to prevent misdiagnosis.

(3) chronic myeloid neoplasms, including MDS, MPN, MDS/MPN, mastocytosis, and eosinophilia-related diseases. Tube I and tube II are the key to diagnosing/screening such diseases. What is similar to AML is the gating method and aberrant expression of myeloblast, the difference is that since the proportion of blasts is less than 20%, in most cases even less than 5%, tumor cells cannot be found in every tube, and abnormal cells are not limited to myeloblast. It is necessary to observe maturing myeloids simultaneously, such as differentiation stages of granulocytes (gra gate), monocytes (mono gate), nucleated erythrocytes (NEC gate). A small number of classifications, such as MDS with 5q-chromosomal abnormalities, thrombocytosis and megakaryocytosis gated by CD45/CD42a can be observed in tube IV. In tube I gated by CD117/SSC, the CD117+ myeloblasts can be seen with abnormal expression of more than one T and NK markers: CD7, CD56, CD2, CD5, or CD4 in 5%-30% of MDS cases. Myeloblasts can be gated by CD34/SSC and CD117/SSC in tube II and tube III, and CD45/HLA-DR in tube II. Abnormal expression patterns of CD13/CD34, CD33/CD34, CD13/CD33, CD13/HLA-DR, CD34/HLA-DR, CD33/HLA-DR, CD34CD117, and CD38/CD34 may be found in myeloblasts which are different from normal. In the granulocyte gate set by CD45/SSC in tube II, cells with more than one abnormal expression patterns of CD16/CD13, CD13/CD11b, and CD16/CD11b can be observed which are different from that of normal control. There may be a decreased proportion of the cells in granulocyte gate (normally occupying 50%-70% of nucleated cells), the granulocyte gate (Gra) in CD45/SSC dot plot in each tube of tube I, tube II, tube III, tube IV and tube V may shift to the left because reduced SSC of granulocytes, which causing the boundary to the gate of monocytes (mono) unclear. Cells within the monocyte gate (mono) set by CD45/SSC in tube II and tube IV will show abnormal expression pattern of HLA-DR/CD11b and/or CD14/CD64 that is different from normal specimens. The contribution of the tube V is that more or less normal proliferative early B progenitor cells (hematogones) can be seen in most normal specimens, while in diseases such as MDS, hematogones are significantly reduced.

Mast cell neoplasms are extremely rare. Gated by CD117bri/SSC in tube I, tube II, and tube III the mast cells may be obvious seen with a higher proportion. If there is abnormal expression of CD2 in the tube I, the diagnosis is relatively simple. If there is no abnormal expression of CD2, CD25 and CD69 are generally added, and the diagnosis is confirmed by combining clinical manifestations and other laboratory tests.

In normal bone marrow, eosinophils occupy 0.5%-5% of nuclear cells. If the percentage increases, attention should be paid to idiopathic eosinophilia caused by parasites and/or allergies, or other factors; or malignancies such as chronic eosinophilic leukemia, PDGFRA or PDGFRB rearrangement, or tumor related to FGFRI abnormality. The point of identification is whether or not with other myeloid or lymphoid abnormalities in addition to eosinophilia. If present, the diagnosis should be tumor-associated eosinophilia, and if only eosinophilia is present, the idiopathic may be considered.

(4) Paroxysmal nocturnal hemoglobinuria (PNH): tube II and tube IV are the key to screening/diagnosing such diseases. The immunophenotypes in tube I, tube III and tube V are normal. In tube II, granulocytes (Gra) gate set by CD45/SSC partially lost CD16, and on the lost part of granulocyte CD16 is characteristically weakly positive rather than completely negative, simultaneously, in tube IV, cells within the monocyte gate (mono) set by CD45/SSC partially lost CD14. When necessary, CD55, CD59, and FLAER detection should be combined with.

(5) Various metastatic cancers involving the bone marrow and/or peripheral blood, including solid tumors of epithelial origin and solid tumors of neuromuscular origin: tube I and group A of tube V are the key to screening such diseases. The tumor cell populations are detected by CD45dim or −/CD56+ gates, except for a few cases that can aberrantly express CD117, the vast majority of cases do not express any blood cell markers, including CD38. In many cases tumor cells with expression of CD45dim or −/SSCbri can be found in the region under the granulocyte gate in CD45/SSC dot plot. The various lineages and stage markers detected in these five tubes are all negative. However, GD2, CD326, and cytokeratin should be added for further diagnosis. Metastatic carcinoma of epithelial origin is considered when the latter two markers are expressed, and the possibility of non-epithelial origin is high when the latter two are negative. The expression of GD2 is more common in neuroblastoma.

(6) Pre-leukemic lesions: MBL and MGUS: tube V is the key to diagnosing/screening such diseases. The phenotype of MBL is same as that of B-CLPD, except that the number of tumor cells is small (less than $5 \times 10^9$/L in peripheral blood), and there is no lymphoma-related clinical manifestations. The immunophenotype of MGUS is the same as that of PCN, but the proportion is low. Especially in the plasma cell gate, the percentage of normal part is more than 3%-5% of plasma cells, and there is no clinical manifestation of PCN.

(7) Some rare normal human polymorphisms such as FCγ receptor IIIβ gene mutation: Tube II is the key to screening/diagnosing such diseases. The cellular immunophenotype of the other four tubes are normal. In tube II, granulocytes (Gra) gated by CD45/SSC dot plot are all lost of CD16 with the distinctively loss pattern of completely negative, and no other abnormality is observed except this.

(8) Aplastic anemia (AA), including pure red blood cell AA: if the proportions of blasts gated by CD34/SSC, CD117/SSC, HLA-DR/CD45dim, and TdT/SSC in tube I, tube II, tube III, tube IV and group B of tube V are all extremely low without other abnormal expression, the proportions of granulocytes gated by CD45/SSC in each tube decrease, mainly CD16+/CD11b+ mature stage cells which lack of early stages of cells in granulocyes gated by CD45/SSC in tube II are observed, and the percentages of nucleated red blood cells (NEC) gated by CD45/SSC in each tube are significantly reduced, the diagnosis of AA is suggested if the reason of poor sampling is excluded. If the percentages and compositions of blasts and granulocytes are normal, especially if hematogones are present, but the proportion of nucleated red blood cells is significantly reduced (<1%), the diagnosis of pure red aplastic anemia is highly suspicious.

(9) Abnormal immune cell subsets, including primary immunodeficiency disease (PID) or diseases caused by therapies, infections, etc. Tube I, tube III, and tube V the key to diagnosing such diseases. In the normal mature lymphocyte gate (Lym), T cells account for 35%-85%, NK cells 5%-39%, B cells 3%-20%, and the ratio of CD4/CD8 is from 0.5 to 2.5. If the composition is severely imbalanced and lymphoma is excluded according to the previous diagnostic criteria for CLPD, immunodeficiency or a therapy or infection-induced abnormality of immune cell subsets are mainly considered.

To sum up, the present disclosure provides an antibody combination for one-step screening and/or diagnosis of clonal diseases and the related application. The advantages of the present disclosure are: (1) Based on the understanding of a large number of tumors, clonal diseases, pre-leukemic lesions, normal polymorphisms, immune deficiencies and other diseases, a comprehensive one-step method is designed to minimize the misdiagnosis rate. (2) In terms of application, besides preventing misdiagnosis, it is possible to make full use of complex combination gates to find the coexistence of two diseases, special clones and vulnerable clones, which is of great significance for in-depth understanding of the complexity of tumors and getting accurate diagnosis. (3) The present disclosure adopts the one-step method for rapid screening/diagnosis, which means that the antibodies can be premixed after the panel is determined. This procedure greatly reduces the workload, improves the work efficiency, speeds up the reporting time, and improves the efficiency of the laboratory. Clinical patients can early obtain accurate diagnosis and take appropriate treatment, thereby improving the remission rate and survival rate, which has great social significance. (4) A very important reason that has restricted the development of flow cytometry laboratories for a long time is the individualization of the panels and too many manual operations, which makes it difficult to achieve automation and standardization. Using the one-step screening/diagnosis panel of the present disclosure creates conditions for subsequent sample pre-processing machines, automatic sample loading of flow cytometers, and modelization of data analysis, especially for the development of artificial intelligence in the future. The automation, standardization and intelligence of the laboratory are the inevitable direction of the development of flow cytometry. (5) It is convenient to accumulate data and experience. Flow cytometry is an empirical science. A relatively standardized and unified program will be helpful for laboratory staff to facilitate the rapid formation of conditioned reflexes, acquire a large amount of experience in a short period of time, and speed up personnel training. (6) The traditional two-step method is based on the judgment of the first step, and the antibodies for the first step screening are limited. When the proportion of tumor cells is low and there are two or more tumor cells. The second step completely depends on the timely and correct judgment of the first step. In this way, the personnels who make the judgement after the first step are extremely demanding, and it is very likely that errors in judgment may lead to failure to make a correct diagnosis or a large number of antibodies are wasted to make a correct diagnosis. Therefore, the present disclosure is urgently needed for clinical flow cytometry diagnosis, and is very suitable for a one-step screening/diagnosis detection and analysis panel for clonal diseases, pre-leukemic lesions, normal human polymorphisms, and immunodeficiency, which is widely used and popularized. (7) In the present disclosure, each tube has its own focus, and most tubes reuse the blast markers to gate, which objectively achieves the followings. ① In MDS, MPN, MDS/MPN, mast cell tumor, eosinophilia related diseases, T-LBL, B-LBL, and some MPAL with a minor clone, when the percentages of malignant cells are low, it is possible to precisely identify tumor cells, and the results are verified in each tube which maximize the possibilities to find more abnormalities, and to exclude the false appearances that may occur in a low proportion and lead to misdiagnosis; ② It is helpful for the discrimination of chronic myeloid neoplasms with AA, pure red AA, PNH, or FCγ receptor IIIβ, and acquiring accurate diagnosis. The actions of ensuring to use at least two markers for each lineage and each stage, and the important markers being reused, objectively maximize the possibilities of avoiding misdiagnosis caused by disordered expression of lineage markers on malignant cells, especially acute leukemia. Subjectively, it can prevent misdiagnosis caused by human errors in complex flow cytometry operations, such as adding wrong antibodies, poor quality of individual antibodies, and improper setting of instrument conditions.

DETAILED DESCRIPTION OF THE EMBODIMENTS

Figure 1:
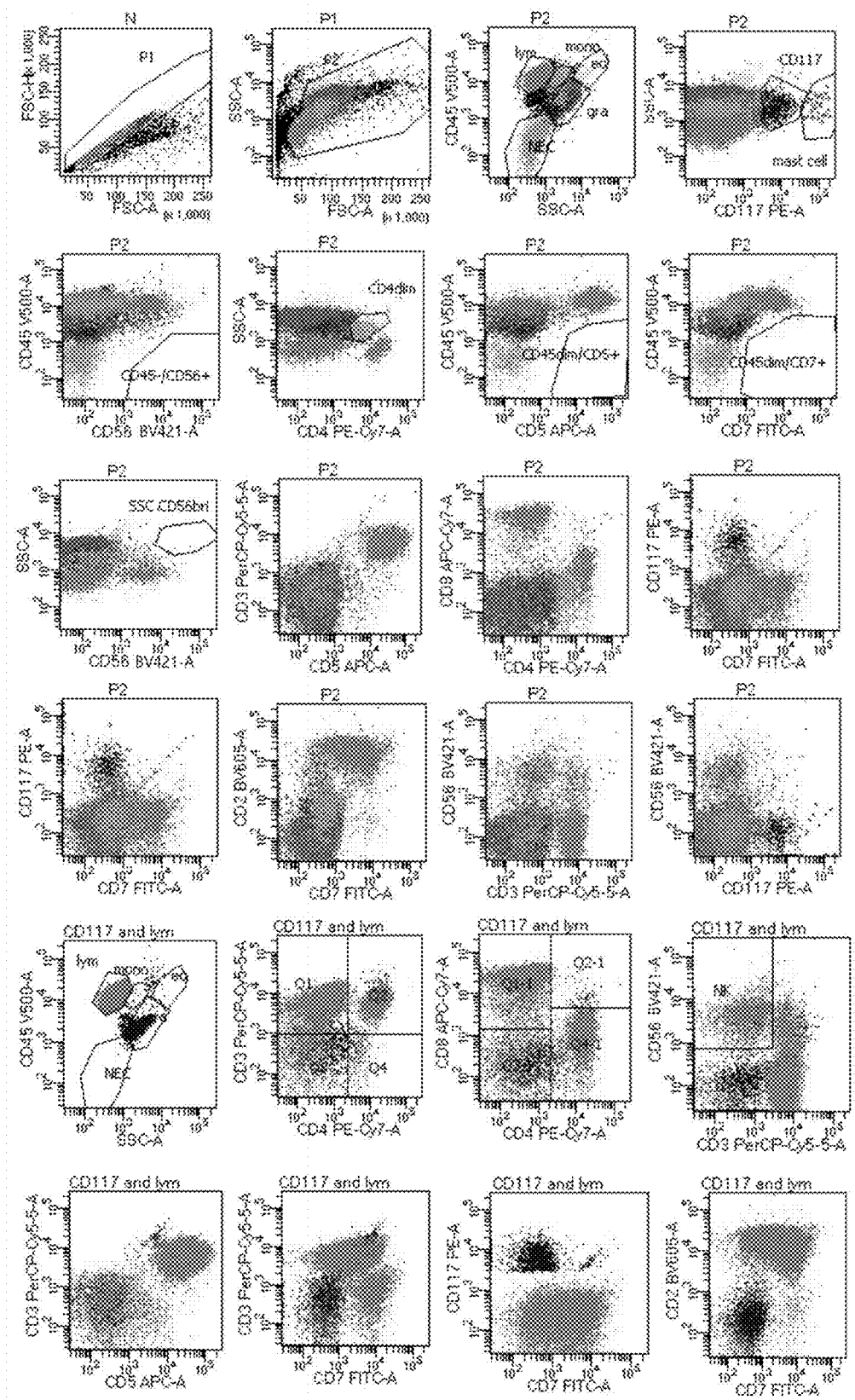
FIG. 1 to FIG. 5 show the five tube results of flow cytometry gating analysis from the same normal bone marrow specimen according to an embodiment of the present disclosure.

In order to have a clearer understanding of the technical features, purposes, and beneficial effects of the present disclosure, the technical solutions of the present disclosure are now described in detail below, but should not be construed as limiting the scope of implementation of the present disclosure.

Example 1

Preparation of Reagents

The antibody combination used in this example is:

The first composition is the first group of antibodies including anti-CD7 antibody, anti-CD117 antibody, anti-CD3 antibody, anti-CD4 antibody, anti-CD5 antibody, anti-CD8 antibody, anti-CD56 antibody, anti-CD45 antibody and anti-CD2 antibody, which are labeled with fluorescence in the order of FITC, PE, PerCP-Cy5.5, PE-Cy7, APC, APC-Cy7, BV421, V500, and BV605, respectively; the above nine monoclonal antibody reagents are mixed in the first container according to a volume ratio of 5:5:5:3:2:3:3:3:3.

The second composition is anti-CD16 antibody, anti-CD117 antibody, anti-CD34 antibody, anti-CD13 antibody, anti-CD33 antibody, anti-HLA-DR antibody, anti-CD11b antibody, and anti-CD45 antibody, which are labeled with fluorescence in the order of FITC, PE, PerCP-Cy5.5, PE-Cy7, APC, APC-Cy7, BV421, and V500; the above eight monoclonal antibody reagents are mixed in the second container according to a volume ratio of 5:5:5:3:2:3:3:3.

The third composition is anti-CD22 antibody, anti-CD34 antibody, anti-CD117 antibody, anti-CD38 antibody, and anti-CD45 antibody, which are labeled with fluorescence in the order of PE, PerCP-Cy5.5, PE-Cy7, BV421, and V500; the above five monoclonal antibody reagents are mixed in the third container according to a volume ratio of 5:5:3:3:3.

The fourth composition is anti-CD64 antibody, anti-CD34 antibody, anti-CD42a antibody, anti-CD14 antibody, and anti-CD45 antibody, which are labeled with fluorescence in the order of PE, PerCP-Cy5.5, APC, APC-Cy7 and V500; the above five monoclonal antibody reagents are mixed in the fourth container according to a volume ratio of 5:5:2:3:3.

The fifth composition includes group A and/or group B. Group A is for test subjects older than 30 years old, and is anti-CD38 antibody, anti-CD19 antibody, anti-CD10 antibody, anti-CD20 antibody, anti-CD56 antibody, anti-CD45 antibody, and anti-CD5 antibody, which are labeled with fluorescence in the order of PerCP-Cy5.5, PE-Cy7, APC, APC-Cy7, BV421, V500, and BV605, and the above seven monoclonal antibody reagents are mixed in the fifth container according to a volume ratio of 5:3:2:3:3:3:3. Group B is for children or youth younger than 30 years old, and is anti-CD34 antibody, anti-CD19 antibody, anti-CD10 antibody, anti-CD20 antibody, anti-CD38 antibody, and anti-CD45 antibody, which are labeled with fluorescence in the order of PerCP-Cy5.5, PE-Cy7, APC, APC-Cy7, BV421, and V500, and the above six monoclonal antibody reagents are mixed in another fifth container according to a volume ratio of 5:3:2:3:3:3.

The sixth composition is anti-nuclear TdT antibody and anti-cCD3 antibody, which are labeled with fluorescence in the order of FITC and APC, respectively, and are mixed in the sixth container according to a volume ratio of 2:2.

The seventh composition is anti-cMPO monoclonal antibody, which is labeled with fluorescence FITC, and is placed in the seventh container.

The eighth composition is anti-cκ antibody and anti-cλ polyclonal antibody, which are labeled with fluorescence in the order of FITC and PE, respectively, and are mixed in the eighth container according to a volume ratio of 2:2.

In this embodiment, antibodies are commercially available. TdT-FITC and cCD3-APC are products of Beckman Coulter Company in the United States. cCD79a-APC is a product of Chinese Sizhengbai Company. cκ-FITC, cλ-PE polyclonal antibodies are products of Denmark dako company. CD16-FITC is a monoclonal antibody against pan-FCγ receptor class III antigen with clone number 3G8 of the pharmingen product line of Becton Dickinson Company in the United States. The remaining fluorescence-labeled antibodies are all products of Becton Dickinson Company in the United States.

Reconfigured lysing agent is packed in the ninth container, the permeabilization reagent α is packed in the tenth container, the permeabilization reagent β is packed in the eleventh container, and the PBS buffer is packed in the twelfth container. Lysing agent, permeabilization reagent, and PBS buffer are commercially available. Cell lysate and permeabilization reagent are products of Becton Dickinson Company in the United States, and PBS buffer is product of Beckman Coulter Company.

Example 2

Processing of Specimen

According to the cell count results, add heparin or EDTA anticoagulated bone marrow or peripheral blood samples to tube I to ensure that the amount of cells is about $2\times10^6$ cells, then add 32 µl nine kinds of various fluorescence-conjugated antibodies into the flow tube I. These reagents are membrane monoclonal antibodies in the first container according to Table 1. Mix thoroughly with the cell suspension, and incubate at room temperature for 15 minutes in the dark, add 3 ml of 1×lysing agent, incubate in the dark for 10 minutes to lyse the red blood cells, centrifuge at 1500 rpm for 5 minutes to remove the supernatant, add 3 ml of PBS and mix well, after centrifuging at 1500 rpm for 5 minutes to remove the supernatant, resuspend the cells with 0.5 ml of PBS buffer. The processed sample can be tested on the machine.

According to the cell count results, add heparin or EDTA anticoagulated bone marrow or peripheral blood samples to tube II to ensure that the amount of cells is about $2\times10^6$ cells, then add 29 µl eight kinds of various fluorescence-conjugated antibodies into the flow tube II. These reagents are membrane monoclonal antibodies in the second container according to Table 1. Mix thoroughly with the cell suspension, and incubate at room temperature for 15 minutes in the dark, add 3 ml of 1×lysing agent, incubate in the dark for 10 minutes to lyse the red blood cells, centrifuge at 1500 rpm for 5 minutes to remove the supernatant, add 3 ml of PBS and mix well, then centrifuge at 1500 rpm for 5 minutes to remove the supernatant, and resuspend the cells with 0.5 ml of PBS buffer. The processed sample can be tested on the machine.

According to the cell count results, add heparin or EDTA anticoagulated bone marrow or peripheral blood samples to tube III to ensure that the amount of cells is about $2\times10^6$ cells, then add 19 µl five kinds of various fluorescence-conjugated antibodies into the flow tube III. These reagents are membrane monoclonal antibodies in the third container according to Table 1. Mix thoroughly with the cell suspension, and incubate at room temperature for 15 minutes in the dark, add 100 μl of permeabilization reagent α, incubate in the dark for 5 minutes, add 3 ml of 1×lysing agent, mix well, and incubate in the dark for 10 minutes to lyse the red blood cells, centrifuge at 1500 rpm for 5 minutes to remove the supernatant, add 50 μl of permeabilization reagent β, 2 μl cytoplasmic monoclonal antibody reagent TdT-FITC, and 2 μl cytoplasmic antibody CD3-APC. After incubate at room temperature for 15 minutes in the dark, add 3 ml of PBS buffer and mix well, then centrifuge at 1500 rpm for 5 minutes to remove the supernatant, resuspend the cells with 0.5 ml of PBS buffer. The processed sample can be tested on the machine.

According to the cell count results, add heparin or EDTA anticoagulated bone marrow or peripheral blood samples to tube IV to ensure that the amount of cells is about $2\times10^6$ cells, add 3 ml PBS and mix well, incubate for 5 minutes in a 37° C. water bath, centrifuge at 1500 rpm for 5 minutes to remove the supernatant, add 3 ml PBS again and mix well, incubate in a 37° C. water bath for 5 minutes, centrifuge at 1500 rpm for 5 minutes to remove the supernatant, add 3 ml PBS again to mix well, centrifuge at 1500 rpm for 5 minutes to remove the supernatant, add 18 μl five kinds of various fluorescence-conjugated antibodies into the flow tube IV. These reagents are membrane monoclonal antibodies in the fourth container according to Table 1. Mix thoroughly with the cell suspension, and incubate at room temperature for 15 minutes in the dark, add 100 μl of permeabilization reagent α, incubate in the dark for 5 minutes, add 3 ml of 1×lysing agent, mix well, and incubate in the dark for 10 minutes to lyse the red blood cells, centrifuge at 1500 rpm for 5 minutes to remove the supernatant, add 50 μl permeabilization reagent β and 5 μl cytoplasmic monoclonal antibody reagent MPO-FITC. After incubate at room temperature for 15 minutes in the dark, add 3 ml of PBS buffer and mix well, then centrifuge at 1500 rpm for 5 minutes to remove the supernatant, resuspend the cells with 0.5 ml of PBS buffer. The processed sample can be tested on the machine.

According to the cell count results, add heparin or EDTA anticoagulated bone marrow or peripheral blood samples to tube V to ensure that the amount of cells is about $2\times10^6$ cells, add 3 ml PBS and mix well, incubate for 5 minutes in a 37° C. water bath, centrifuge at 1500 rpm for 5 minutes to remove the supernatant, add 3 ml PBS again and mix well, incubate in a 37° C. water bath for 5 minutes, centrifuge at 1500 rpm for 5 minutes to remove the supernatant, add 3 ml PBS again to mix well, centrifuge at 1500 rpm for 5 minutes to remove the supernatant, add 22 μl seven kinds of monoclonal antibodies labeled with different fluorescence to the flow tube V, the seven antibodies are group A of the fifth container according to Table 1 (if the patient is younger than 30 years old, add 19 μl six kinds of membrane monoclonal antibodies labeled with different fluorescence in group B of the fifth container), mix well with the cell suspension, incubate at room temperature for 15 minutes in the dark, add 100 μl of permeabilization reagent α, and incubate in the dark for 5 minutes at room temperature, add 3 ml of 1×lysing agent and incubate in the dark for 10 minutes to lyse red blood cells, centrifuge at 1500 rpm for 5 minutes to remove the supernatant, add 50 μl permeabilization reagent β, 2 μl cytoplasmic polyclonal antibody κ-FITC, and 2 μl cytoplasmic polyclonal antibody λ-PE. After incubate at room temperature for 15 minutes in the dark, add 3 ml of PBS buffer and mix well, then centrifuge at 1500 rpm for 5 minutes to remove the supernatant, resuspend the cells with 0.5 ml of PBS buffer. The processed sample can be tested on the machine.

TABLE 1

Antibody compositions for one-step screening/diagnosis of clonal diseases

| Fluorescence | Tube I First container | Volume (μl) | Tube II Second container | Volume (μl) | Tube III Third container | Sixth container | Volume (μl) |
|---|---|---|---|---|---|---|---|
| FITC | CD7 | 5 | CD16 | 5 | \ | TdT | 2 |
| PE | CD117 | 5 | CD117 | 5 | CD22 | \ | 5 |
| PerCP-Cy5.5 | CD3 | 5 | CD34 | 5 | CD34 | \ | 5 |
| PE-CY7 | CD4 | 3 | CD13 | 3 | CD117 | \ | 3 |
| APC | CD5 | 2 | CD33 | 2 | \ | cCD3 | 2 |
| APC-Cy7 | CD8 | 3 | HLA-DR | 3 | \ | \ | \ |
| BV421 | CD56 | 3 | CD11b | 3 | CD38 | \ | 3 |
| V500 | CD45 | 3 | CD45 | 3 | CD45 | \ | 3 |
| BV605 | CD2 | 3 | \ | \ | \ | \ | \ |

| Fluorescence | Tube IV Fourth container | Seventh container | Volume (μl) | Group A of Tube V (older than 30 years old) Fifth container | Eighth container | Volume (μl) | Group B of Tube V (younger than 30 years old) Fifth container | Eighth container | Volume (μl) |
|---|---|---|---|---|---|---|---|---|---|
| FITC | \ | MPO | 5 | \ | cκ | 2 | \ | cκ | 2 |
| PE | CD64 | \ | 5 | \ | cλ | 2 | \ | cλ | 2 |
| PerCP-Cy5.5 | CD34 | \ | 5 | CD38 | \ | 5 | CD34 | \ | 5 |
| PE-CY7 | \ | \ | \ | CD19 | \ | 3 | CD19 | \ | 3 |
| APC | CD42a | \ | 2 | CD10 | \ | 2 | CD10 | \ | 2 |
| APC-Cy7 | CD14 | \ | 3 | CD20 | \ | 3 | CD20 | \ | 3 |
| BV421 | \ | \ | \ | CD56 | \ | 3 | CD38 | \ | 3 |
| V500 | CD45 | \ | 3 | CD45 | \ | 3 | CD45 | \ | 3 |
| BV605 | \ | \ | \ | CD5 | \ | 3 | \ | \ | \ |

Example 3

Detection of Specimen

The specimens processed according to the method of Example 2 are detected on a 3-laser 10-color FACS Canto plus flow cytometer of Becton Dickinson Company in the United States. After 1 million (at least 300,000) cells per tube are acquired, diva 2.8 software or other software such as kaluza is used to analyze the data.

When performing flow cytometry detection, gating according to the following methods: ① Fixed gating: the single (nonadherent) cell gate, the live cell gate, and the blood cell gate are set in sequence; ② Combined multi-marker gating: this procedure begins in single live cells which means side-by-side with CD45/SSC to set blood cell gates. It can avoid missing of tumor cells because of gating and identifying all kinds of cells; ③ By combined multi-marker gating methods, the common expression patterns and maturing patterns of various marker combinations are displayed, and tumor cells are found according to the difference from normal cells. If these conditions take place, relevant diagnosis is suspected, for example, the occurance of progenitor T or NK cells, progenitor megakaryocytes, or metastatic cancer cells that are not present in normal specimens, the losses of CD16 on granulocytes, the imbalanced percentage of immune cell subsets, the decreased percentage of blasts, maturing granulocytes, and nucleated red blood cells, or the significantly decreased percentage of only nucleated red blood cells (less than 1%).

1. Fixed Gating: Including the Single (Nonadherent) Cell Gate, the Live Cell Gate and the Blood Cell Gate.

Single cell gate: the area (A) and the height (H) of forward scatter (FSC) are used to set the single cell gate (usually denoted by P1). Adherent cells can be removed by FSC-area (A)/height (H). The principle is that cells are round, and A and H are positively correlated. (See the first gating dot plot from left to right in the top row in FIG. 1 to FIG. 20).

Live cell gate: for cells in P1, FSC/side scatter (SSC) are used to set the live cell gate (usually denoted by P2) to obtain single live cells. The principle of FSC/SSC is that the size and granularity of live cells are nearly normal distribution, the cells are clustered around a center, which have clear boundaries with dead cells, apoptotic cells, debris and background noise. (See the second gating dot plot from left to right in the top row in FIG. 1 to FIG. 20).

Blood cell gate: in the single live cell gate (P2 gate), CD45/SSC is used to set each blood cell gate, lymphocytes, monocytes, granulocytes, and nucleated red blood cells are roughly observed, and whether there are obvious tumor cells or abnormal cells is observed. Different groups of blood cells are roughly distinguished by CD45/SSC. The principle is that signals of SSC are different (eosinophils>granulocytes>monocytes>mature lymphocytes>nucleated red blood cells), as well as the difference in the fluorescence intensity of CD45 expression on hematopoietic cells (mature lymphocytes>monocytes>granulocytes>nucleated red blood cells). (See the third gating dot plot from left to right in the top row in FIG. 1 to FIG. 20). The purpose is to avoid missing large tumor cell populations, and set internal controls.

2. Combined Multi-Marker Gating is Performed Simultaneously Side-by-Side with CD45/SSC Gating, Which Starts from Single Live Cells (P2).

The application of each tube has a different observation purpose. In tube I the mainly observed cells are T, NK, myeloblast, and the presence of CD45dim or −/CD56+ tumor cells (metastatic cancer, some plasma cell neoplasm, BPDCN, some acute megakaryocyte leukemia, or the like). CD45/SSC, CD45dim or −/CD56+, CD117/SSC, CD117bri/SSC, SSC/CD56, and SSC/CD4 gating are selected, corrected the lymphocyte gate with CD45/CD7, CD45/CD5, and SSC/CD56, corrected the monocyte gate with SSC/CD4, and whether or not presence of cells with CD45dim/CD7+, CD45dim/CD5+, SSCbri/CD56bri are observed. In tube II the mainly observed cells are myeloblast, and whether or not abnormal maturing pattern of granulocytes and monocytes. CD45/SSC, CD117/SSC, CD117bri/SSC, CD34/SSC, and HLA-DR/CD45 gating are selected, and corrected monocyte gate with CD11b/HLA-DR. If no CD11b+/HLA-DR+ monocytes located outside the monocyte gate in CD45/SSC dot plot, additional gates are not needed. In tube III the mainly observed expression are the lineage of the blasts by CD45/SSC, CD117/SSC, CD117bri/SSC, CD34/SSC, TdT/SSC, CD22/SSC, and CD45/cCD3 gating. In tube IV the mainly aim is to observe the characters of monocytes and megakaryocytes by CD45/SSC, CD42a/CD45, CD34/SSC gating. In tube V the mainly aim is to observe abnormalities in B cells and plasma cells. Two panels of different reagents in Group A and Group B are used because there are few plasma cell neoplasms in people younger than 30 years old and B-ALL/LBL is more common in people younger than 30 years old. For adults older than 30 years old CD45/SSC, CD45dim or −/CD56+, CD19/SSC, CD20/SSC, and CD38bri/SSC and/or CD38bri/CD45 gating are used (individuals younger than 30 years CD45/SSC, CD19/SSC, CD20/SSC, CD38bri/SSC and/or CD38bri/CD45, and CD34/SSC gating are used).

3. Precisely Identify Target Cells Based on the Combination of Markers

Diagnosis of acute leukemia: normal bone marrow has variable percentages of normally proliferative progenitor B cells (FIG. 5) and myeloblasts (FIG. 1 to FIG. 4). In most cases, the percentage is less than 5% (P2). Although in children, or after chemotherapy or stimulated by other factors, the percentage of these early cells may be significantly increased (especially progenitor B cells, as high as 71% reported in the literature), causing these cells to be misdiagnosed as tumor cells. However, through the marker combination of the present disclosure, it is possible to accurately determine the character of proliferative cells (benign or malignant), the lineage of proliferative cells, and the expression of relevant markers, especially evaluate their fluorescence intensity, and the combined expression pattern. The judgement is made by that if these expressions strictly follow normal regularities at different developmental stages.

(1) Immunophenotype of Hematopoietic Stem Cells and Myeloid Progenitor Cells

① Hematopoietic stem cells (HSC): CD34+, CD38−/weak expression.

② Committed progenitor cells: CD34++, HLA-DR++, CD38++.

③ Myeloid progenitor cells: CD34++, CD117+, HLA-DR++, CD13+, CD33+, MPO−/+.

④ B lineage progenitor cells: CD34++, CD38++, HLA-DR++, TdT+, CD19+, CD22+, CD10++.

There are no T lineage progenitor cells in normal bone marrow, and the immunophenotype of T-ALL is TdT+, CD34+, cCD3+, CD7+.

(2) Immunophenotype of Granulocyte Lineage

Differentiation antigens of granulocyte lineage include MPO, CD33, CD13, CD117, CD64, CD11b, and CD16. MPO is a relatively specific myeloid marker; CD33 and CD13 are expressed in myeloid at various stages, but the expression intensity changes with the development of cells; CD34 is only expressed in blasts, and the expression of CD117 and HLA-DR starts from blasts, but ends at the early stage of promyelocytes; CD11b is expressed in later stages of myelocytes, neutrophils, basophils, eosinophils, and monocytes; CD16 and CD10 are mainly expressed in mature granulocytes. In normal bone marrow, granulocytes occupy 50%-70% of nucleated cells. CD11b/CD13, CD16/CD13, and CD16/CD11b are used to observe the developmental pattern of granulocytes, which shows sequential and regular changes.

(3) Immunophenotype of Monocyte Lineage

Differentiation antigens of monocyte lineage include CD33, CD13, CD4dim, HLA-DR, CD64, CD11b, and CD14. CD33 and CD13 are expressed in monocytes at all stages. Monocytes express CD4, but the fluorescence intensity is significantly weaker than that of normal CD4+ T cells. HLA-DR is also expressed in cells of various stages of the monocytic lineage. CD64 and CD11b begin to be expressed in the immature stage, CD14 is strongly expressed in mature monocytes, weakly expressed in immature monocytes, and not expressed in blasts. In normal bone marrow, monocytes occupy 2-20% of nuclear cells, which are basically CD14+ mature monocytes.

(4) Immunophenotype of Megakaryocyte Lineage

Differentiation antigens of megakaryocytes include CD41, CD42a, CD42b, and CD61. The inventors summarized the immunophenotypes of 120 cases of acute megakaryocytic leukemia diagnosed from April 2012 to April 2017 in the preliminary study (Table 2), and found that CD42a has the highest coverage of all megakyotic markers, reaching 100%, so CD42a is used for screening. The proportion of megakaryocytes in normal bone marrow is extremely low, and megakaryocytes are large and rarely detected by flow cytometry. It should be known that CD42a+ may be platelet adhesion. In the present disclosure, the method of incubation and washing at 37° C. can be repeated to eliminate false positives caused by platelet contamination as much as possible. The identification method of platelets is that on the FSC/SSC dot plot, expression of platelets has no center, and the FSC is smaller than normal lymphocytes and nucleated red blood cells, while the FSC of megakaryocytes is larger than lymphocytes, or even larger than granulocytes.

pre-B cells, and gradually weakened until disappearing as the cells mature, and CD38 is the most strongly expressed when the cells are differentiated into plasma cells (bri). CD20 begins to be expressed in late pre-B, and the expression gradually increases, and the mature B cells separately express light chain κ or λ, and the ratio of their percentage in B cells is 0.5 to 2.

(6) Immunophenotype of T Lymphocyte Lineage

Pan-T antigens include cCD3, CD7, CD2, and CD5. Progenitor T cells express TdT and CD34, and T cells in the thymic cortex stage are CD4/CD8 double positive, CD3 negative or weakly expressed (dim). Mature CD4+T cell subsets are CD2, CD3, CD4, CD5, and CD7 positive; CD8+T cell subsets are CD2, CD3, CD5, CD7, and CD8 positive. 5%-10% of T cells are TCRγ/δ positive T cells, which express CD2, CD3bri, CD5, and CD7, partially weakly express CD8, and do not express CD4.

Key points of immunophenotyping in diagnosis of acute leukemia: ① Malignant blasts occupy more than 20% of nuclear cells, express progenitor markers (CD34, HLA-DR, TdT) or do not express mature markers (myeloid do not express CD11b, CD16, or CD14, B cells do not express normal distribution of cκ, cλ, T cells do not express normal distribution and intensity of CD4 and CD8); ② classic AML or ALL usually express 2 or more relevant lineage markers: myeloid: MPO, CD13, CD33, CD117, CD11b, CD14, and CD64; B lineage: CD19, CD22, CD10, and CD20; T lineage: CD2, cCD3, CD5, CD7, CD4, CD8, and CD3. ③ The incidence of MPAL in acute leukemia is 3%-5%, and the tumor cells express more than two lineages' markers and meet the MPAL diagnostic criteria.

Mature lymphocytic neoplasms include mature B cell neoplasms, mature T cell neoplasms, and mature NK cell neoplasms. Chronic myeloid neoplasms include MDS, MPN, MDS/MPN, etc.

Mature B lymphocytic neoplasms express mature B cell markers and restrictly light chain κ or λ, but do not express immature markers (e.g., TdT, CD34, or CD45 dim). The immunophenotype of neoplastic B cells differs from that of normal mature B cells, mainly manifested as immunoglobulin light chain restriction, aberrant expression of antigens (such as aberrant expression of CD5, CD10, CD38, or the like), abnormality in fluorescence intensity of common B cell markers (CD19, CD20, and CD22), and changes in FSC or SSC or CD45 expression intensity, etc. Judgment of light

TABLE 2

Expression of common immunological markers in 120 cases of acute megakaryocytic leukemia

| | Marker | | | | | | | |
|---|---|---|---|---|---|---|---|---|
| | CD61 | CD41a | CD42a | CD42b | CD117 | CD13 | CD33 | MPO/CD64/CD11b |
| Sensitivity | 96% | 80% | 100% | 97% | 56% | 51% | 77% | 0~1% |

| | Marker | | | | | | | |
|---|---|---|---|---|---|---|---|---|
| | HLA-DR | CD34 | CD7 | CD56 | CD19 | CD2 | CD4 | CD5/CD10 |
| Sensitivity | 42% | 49% | 25% | 34% | 5% | 14% | 56% | 0% |

(5) Immunophenotype of B Lineage Lymphocyte

Pan-B antigens include CD19 and CD22 (PE-labeled membrane or cytoplasm). CD34 and TdT are expressed in early pre-B cells, and gradually weakened until disappearing as the cells mature. CD10 and CD38 are strongly expressed in the early pre-B cell stage, and moderately expressed in chain restriction: ①κ:λ>3:1 or <0.3:1; ② More than 25% of B cells do not express membrane immunoglobulin or express membrane immunoglobulin at a low level.

The proportion of normal plasma cells in the bone marrow is about 0.5% to 2%. From patients in fever, autoimmune diseases, AA, myelofibrosis and other conditions, the proportion may increase, but the immunophenotyping is normal, CD45 and CD19 positive, CD56 and CD117 negative, and cκ/cλ=0.5-2. Tumor plasma cells have restrictly expression of cκ or cλ, lose CD45 and/or CD19, or abnormally gain CD56, CD117, or the like.

In the present disclosure, through the detection of tube V, common B-ALL/LBL, mature B lymphocyte tumors, and plasma cell neoplasms can be detected. MBL and MGUS are pre-leukemic lesions of mature B lymphocyte tumors and plasma cell neoplasms, respectively, and can be screened/diagnosed using tube V. These two pre-leukemic lesions appear as monoclonal B cells and monoclonal plasma cells, respectively, and may be accompanied by abnormal expression, the difference with related tumors is that the clinical manifestations and signs and related laboratory tests do not meet the diagnostic criteria, and there are often normal B cells and plasma cells in the background. The incidence of these diseases is high (the incidence of MBL in adults older than 40 years old is 3.5%-17%, the incidence of MGUS in adults older than 50 years old is 3%, and the incidence of MGUS in adults older than 70 years old is 5%). Early screening, health management, or early treatment will greatly improve survival.

Normal mature T cells express membrane and cytoplasmic CD3, CD5, CD2, and CD7, seperately express CD4 or CD8, and the ratio of CD4 to CD8 is 0.5-2.5. T cells in bone marrow and peripheral blood do not express the immature cell markers TdT and/or CD34.

The phenotype of abnormal mature T cells: ① T cell antigens (such as CD2, CD3, CD5, or CD7) are lost; ② The fluorescence intensity of normally expressed antigens changes; ③ CD4 and CD8 are abnormally expressed, such as CD4 or CD8 is single positively expressed, the percentage of CD4+/CD8+ or CD4−/CD8− is significantly increased; ④ The non-T lineage antigens such as CD13, CD20, CD10, CD117, or the like are aberrantly expressed. ⑤ Antigens that should be expressed in small amounts or not expressed on normal cells are expressed consistently, such as HLA-DR, CD56, CD16, or the like. When CD4+/CD8+ is increased, we should be wary of having T-ALL/LBL or T-cell lymphoma, and when the CD4−/CD8− cells are increased, we should be wary of having autoimmune lymphoproliferative syndrome (ALPS).

In the present disclosure, tube I and tube III are mainly used to detect T cells and NK cells. In normal lymphocyte subsets, T cells account for 35%-85%, CD4/CD8=0.5-2.5, B cells account for 3%-20%, NK cells account for 5%-39%. If these percentages are seriously out of balance, it indicates that there is an immune deficiency or an immune imbalance caused by infections, therapies, or the like.

Flow cytometry has a sensitivity of approximately 70% and a specificity of 90% for the detection of chronic myeloid neoplasms. In the present disclosure, tube I, tube II, tube III, and tube IV can use CD34 and/or CD117/SSC gate to observe whether there is abnormal expression in low-proportion myeloblast. Normal myeloblast do not express markers in the tube I other than CD117. In tubes II and III, CD34/HLA-DR, CD34/CD13, CD34/CD33, CD13/CD33, CD13/HLA-DR, CD33/HLA-DR, and CD38/CD34 will show regular expression pattern, CD16, CD11b, CD14, CD42a, cCD3, and CD22 in tubes II, III, and IV are not expressed. A small number of myeloblasts express CD64 and MPO, while most of them do not express TdT.

Although MDS, MPN, MDS/MPN, mast cell tumors, eosinophilia or eosinophilia-related myeloid tumors, PNH, AA, and FCγ receptor IIIβ gene mutations have different characteristics, they are similar in panel design and observation methods, and they are also diseases that need to be distinguished from each other. Judging from the observation method, the following conditions are abnormal: ① Aberrant expression of antigens: such as lymphoid antigens CD7 and/or CD56 are aberrantly expressed on myeloblasts, and in rare cases, one or two of CD2, CD4, CD5, and CD19 are abnormally expressed. These are more common in myeloblast, but maturing granulocytes and monocytes at all stages may concomitantly express. ② The abnormal expression of myeloid antigens on myeloblast, granulocytes or monocytes: including loss, enhancement, and weakening; ③ Decreased SSC of myeloblast or maturing myeloids, which indicates degranulation; ④ Abnormal expression pattern of myeloid maturing, which is mainly manifested in abnormal developmental patterns of CD16/CD11b, CD11b/CD13, CD16/CD13 in granulocytes of tube II, and abnormal expression patterns of CD11b/HLA-DR and CD64/CD14 in monocytes of tube II and tube IV; ⑤ Diagnostic keypoints of various subtypes of chronic myeloid neoplasms. MDS is mainly manifested by dysplasia, and in many cases with increased percentage of lymphocytes, and/or increased percentage of nucleated red blood cells. MPN is mainly manifested by hyperplasia in at least one of the myeloid, MDS/MPN has characters of both MDS and MPN, and in some cases with increased percentage of small megakaryocytes or giant platelets.

PNH is characterized in that granulocytes partially lost CD16, and the lost part is CD16dim, which is not completely negative, and PNH is further characterized in that monocytes partially lost CD14. Mutations in the FCγ receptor IIIβ gene are characterized by normal expression of CD14 in monocytes, complete loss of CD16 in granulocytes, and no other abnormal developmental patterns. In the present disclosure, tube II and tube IV are the key to screening/diagnosing such diseases. In tube II, the CD45/SSC is gated to detect the partial loss of CD16 in the granulocyte gate (Gra), while the CD45/SSC in tube IV is gated to detect the partial loss of CD14 in the monocyte gate (mono). When necessary, CD55, CD59, and FLAER detection should be combined with.

AA is characterized in that increased proportion of lymphocytes, significantly decreased proportion of primitive immature cells, lack of early stages of myeloid, and decreased proportion of nucleated red blood cells. In the present disclosure, if the CD34/SSC, CD117/SSC, HLA-DR/CD45dim, TdT/SSC in tube I, tube II, tube III, tube IV, and group B of tube V all suggest that the proportion of blasts is extremely low without other abnormal expression, the percentage of granulocytes gated by CD45/SSC in each tube decreases, and in tube II, the cell in granulocyte gate (Gra) set by CD45/SSC are mainly CD16+/CD11b+ mature myeloid with lacking of early stage cells, the percentages of nucleated red blood cells (NEC) gated by CD45/SSC in each tube are significantly reduced, the diagnosis of AA is suggested if the reason of poor sampling is excluded. If the percentages and compositions of blasts and granulocytes are normal, only the proportion of nucleated red blood cells is significantly reduced (<1%), the diagnosis of pure red AA is highly suspicious.

In addition to screening/diagnosing the above-mentioned diseases, the panel of the present disclosure can also screen and diagnose metastatic cancer. CD45dim or −/CD56+ cells are not present in normal bone marrow, and through the above detections, the plasma cell neoplasms, acute megakaryocytic leukemia, and other leukemia and lymphomas are excluded, and metastatic cancer is highly suspected of. In the present disclosure, tube I and group A of tube V (adults older than 30 years old) use CD45dim or −/CD56+ combination to screen 90% of metastatic cancers involving bone marrow/peripheral blood. When GD2, CD326, and cytokeratin are combined with, the metastatic cancer can be clearly diagnosed.

BPDCN is a rare hematopoietic tumor, the immunophenotype is positive for HLA-DR, CD4dim, and CD56, negative for T, B, and myeloid-specific lineage markers, such as cCD3, CD3, CD22, MPO, CD64, CD14, and CD42a. The present disclosure can screen the tumor with high sensitivity, and CD45dim or –/CD56+ gate in tube I and group A of tube V will find tumor cells. The same group of tumor cells can be seen by CD4dim/SSC gate in tube I and CD45dim/HLA-DR gate in tube II. Tumor cells can be detected in the blast hole of CD45/SSC in each tube, and the tumor cells express CD4dim, CD56 and HLA-DR. When necessary, CD123, CD303, and CD304 markers can be combined with to confirm the diagnosis.

In brief, in the present disclosure, by combined multimarker gating methods, the immunophenotypes of mature T and NK lymphocytes are compared with that of normal T cells and NK cells respectively. If abnormal and tumor cells are found, a diagnosis of T or NK lymphoma is suggested. Immature T and NK cells are not present in normal bone marrow, and if they are found in the bone marrow, T-ALL/LBL or NK-ALL/LBL is highly suspicious. The maturing pattern and expression of B cells from patients are compared with that of normal cells to identify tumor cells, and B-ALL/LBL is suggested if aberrant progenitor B cells are observed. The immunophenotypes of the mature B cells and plasma cells are compared with that of normal cells to identify abnormal and suspicious tumor cells, and the light chain expression of these abnormal cells are further observed. If light chain restriction is present, i.e. these abnormal cells are monoclonal cells, related tumors (B-cell lymphoma or plasma cell neoplasm) or pre-leukemic lesions (MBL or MGUS) are highly suspicious. The expressions of various antigens of immature myeloid are compared with that of normal counterparts to identify tumor cells. If the proportion of malignant myeloblasts in nucleated cells is more than 20%, AML is suggested. Developmental patterns and antigen expressions of maturing granulocytes and monocytes are compared with that of normal cells to identify abnormal maturing myeloid, if the proportion of abnormal immature myeloid is less than 20%, and the developmental patterns of myeloid and monocytic lineage are abnormal, MDS or MDS/MPN is suggested. MPN is suggested if myeloid hyperplasia is dominant CD45–/CD56+ cells and immature megakaryocytes cannot be seen in normal bone marrow by flow cytometry. If CD45–/CD56+ cells or immature megakaryocytes are present in bone marrow sample, the corresponding tumor is highly suspicious, such as metastatic cancer or acute megakaryocytic leukemia. Loss of CD16 can be found in clonal diseases such as paroxysmal nocturnal hemoglobinuria (PNH) and myeloid tumors, and can also be found in the normal human polymorphism of FCγ receptor IIIβ gene mutation, the relevant markers are combined to determine the disease according to the loss situation. If the proportion of blasts is significantly reduced, the proportion of granulocytes decreases, and the myeloid is mainly in the mature stage, a diagnosis of AA is suggested. If the proportion of nucleated red blood cells is significantly reduced without other abnormalities, a diagnosis of pure red AA is suggested. This panel includes mature lymphocyte subsets, if the proportions are different from normal counterparts, immune abnormalities are highly suspected. The cause is determined based on clinical history and other tests, such as primary immunodeficiency diseases (PIDs) or abnormal immune cell subsets caused by therapies and infections. In some embodiments, the above description can be referred to when applying this method to diagnose these diseases, various acute leukemias, various mature lymphocytic neoplasms, chronic myeloid neoplasms, paroxysmal nocturnal hemoglobinuria, various metastatic cancers involving the bone marrow and/or peripheral blood include solid tumors of epithelial or neuromuscular origin, pre-leukemic lesions, rare normal human polymorphism, aplastic anemia and other abnormal immune cell subsets.

In this embodiment, 20 normal bone marrow specimens are selected for testing. Although the proportions of myeloblast and proliferative B progenitor cells are different in all normal bone marrow, the appearance time, fluorescence intensity of the antigen, and expression pattern of antigen combination all are showed in the same regular rule. The expressions of granulocytes, monocytes, mature lymphocytes and plasma cells strictly follow the normal proportion, developmental law and expression pattern.

Immunophenotyping examples are provided with one case of normal bone marrow, acute marrow leukemia (AML), FCγ receptor IIIβ gene mutation, and metastatic cancer with MBL. FIG. 1 to FIG. 5 show the immunophenotyping of tube I to tube V in the same normal bone marrow specimen, which are strictly gated and observed according to the above description. FIG. 6 to FIG. 10 show the immunophenotyping of tube I to tube V in one AML patient from bone marrow. FIG. 11 to FIG. 15 show the immunophenotyping of tube I to tube V in one patient with FCγ receptor IIIβ gene mutation from bone marrow, and FIG. 16 to FIG. 20 show the immunophenotyping of tube I to tube V in one patient with metastatic cancer and MBL from bone marrow.

FIG. 1 to FIG. 5: Normal bone marrow specimens from the same case, 5 tubes are analyzed together.

FIG. 1 shows the analysis results of tube I in normal bone marrow specimen. Set in order: ① Using FSC-A/H to set the single (nonadherent) cell gate P1, and obtain the single cells; ② Using FSC/SSC to set the live cell gate P2, and obtain the single live cells; ③ In the P2 gate, using CD45/SSC to set blood cell gates, and obtain lymphocytes (lym), granulocytes (Gra), monocytes (mono), nucleated erythrocytes (NEC), and eosinophil (eo) gates, respectively; ④ In the P2 gate, using CD117/SSC to set the immature myeloid gate; ⑤ In the P2 gate, using CD117bri/SSC to set mast cell gate; ⑥ In the P2 gate, using CD45/CD7 and CD45/CD5 to observe whether there are CD7+ or CD5+ cells outside the lymphocyte gate (lym) in CD45/SSC dot plot, CD45dim/CD7+, CD45dim/CD5+ cells should especially be paid attention to, which are absent in normal specimen; ⑦ In the P2 gate, using SSC/CD56 to observe whether there are SSCbri and/or CD56bri cells outside the lymphocyte gate (lym) in CD45/SSC dot plot, and SSCbri and/or CD56bri cells are absent in normal specimen; ⑧ In the P2 gate, using SSC medium/CD4dim to set dendritic and monocyte gates, there are low percentage of dendritic cells in normal specimens, which basically coincide with the monocyte gate (mono) in CD45/SSC dot plot; ⑨ In the P2 gate, using CD45dim or –/CD56+ gate to screen CD45dim or –/CD56+ tumor cells, which are absent in normal specimen; ⑩ Simultaneously displaying CD117+cells and lymphocytes, using lymphocytes as an internal control to observe the expression of CD117+ immature myeloid, normal myeloblast do not express CD2, CD3, CD4, CD5, CD7, CD8, and CD56. Various marker combinations are formed by CD2/CD7, CD4/CD3, CD4/CD8, CD3/CD5, CD3/CD56 within the lymphocyte gate (lym). In this specimen, T cells are predominant in the lymphocytes gate (lym), and the positive expressions of CD3 and CD5 are basically the same, which are divided into two parts: CD4+/CD8− and CD4−/CD8+, the ratio is 1 (the normal range is 0.5 to 2.5). The expressions of CD2 and CD7 are basically the same, including CD3+/CD5+ T cells and CD3−/CD56+ NK cells. NK cells account for 15% of lymphocytes and express CD3−/CD5−/CD2+/CD7+/CD4−/CD8 partial dim.

Figure 2:
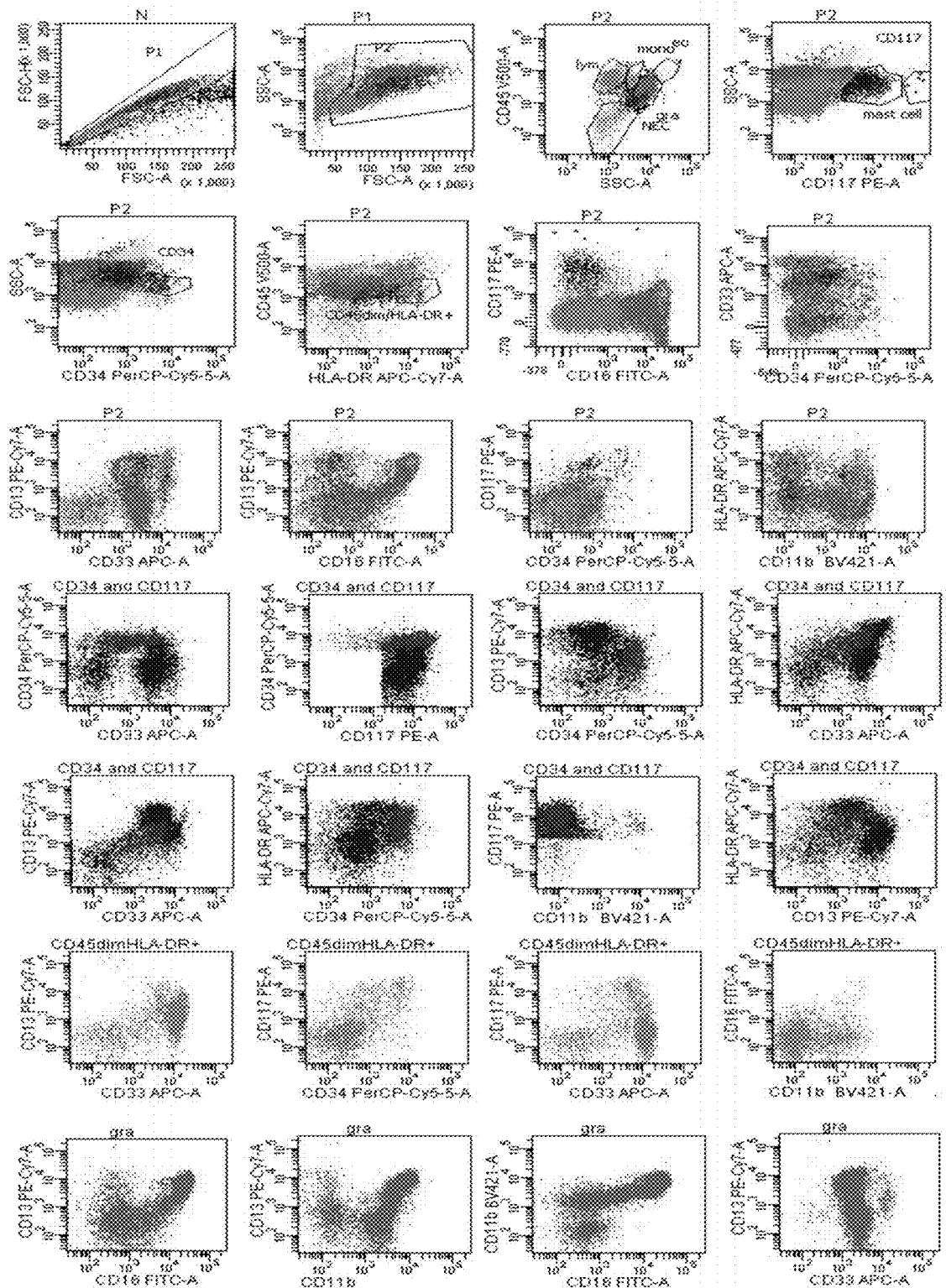

FIG. 2 shows the analysis result of tube II in normal bone marrow specimen. Set in order: ① Using FSC-A/H to set the single (nonadherent) cell gate P1, and obtain the single cells; ② Using FSC/SSC to set the live cell gate P2, and obtain the single live cells; ③ In the P2 gate, using CD45/SSC to set blood cell gates, and obtain lymphocytes (lym), granulocytes (Gra), monocytes (mono), nucleated erythrocytes (NEC), and eosinophil (eo) gates, respectively; ④ In the P2 gate, using CD117/SSC to set the immature myeloid gate; ⑤ In the P2 gate, using CD117bri/SSC to set mast cell gate; ⑥ In the P2 gate, using CD34bri/SSC medium and HLA-DR/CD45dim to set progenitor cell gates; ⑦ In the P2 gate, using CD11b/HLA-DR to correct the monocyte gate and confirm that the CD11b+/HLA-DR+ cells are all within the monocyte gate (mono) in CD45/SSC dot plot; ⑧ Simultaneously observing CD34+ and CD117+, progenitor and immature myeloids, which shows that CD34+/SSC medium in normal specimens is only found in myeloblasts, the proportion of CD34 positive cells is lower than that of CD117+ and HLA-DR+/CD45dim immature myeloid, CD13/CD33, CD34/CD13, CD33/CD34, HLA-DR/CD34, CD13/HLA-DR, CD33/HLA-DR and CD34/CD117 show characteristically continuous expression similar to this specimen, and almost do not express CD11b; ⑨ Observing CD45dim/HLA-DR+ immature cells and confirm that they are basically consistent with CD117+ immature myeloid (some cases may have some B progenitor cells besides CD117+ cells), without aberrant loss of CD34 and/or CD117 on myeloblasts, and CD33/CD13, CD34/CD117, and CD33/CD117 exhibit characteristically continuous expression on immature myeloid; ⑩ Observing the cells in the granulocyte gate (Gra) in CD45/SSC dot plot, and the expression patterns of CD11b/CD13, CD16/CD13, CD16/CD11b, and CD33/CD13 all show characteristically continuous expression. All normal specimens will show an immunophenotype similar to this one.

Figure 3:
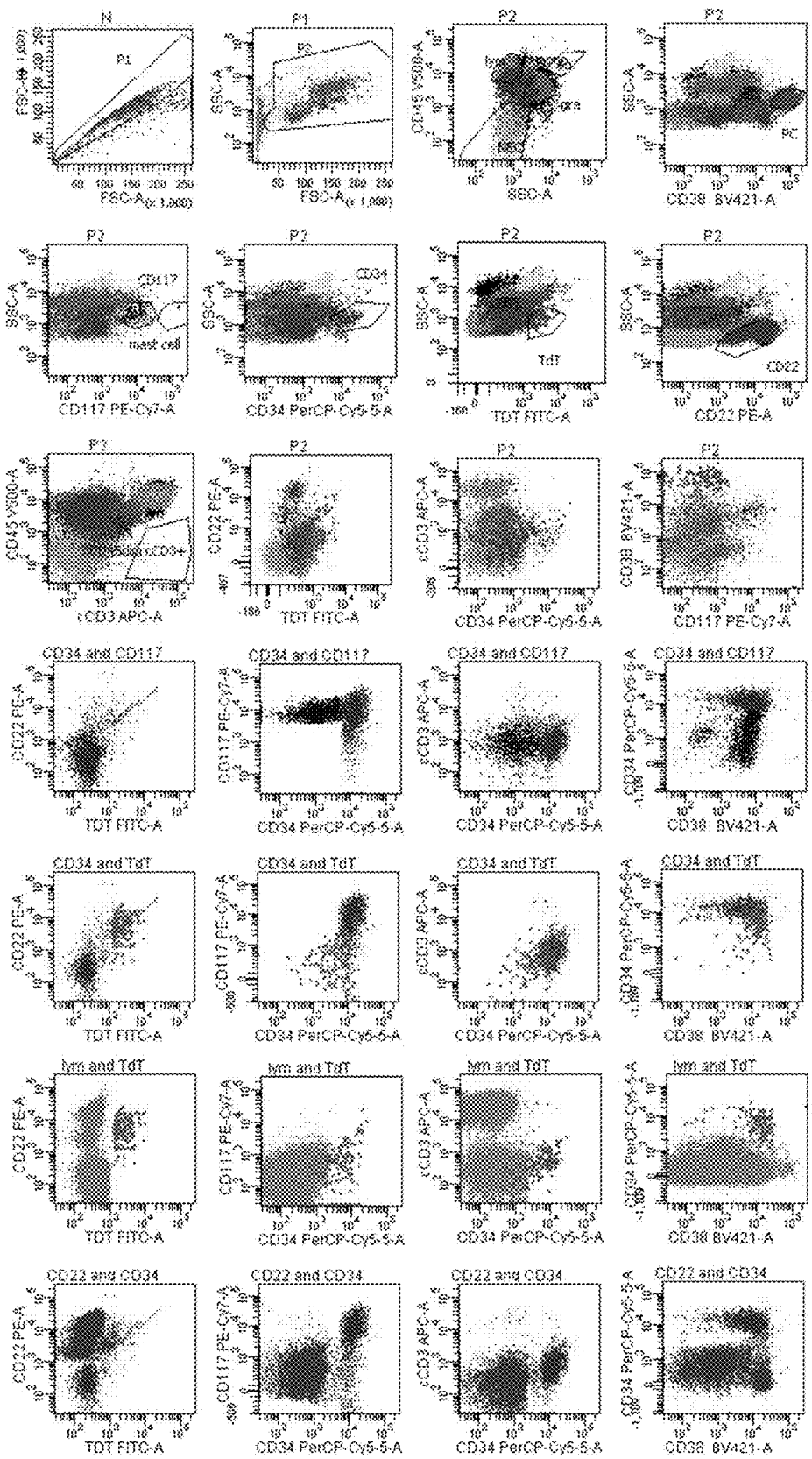

FIG. 3 shows the analysis result of tube III in normal bone marrow specimen. Set in order: ① Using FSC-A/H to set the single (nonadherent) cell gate P1, and obtain the single cells; ② Using FSC/SSC to set the live cell gate P2, and obtain the single live cells; ③ In the P2 gate, using CD45/SSC to set blood cell gates, and obtain lymphocytes (lym), granulocytes (Gra), monocytes (mono), nucleated erythrocytes (NEC), and eosinophil (eo) gates, respectively; ④ In the P2 gate, using CD117/SSC to set the immature myeloid gate; ⑤ In the P2 gate, using CD117bri/SSC to set mast cell gate; ⑥ In the P2 gate, using CD34+/SSC to set the blast gate; ⑦ In the P2 gate, using TdT/SSC to set the lymphoblast gate; ⑧ In the P2 gate, using CD22/SSC to set the B cell gate; ⑨ In the P2 gate, using CD45/cCD3 to observe whether there are cCD3+ cells outside the lymphocyte gate (lym) in CD45/SSC dot plot, CD45dim/cCD3+ cells should especially be paid attention to, which are absent in normal specimen; ⑩ Simultaneously observing CD34+ and CD117+ cells, most of them are CD38+ myeloblast, CD34+ is a subset of CD117+ cells, and does not express cCD3, CD22 and TdT; ⑪ Simultaneously observing the lymphocyte gate (lym) and TdT+ cells, which shows that the TdT+ cells in normal bone marrow specimens are all CD34dim/CD22+/CD38+ B-lineage blasts, and do not express CD117 and cCD3; ⑫ Simultaneously observing CD22+B cells and CD34+/SSC (moderately high) myeloblast, which shows that among CD22+ B cells, most of them are CD34−/TdT−/CD38− cells in middle and late stages, a few of them are CD34dim/TdT+/CD38+ cells, the CD34+/SSC (moderately high) is mainly CD117+/cCD3−/CD22−/TdT− myeloblast, and their CD34/CD38 expression shows characteristic expression with CD38 positive on most cells and smearly positive on a small subset.

Figure 4:
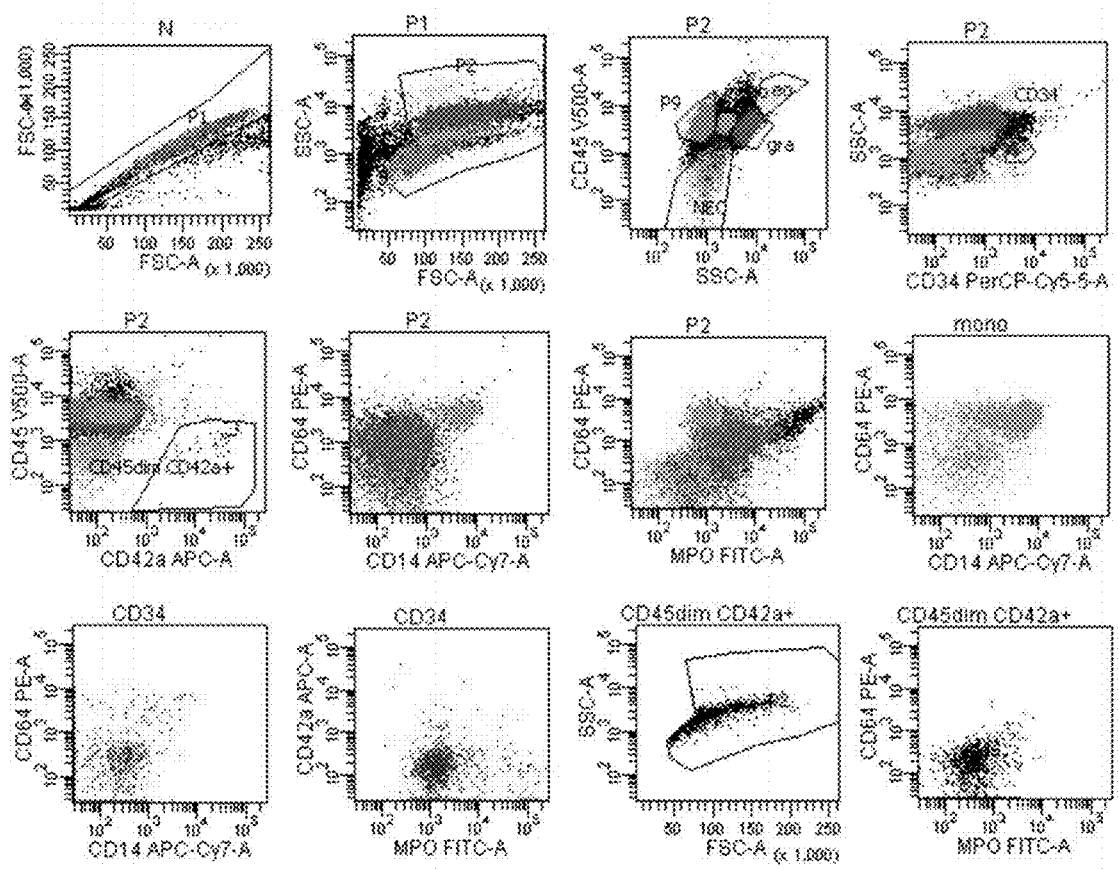

FIG. 4 shows the analysis result of tube IV in normal bone marrow specimen. Set in order: ① Using FSC-A/H to set the single (nonadherent) cell gate P1, and obtain the single cells; ② Using FSC/SSC to set the live cell gate P2, and obtain the single live cells; ③ In the P2 gate, using CD45/SSC to set blood cell gates, and obtain lymphocytes (lym), granulocytes (Gra), monocytes (mono), nucleated erythrocytes (NEC), and eosinophil (eo) gates, respectively; ④ In the P2 gate, using CD34+/SSC medium to set blast cell gates; ⑤ In the P2 gate, using CD42a/CD45 to set platelet/megakaryocyte gate; ⑥ In the P2 gate, using MPO/CD64, CD14/CD64 to correct the granulocyte gate (Gra) and monocyte gate (mono) in CD45/SSC dot plot, determine the granulocyte with moderate expression of MPO+/CD64+, and the monocyte are CD14+/CD64bri; ⑦ making sure that the cells in the monocyte gate are mainly CD14+/CD64bri cells, without CD14 negative cells; ⑧ Observing CD34+ cells which do not express MPO, CD64, CD42a, and CD14; ⑨ Observing that CD45dim/CD42a+ cells don't have center, with small FSC/SSC, and do not express MPO and CD64.

Figure 5:
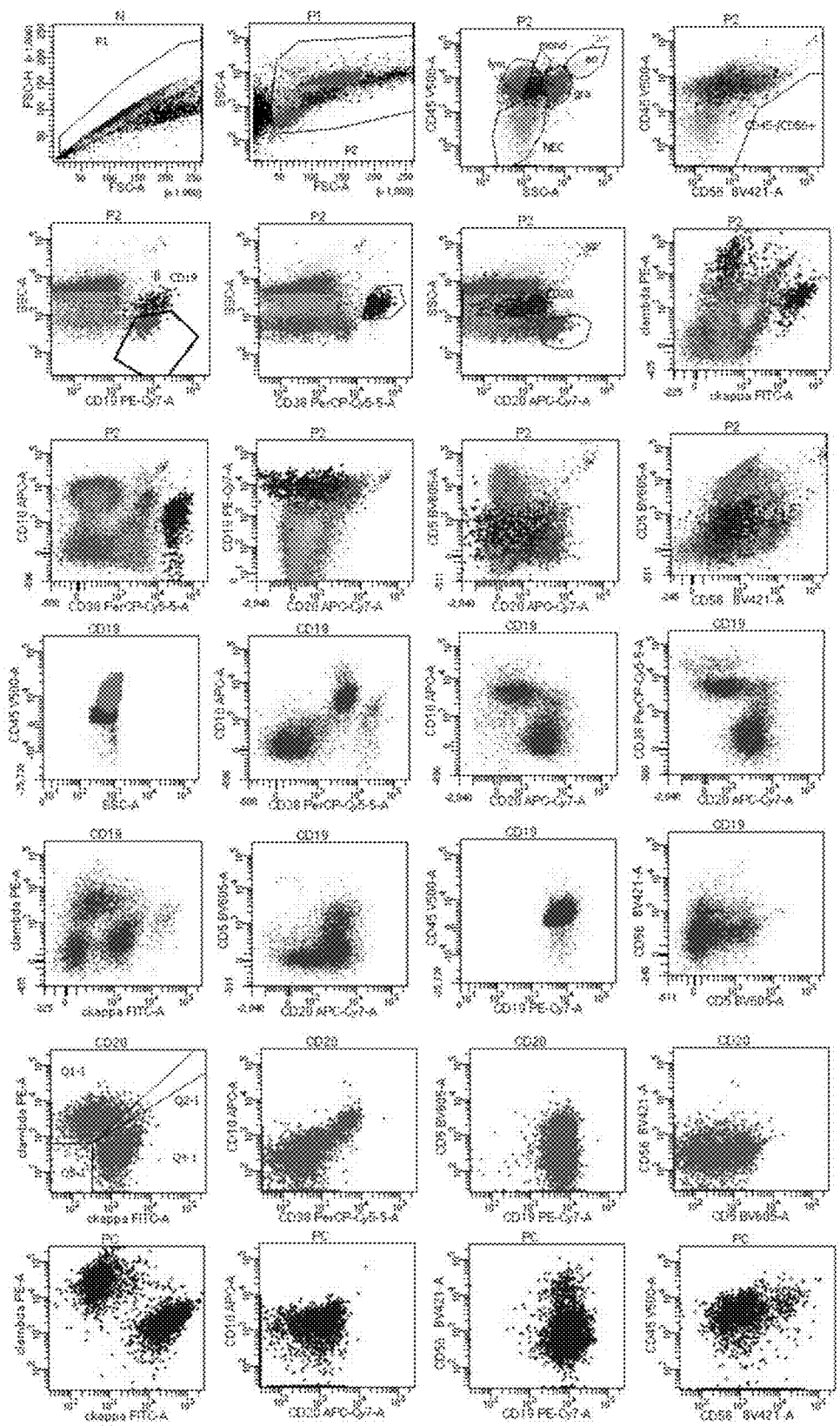

FIG. 5 shows the analysis result of tube V in normal bone marrow specimen from patients older than 30 years old. Set in order: ① Using FSC-A/H to set the single (nonadherent) cell gate P1, and obtain the single cells; ② Using FSC/SSC to set the live cell gate P2, and obtain the single live cells; ③ In the P2 gate, using CD45/SSC to set blood cell gates, and obtain lymphocytes (lym), granulocytes (Gra), monocytes (mono), nucleated erythrocytes (NEC), and eosinophil (eo) gates, respectively; ④ In the P2 gate, using CD19/SSC to set B cell gate; ⑤ In the P2 gate, using CD20/SSC to set the mature B cell gate; ⑥ In the P2 gate, using CD38bri/SSC and/or CD38bri/CD45 to set the plasma cell gate; ⑦ In the P2 gate, using CD45dim or −/CD56+ gate to determine the absence of such cells; ⑧ In CD19+ B cell gate, normal proliferative B progenitor cells can be seen, CD45/SSC, CD38/CD10, CD20/CD10, CD38/CD20, and CD45/CD19 show characteristically continuous expression, CD5 and CD56 are not expressed, cκ and cλ are not expressed in the early stage, and separately expressed in the mature stage; ⑨ In the CD20+ mature B cell gate, cκ/cλ=1.1, CD5 and CD56 are not expressed, CD10 and CD38 are weakly expressed until negative, which are normal mature B cells; ⑩ In the CD38bri plasma cell gate, cκ/cλ=1.2, CD19 and CD45 are expressed, but without CD5, CD56, CD10, and CD20, which are normal plasma cells.

FIG. 6 to FIG. 10 shows the immunophenotypings of tube I to tube V from the same AML patient.

Figure 6:
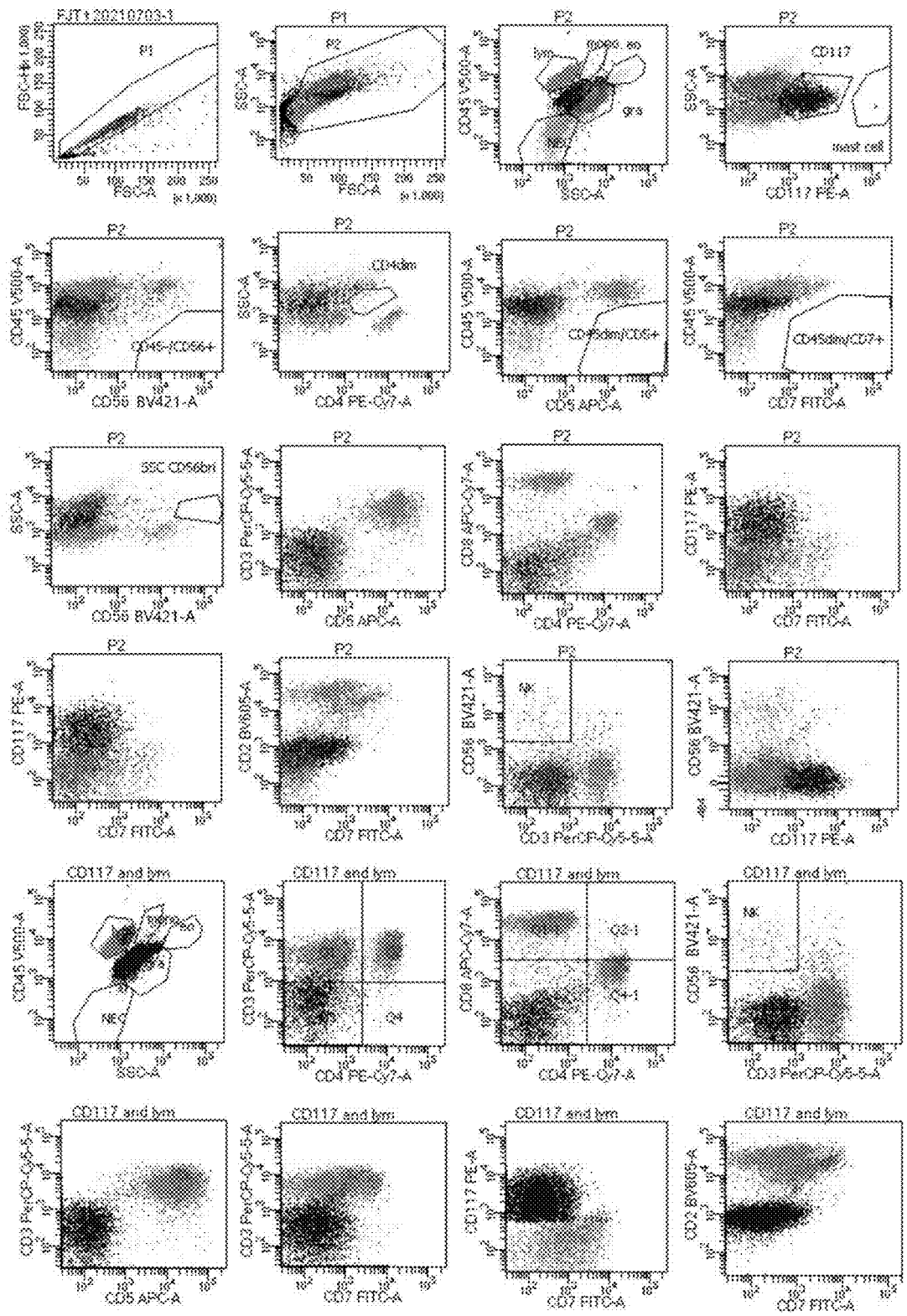
FIG. 6 to FIG. 10 show the five tube results of flow cytometry gating analysis from the same bone marrow specimen of acute myeloid leukemia (AML) case according to an embodiment of the present disclosure.

FIG. 6 shows the analysis result of tube I in bone marrow specimen from the AML patient. Set in order: ① Using FSC-A/H to set the single (nonadherent) cell gate P1, and obtain the single cells; ② Using FSC/SSC to set the live cell gate P2, and obtain the single live cells; ③ In the P2 gate, using CD45/SSC to set blood cell gates, and obtain lymphocytes (lym), granulocytes (Gra), monocytes (mono), nucleated erythrocytes (NEC), and eosinophil (eo) gates, respectively; ④ In the P2 gate, using CD117/SSC to set the immature myeloid gate, cells in which occupy 20.9% of nuclear cells, with a significantly higher proportion than normal and located in the blast hole of the CD45/SSC dot plot; ⑤ In the P2 gate, using CD117 bri/SSC to set mast cell gate; ⑥ In the P2 gate, using CD45/CD7 and CD45/CD5 to correct the lymphocyte gate (lym) to determine the absence of CD45dim/CD7+ and CD45dim/CD5+ cells; ⑦ In the P2 gate, using SSC/CD56 to determine the absence of SSCbri and/or CD56bri cells; ⑧ In the P2 gate, using SSC medium/CD4dim to set the dendritic cell and monocyte gates, which basically coincides with the monocyte gate (mono) in CD45/SSC dot plot; ⑨ In the P2 gate, using CD45dim or −/CD56+ gate to determine the absence of CD45dim or −/CD56+ tumor cells; ⑩ Simultaneously displaying CD117+cells and lymphocytes, using lymphocytes as an internal control, to observe the expression of CD117+ immature myeloid, which shows that lymphocyte subsets are basically normal, the proportion of CD117+ malignant myeloblast is high, without expression of CD2, CD3, CD4, CD5, CD7, CD8, and CD56.

Figure 7:
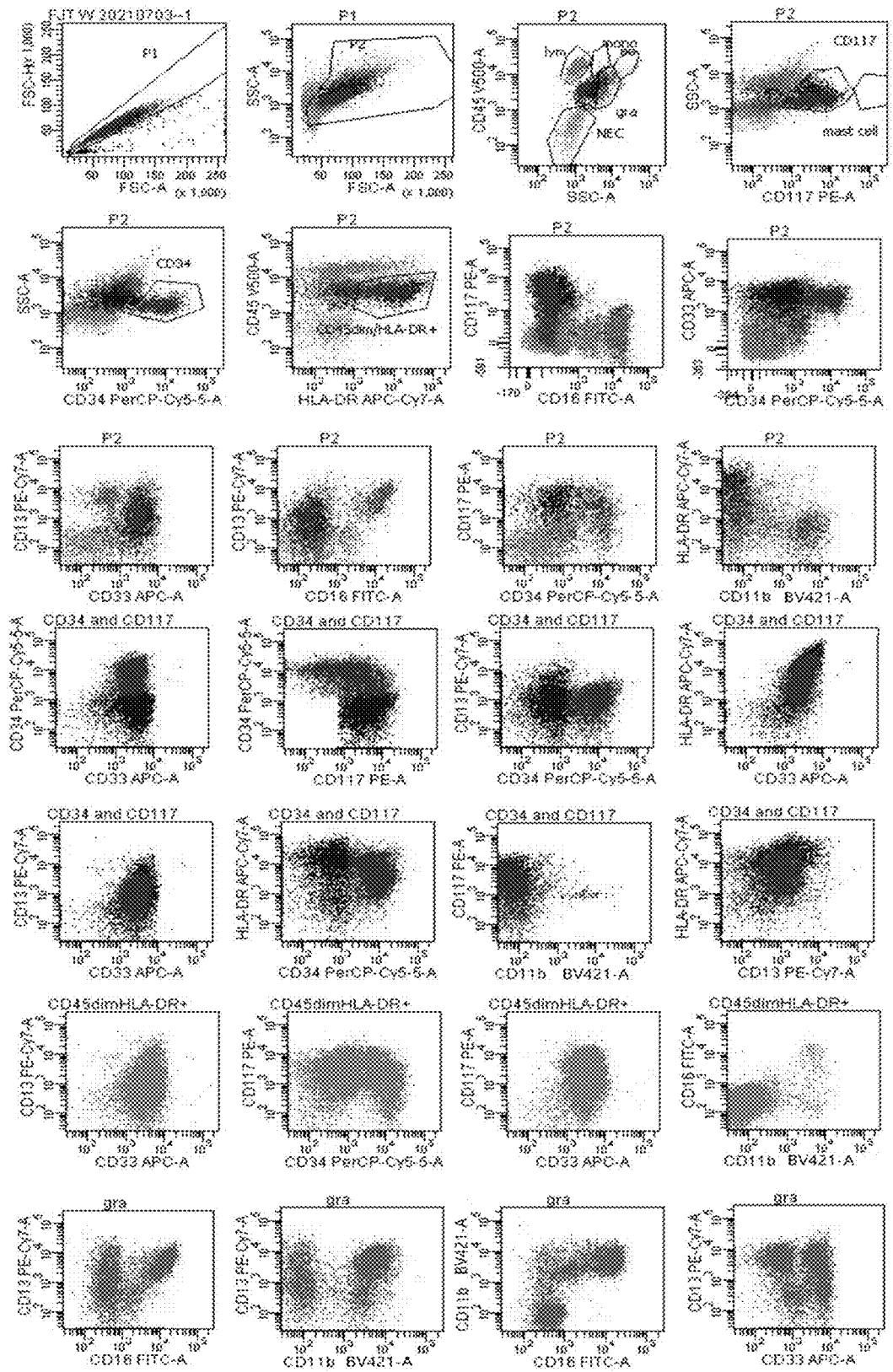

FIG. 7 shows the analysis result of tube II in the AML bone marrow specimen. Set in order: ① Using FSC-A/H to set the single (nonadherent) cell gate P1, and obtain the single cells; ② Using FSC/SSC to set the live cell gate P2, and obtain the single live cells; ③ In the P2 gate, using CD45/SSC to set blood cell gates, and obtain lymphocytes (lym), granulocytes (Gra), monocytes (mono), nucleated erythrocytes (NEC), and eosinophil (eo) gates, respectively; ④ In the P2 gate, using CD117/SSC to set the immature myeloid gate, a significantly increased proportion of malignant myeloblast can be seen in the blast hole on the CD45/SSC dot plot; ⑤ In the P2 gate, using CD117 bri/SSC to set mast cell gate; ⑥ In the P2 gate, using CD34/SSC medium and HLA-DR/CD45dim to set immature cell gate; ⑦ In the P2 gate, using CD11b/HLA-DR to correct monocyte gate, to determine that CD11b+/HLA-DR+ cells are all within the monocyte gate (mono) in CD45/SSC dot plot; ⑧ Simultaneously observing CD34+ and CD117+ immature cells, malignant myeloblasts express CD117, CD13, CD33, and HLA-DR, partially express CD34, but do not express CD16 and CD11b; ⑨ CD45dim/HLA-DR+ cells are gated to confirm the expression of malignant immature myeloid again; ⑩ Observing the cells in the granulocyte gate (Gra) in CD45/SSC dot plot, and CD11b/CD13, CD16/CD13, CD16/CD11b and CD33/CD13 all show abnormal development patterns different from normal cells.

Figure 8:
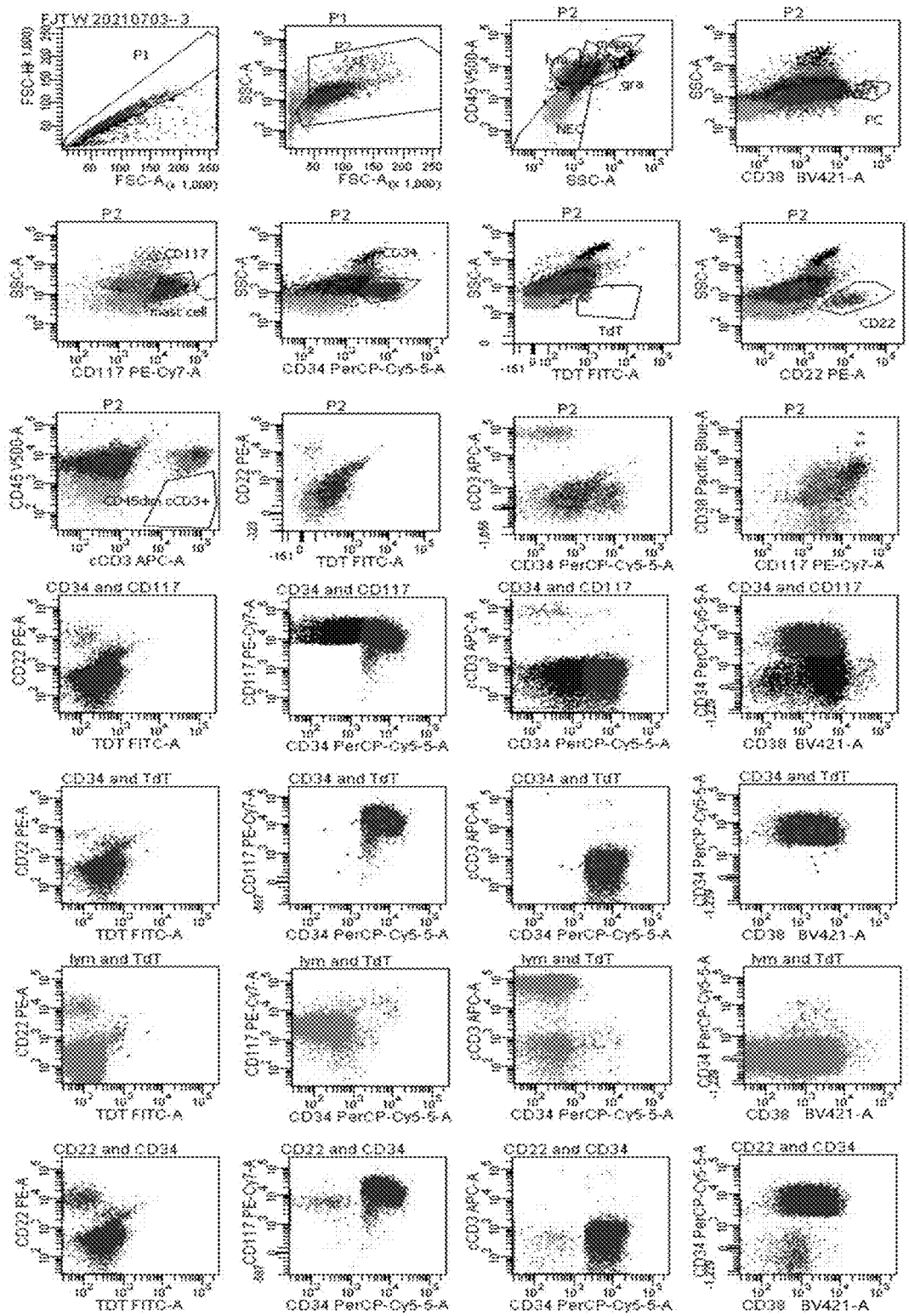

FIG. 8 shows the analysis result of tube III in the AML bone marrow specimen. Set in order: ① Using FSC-A/H to set the single (nonadherent) cell gate P1, and obtain the single cells; ② Using FSC/SSC to set the live cell gate P2, and obtain the single live cells; ③ In the P2 gate, using CD45/SSC to set blood cell gates, and obtain lymphocytes (lym), granulocytes (Gra), monocytes (mono), nucleated erythrocytes (NEC), and eosinophil (eo) gates, respectively; ④ In the P2 gate, using CD117/SSC to set the malignant immature myeloid gate; ⑤ In the P2 gate, using CD117bri/SSC to set the mast cell gate; ⑥ In the P2 gate, using CD34+/SSC medium to set the blast cell gate; ⑦ In the P2 gate, using TdT/SSC to set the lymphoblast gate; ⑧ In the P2 gate, using CD22/SSC to set the B cell gate; ⑨ In the P2 gate, using CD45/cCD3 to confirm that there are no cCD3+ cells outside the lymphocyte gate (lym) in CD45/SSC dot plot, there are no CD45dim/cCD3+ cells; ⑩ Malignant immature myeloid express CD117 and CD38, partially express CD34, but do not express CD22, TdT, and cCD3; ⑪ Simultaneously observing the lymphocyte gate (lym) and TdT+ cells, without obvious abnormality; ⑫ Observing the CD22+B cells, without obvious abnormality.

Figure 9:
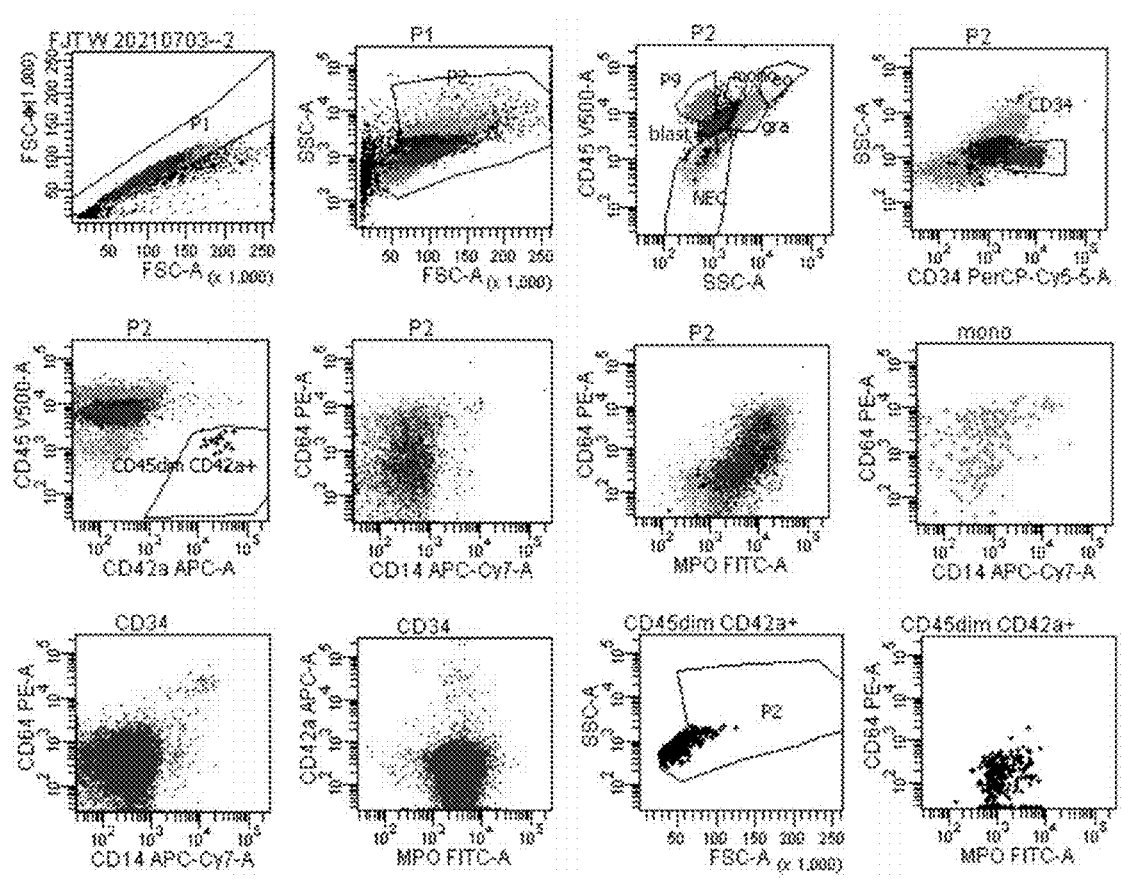

FIG. 9 shows the analysis result of tube IV in the AML bone marrow specimen. Set in order: ① Using FSC-A/H to set the single (nonadherent) cell gate P1, and obtain the single cells; ② Using FSC/SSC to set the live cell gate P2, and obtain the single live cells; ③ In the P2 gate, using CD45/SSC to set blood cell gates, and obtain lymphocytes (lym), granulocytes (Gra), monocytes (mono), nucleated erythrocytes (NEC), and eosinophil (eo) gates, respectively; Compared with normal specimens, a group of blast is found in the blast hole of CD45/SSC dot plot in this specimen. Blast gate is set by CD45dim/SSCdim. The tumor cells are in the same position in CD45/SSC dot plot as the malignant myeloblast in FIG. 6 to FIG. 8, and partially express MPO, CD64, and CD34, but do not express CD14 and CD42a; ④ In the P2 gate, using CD34+/SSC medium to set blast gates; ⑤ In the P2 gate, using CD42a/CD45 to set the platelet/megakaryocyte gate; ⑥ In the P2 gate, using MPO/CD64 and CD14/CD64 to modify the granulocyte gate (Gra) and the monocyte gate (mono) set by CD45/SSC; ⑦ It is observed that cells in the monocyte gate are mainly CD14−/CD64+ abnormal immature monocytes; ⑧ Observing CD34+ cells, not expressing MPO, CD64, CD42a, and CD14; ⑨ Observing CD45dim/CD42a+ cells, mainly platelets.

Figure 10:
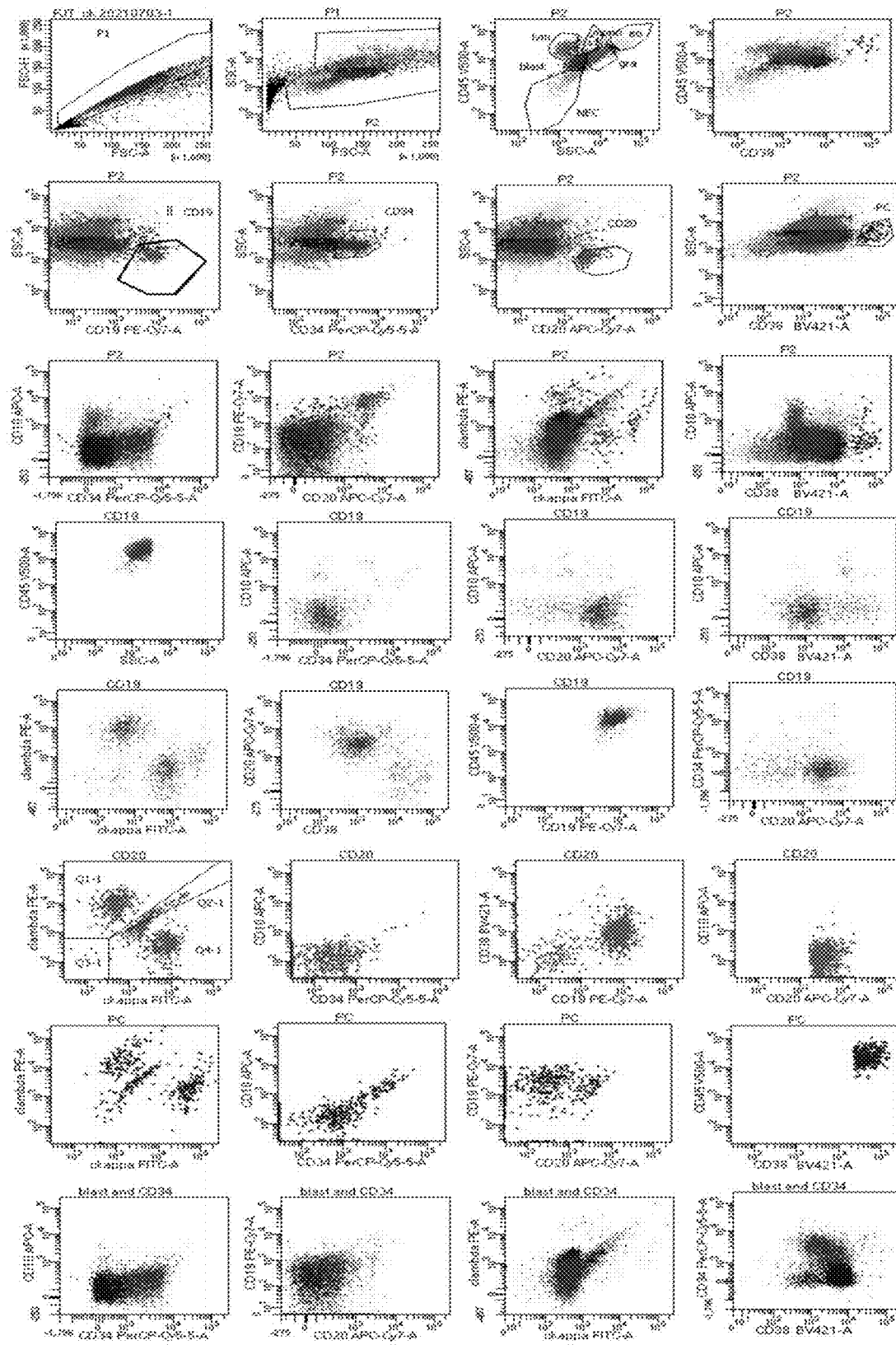

FIG. 10 shows the analysis result of tube V in the AML bone marrow specimen from patient younger than 30 years old. Set in order: ① Using FSC-A/H to set the single (nonadherent) cell gate P1, and obtain the single cells; ② Using FSC/SSC to set the live cell gate P2, and obtain the single live cells; ③ In the P2 gate, using CD45/SSC to set blood cell gates, and obtain lymphocytes (lym), granulocytes (Gra), monocytes (mono), nucleated erythrocytes (NEC), eosinophil (eo), and obvious blast gates, respectively; cells in blast gate express CD38, partially express CD34, not express CD19, CD20, CD10, cκ, and cλ; ④ In the P2 gate, using CD19/SSCdim to set the B cell gate; ⑤ In the P2 gate, using CD20/SSCdim to set the mature B cell gate; ⑥ In the P2 gate, using CD38bri/SSC and/or CD38bri/CD45 to set the plasma cell gate; ⑦ In the P2 gate, using CD34/SSC to set the blast cell gate; ⑧ Mature B cells are mainly in the CD19+B cell gate, which are normal polyclonal cells; ⑨ Normal mature B cells are in the CD20+ mature B cell gate; ⑩ Normal plasma cells are in the CD38bri plasma cell gate.

FIG. 11 to FIG. 15 are the immunophenotyping of the tube I to tube V in bone marrow specimens from patients with the same FCγ receptor IIIβ gene mutation.

Figure 11:
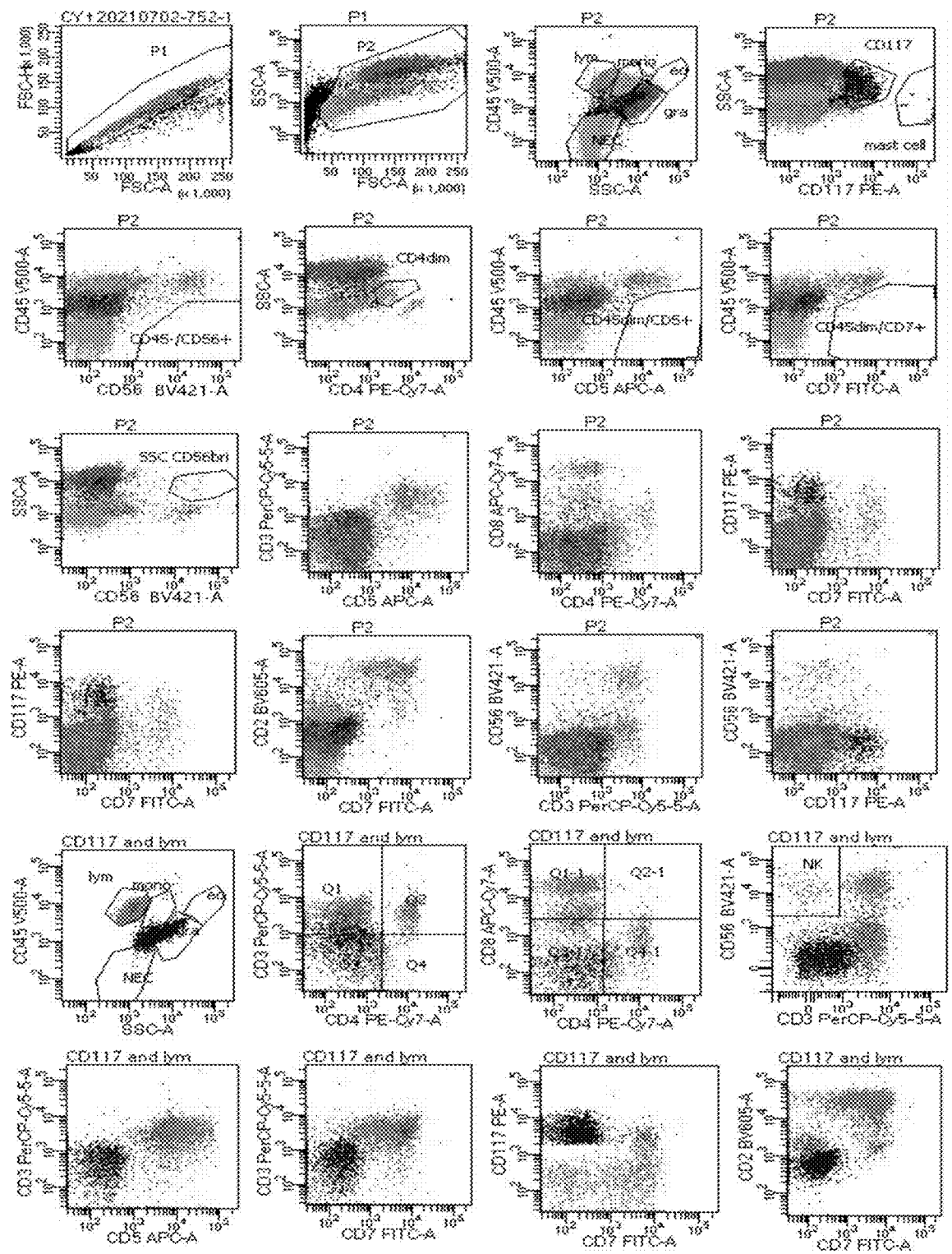
FIG. 11 to FIG. 15 show the five tube results of flow cytometry gating analysis from the same bone marrow specimen of FCγ receptor IIIβ gene mutation case according to an embodiment of the present disclosure.

FIG. 11 shows the analysis result of tube I in bone marrow specimen from the patient with FCγ receptor IIIβ gene mutations. Set in order: ① Using FSC-A/H to set the single (nonadherent) cell gate P1, and obtain the single cells; ② Using FSC/SSC to set the live cell gate P2, and obtain the single live cells; ③ In the P2 gate, using CD45/SSC to set blood cell gates, and obtain lymphocytes (lym), granulocytes (Gra), monocytes (mono), nucleated erythrocytes (NEC), and eosinophil (eo) gates, respectively; ④ In the P2 gate, using CD117/SSC to set the immature myeloid gate; ⑤ In the P2 gate, using CD117bri/SSC to set mast cell gate; ⑥ In the P2 gate, using CD45/CD7 and CD45/CD5 to correct the lymphocyte gate (lym) set by CD45/SSC to confirm that there are no CD45dim/CD7+, CD45dim/CD5+ cells; ⑦ In the P2 gate, using SSC/CD56 to observe to determine the lymphocyte gate (lym) set by CD45/SSC without SSCbri and/or CD56bri cells; ⑧ In the P2 gate, using SSC medium/CD4dim to set the dendritic cell and monocyte gates, which is basically the same as the monocyte gate (mono) set by CD45/SSC; ⑨ In the P2 gate, using the CD45−/CD56+ gate, and there are no CD45dim or −/CD56+ tumor cells; ⑩ CD117+ and lym cells are displayed simultaneously, and lymphocytes are used as internal control to observe the expression of CD117+ immature myeloid, and no obvious abnormality is found in lymphocytes and immature myeloid.

Figure 12:
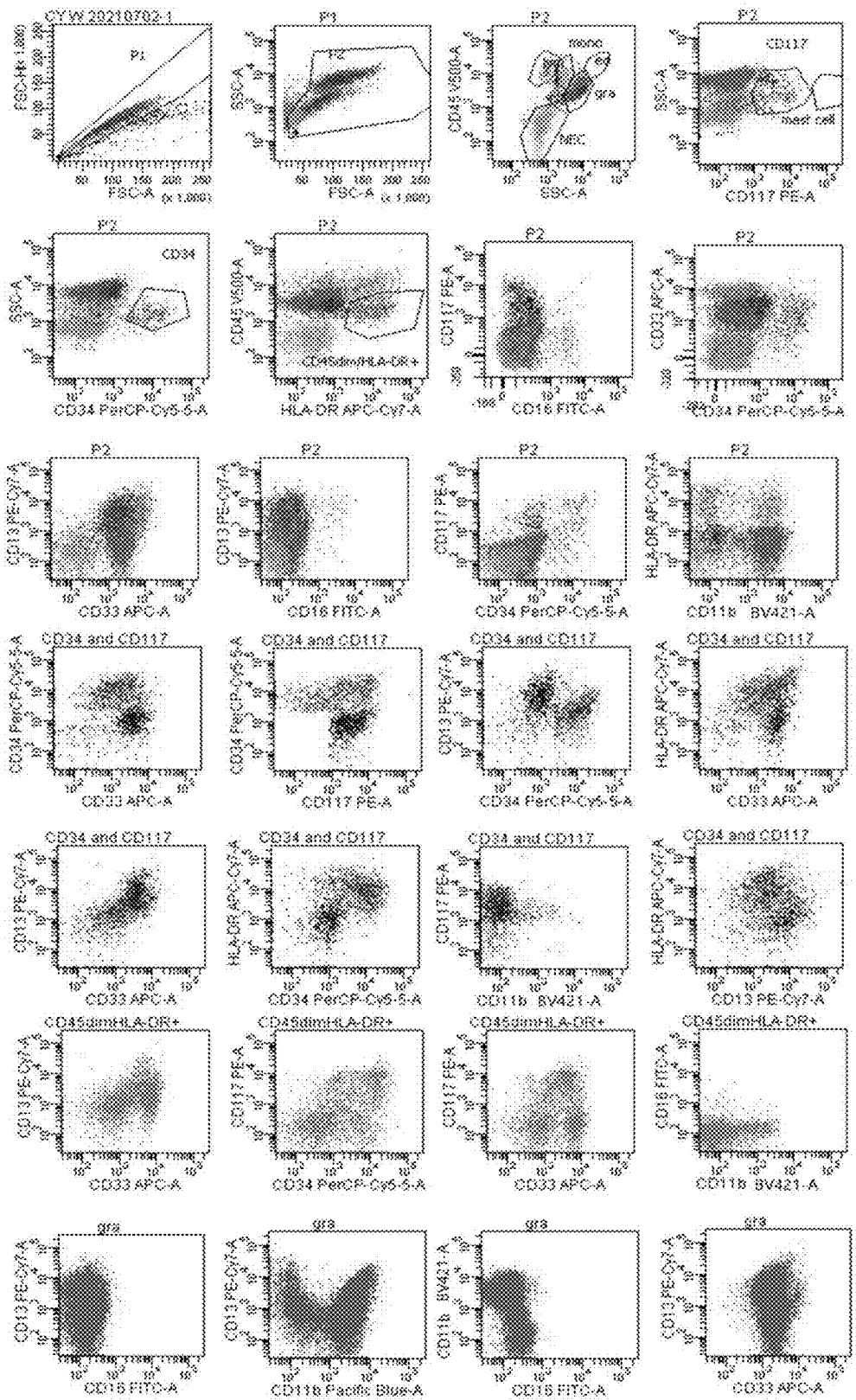

FIG. 12 shows the analysis result of tube II in bone marrow specimen from the patient with FCγ receptor IIIβ gene mutations. Set in order: ① Using FSC-A/H to set the single (nonadherent) cell gate P1, and obtain the single cells; ② Using FSC/SSC to set the live cell gate P2, and obtain the single live cells; ③ In the P2 gate, using CD45/SSC to set blood cell gates, and obtain lymphocytes (lym), granulocytes (Gra), monocytes (mono), nucleated erythrocytes (NEC), and eosinophil (eo) gates, respectively; ④ In the P2 gate, using CD117/SSC to set the immature myeloid gate; ⑤ In the P2 gate, using CD117bri/SSC to set mast cell gate; ⑥ In the P2 gate, using CD34bri/SSC medium and HLA-DR/CD45dim to set immature cell gate; ⑦ In the P2 gate, using CD11b/HLA-DR to correct the monocyte gate, and confirm that the CD11b+/HLA-DR+ cells are all within the monocyte gate (mono) in CD45/SSC dot plot; ⑧ Simultaneously observing CD34+ and CD117+ immature cells, without obvious abnormality; ⑨ Observing the CD45dim/HLA-DR+ immature cells to confirm that they are basically the same as the CD117+ immature myeloid, without obvious abnormality; ⑩ Observing the cells in the granulocyte gate (Gra) set by CD45/SSC, showing that CD11b/CD13 and CD33/CD13 are normal continuous expression, but the granulocytes totally lose CD16.

Figure 13:
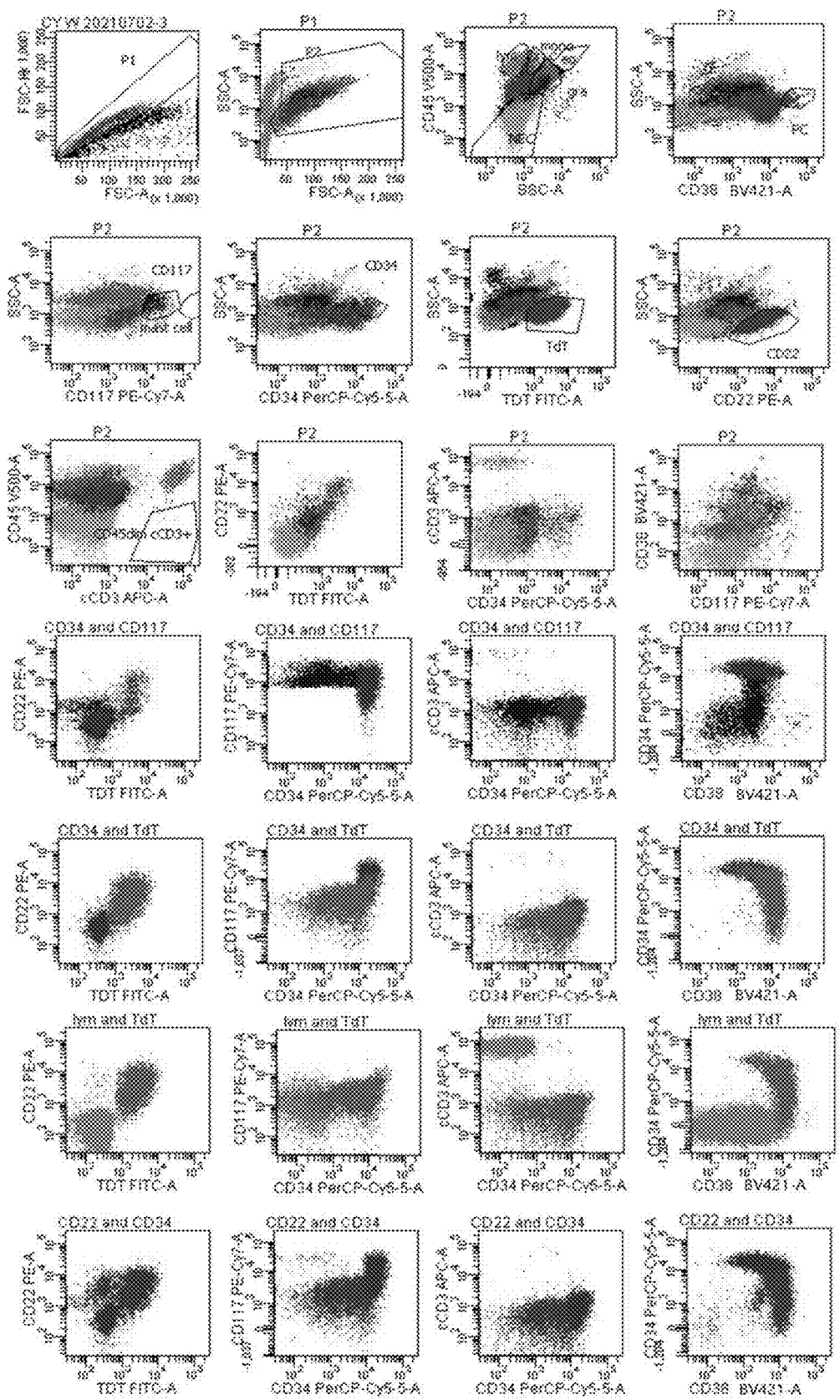

FIG. 13 shows the analysis result of tube III in bone marrow specimen from the patient with FCγ receptor IIIβ gene mutations. Set in order: ① Using FSC-A/H to set the single (nonadherent) cell gate P1, and obtain the single cells; ② Using FSC/SSC to set the live cell gate P2, and obtain the single live cells; ③ In the P2 gate, using CD45/SSC to set blood cell gates, and obtain lymphocytes (lym), granulocytes (Gra), monocytes (mono), nucleated erythrocytes (NEC), and eosinophil (eo) gates, respectively; ④ In the P2 gate, using CD117/SSC to set the immature myeloid gate; ⑤ In the P2 gate, using CD117bri/SSC to set mast cell gate; ⑥ In the P2 gate, using CD34+/SSC medium to set blast cell gate; ⑦ In the P2 gate, using TdT/SSC to set the lymphoblast gate; ⑧ In the P2 gate, using CD22/SSC to set the B cell gate; ⑨ In the P2 gate, using CD45/cCD3 to confirm that there are no cCD3+ cells outside the lymphocyte gate (lym) in CD45/SSC dot plot, there are no CD45dim/cCD3+ cells; ⑩ Simultaneously observing CD34+ and CD117+ cells, finding no obvious abnormality; ⑪ Simultaneously observing the lymphocyte gate (lym) and TdT+ cells, finding no obvious abnormality; ⑫ Simultaneously observing CD22+ B cells and CD34+/SSC middle myeloblast, finding no obvious abnormality.

Figure 14:
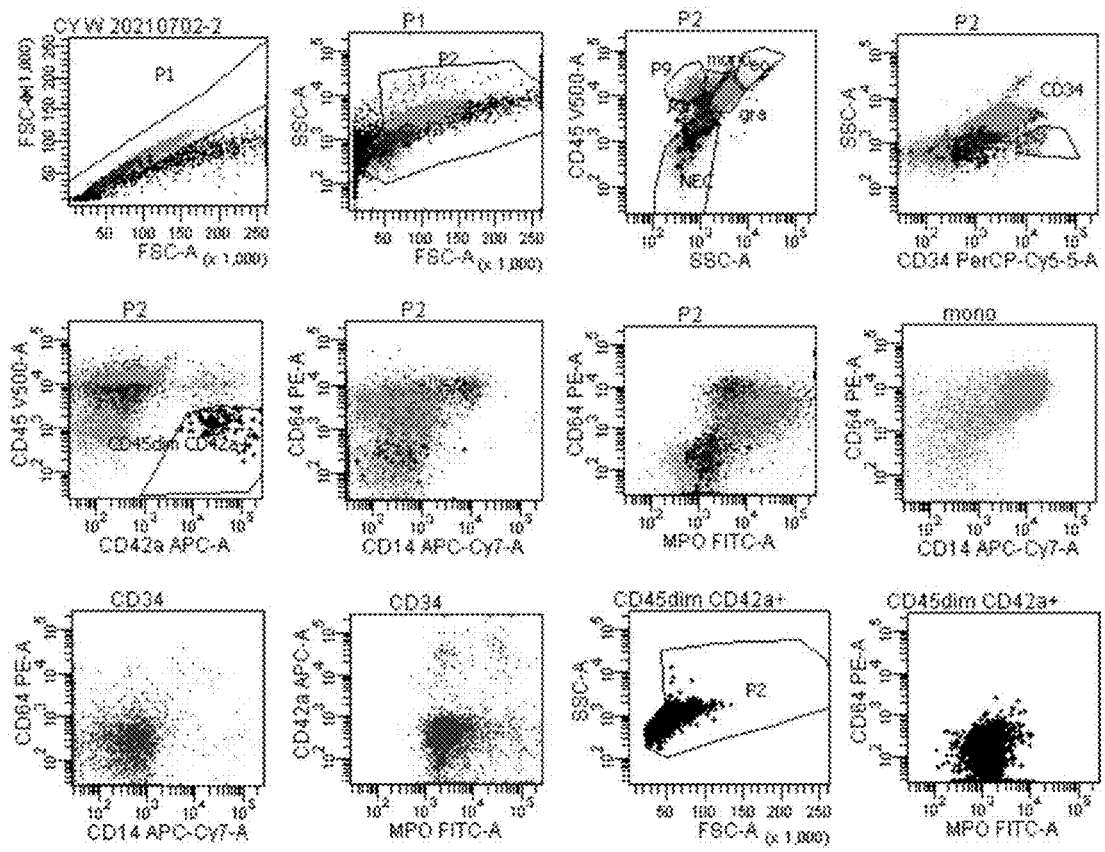

FIG. 14 shows the analysis result of tube IV in bone marrow specimen from the patient with FCγ receptor IIIβ gene mutations. Set in order: ① Using FSC-A/H to set the single (nonadherent) cell gate P1, and obtain the single cells; ② Using FSC/SSC to set the live cell gate P2, and obtain the single live cells; ③ In the P2 gate, using CD45/SSC to set blood cell gates, and obtain lymphocytes (lym), granulocytes (Gra), monocytes (mono), nucleated erythrocytes (NEC), and eosinophil (eo) gates, respectively; ④ In the P2 gate, using CD34+/SSC medium to set blast cell gate; ⑤ In the P2 gate, using CD42a/CD45 to set the platelet/megakaryocyte gate; ⑥ In the P2 gate, using MPO/CD64 and CD14/CD64 to correct the granulocyte gate (Gra) and the monocyte gate (mono) set by CD45/SSC; ⑦ Observing the cells in the monocyte gate are mainly CD14+/CD64bri cells, and confirm that there are no CD14 negative cells; ⑧ Observing CD34+ cells, finding no obvious abnormality; ⑨ Observing that CD45dim/CD42a+ cells are with small FSC/SSC, and do not express MPO and CD64.

Figure 15:
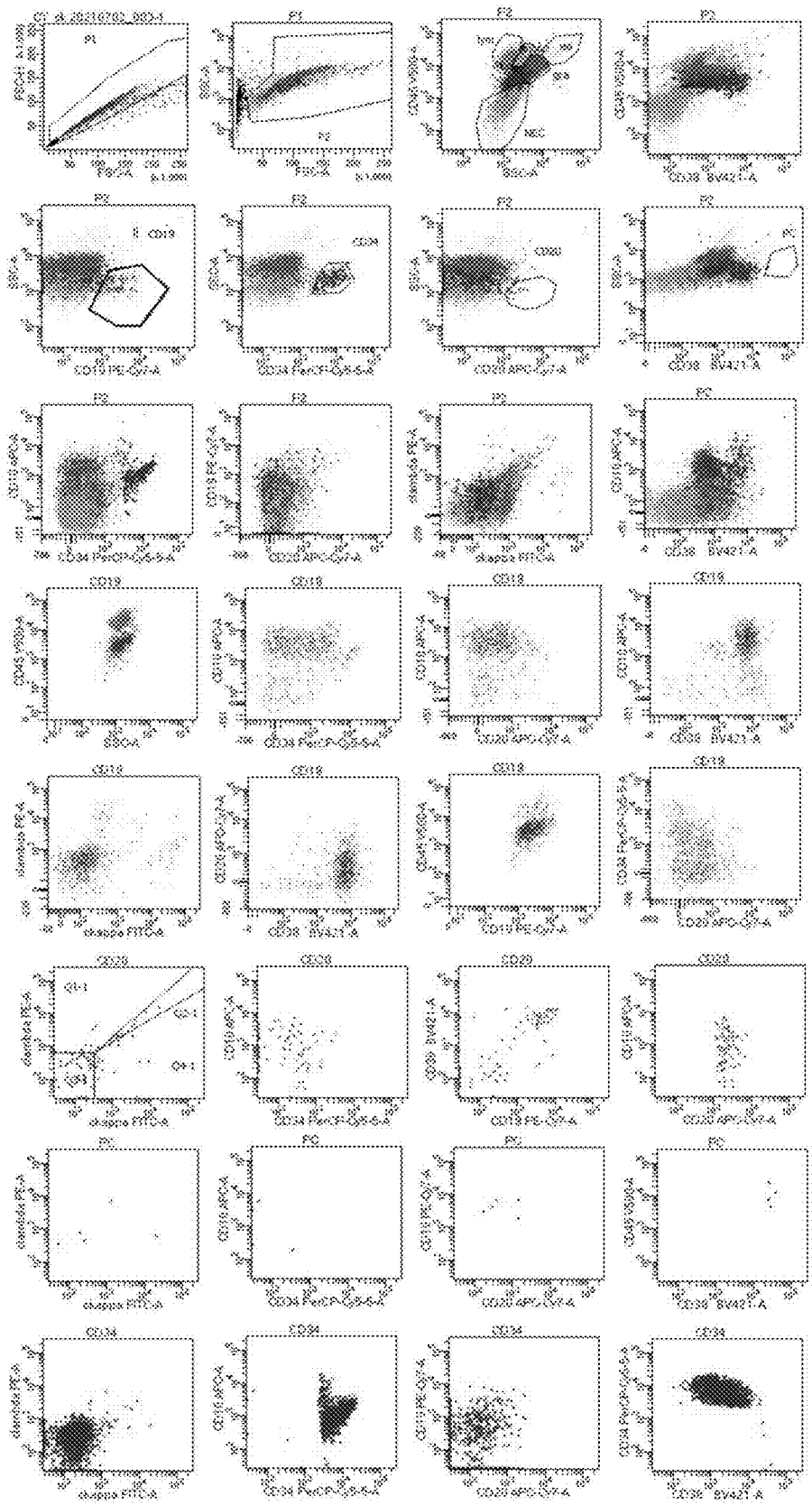

FIG. 15 shows the analysis result of tube V in bone marrow specimen from the patient with FCγ receptor IIIβ gene mutations. Set in order: ① Using FSC-A/H to set the single (nonadherent) cell gate P1, and obtain the single cells; ② Using FSC/SSC to set the live cell gate P2, and obtain the single live cells; ③ In the P2 gate, using CD45/SSC to set blood cell gates, and obtain lymphocytes (lym), granulocytes (Gra), monocytes (mono), nucleated erythrocytes (NEC), and eosinophil (eo) gates, respectively; ④ In the P2 gate, using CD19/SSCdim to set the B cell gate; ⑤ In the P2 gate, using CD20/SSCdim to set the mature B cell gate; ⑥ In the P2 gate, using CD38bri/SSC and/or CD38bri/CD45 to set the plasma cell gate; ⑦ In the P2 gate, using CD34/SSC to set the blast cell gate; ⑧ In the CD19+ B cell gate, normal proliferative B progenitor cells can be seen; ⑨ cells in CD20+ the mature B cells gate are normal mature B cells; ⑩ cells in CD38bri plasma cell gate are normal plasma cells; ⑪ cell in the CD34+ cell gate are mainly CD38 positive cells.

FIG. 16 to FIG. 20 show the immunophenotyping of tube I to tube V in bone marrow specimen from the patient with metastatic carcinoma (neuroblastoma) and MBL.

Figure 16:
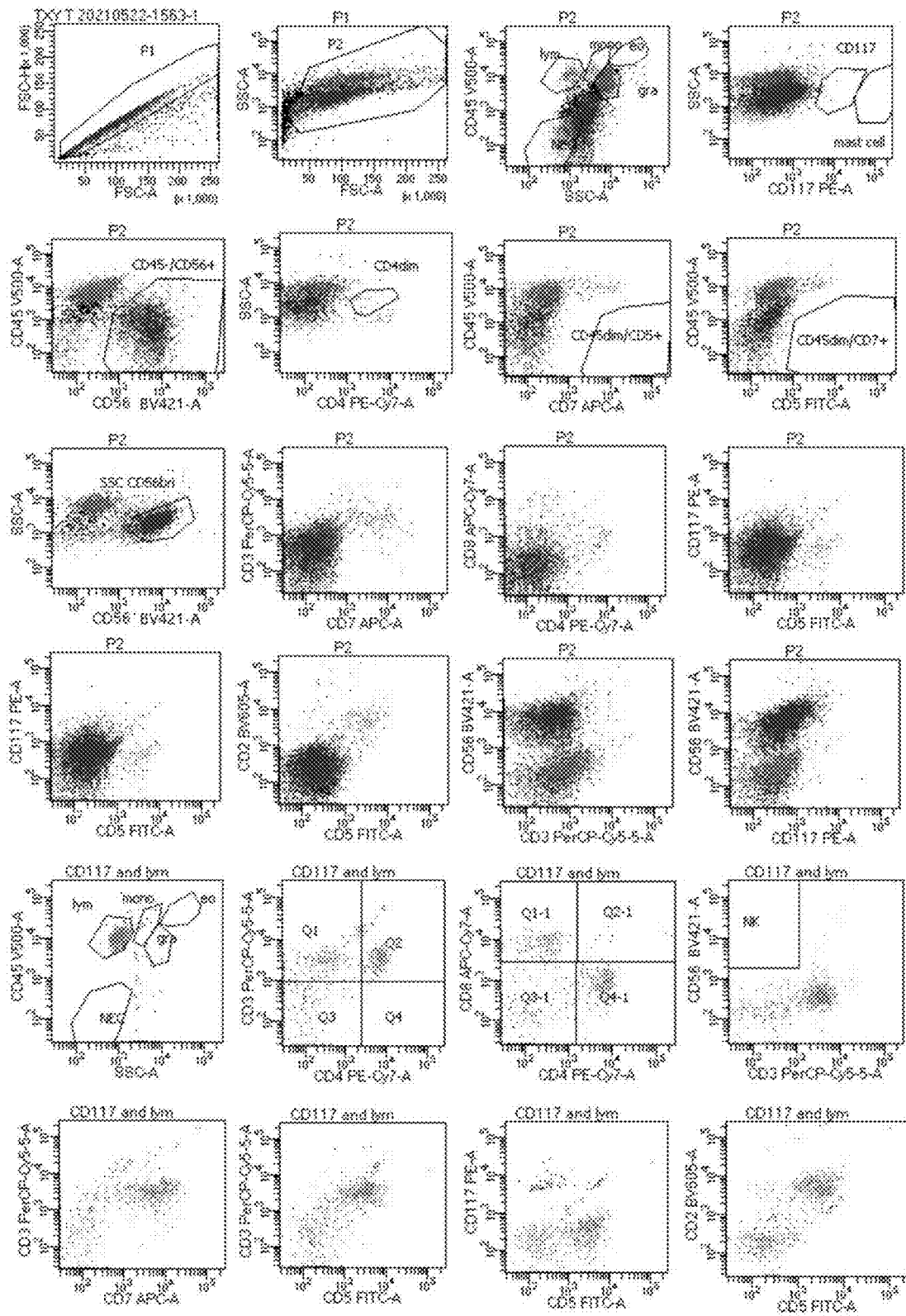
FIG. 16 to FIG. 20 show the five tube results of flow cytometry gating analysis from the same bone marrow specimen of metastatic cancer (neuroblastoma) combined with MBL cases according to an embodiment of the present disclosure.

FIG. 16 shows the analysis result of tube I in bone marrow specimen from the patient with metastatic carcinoma (neuroblastoma) and MBL. Set in order: ① Using FSC-A/H to set the single (nonadherent) cell gate P1, and obtain the single cells; ② Using FSC/SSC to set the live cell gate P2, and obtain the single live cells; ③ In the P2 gate, using CD45/SSC to set the blood cell gate, and obtain lymphocytes (lym), granulocytes (Gra), monocytes (mono), nucleated erythrocytes (NEC), and eosinophil (eo) gates, respectively; ④ In the P2 gate, using CD117/SSC to set the immature myeloid gate; ⑤ In the P2 gate, using CD117bri/SSC to set mast cell gate; ⑥ In the P2 gate, using CD45/CD7 and CD45/CD5 to determine that there are no CD7+ or CD5+ cells outside the lymphocyte gate (lym) in CD45/SSC dot plot, and there are no CD45dim/CD7+, CD45dim/CD5+ cells; ⑦ In the P2 gate, using SSC/CD56 to observe that there are obvious SSCbri/CD56bri tumor cells, which are outside the lymphocyte gate (lym) in CD45/SSC dot plot; ⑧ In the P2 gate, using SSC medium/CD4dim to set dendritic cells and monocyte gates, which is basically the same as the monocyte gate (mono) set by CD45/SSC; ⑨ In the P2 gate, using CD45dim or −/CD56+ to set gate, and CD45−/CD56+ tumor cells are found, occupying 49.8% of nuclear cells. GD2, CD326, and cytokeratin (CK) are further stained, to confirm that GD2 is expressed, but CD326 and CK are not expressed. They are tumor cells of neuromuscular origin, and the possibility of neuroblastoma is high; ⑩ Simultaneously displaying CD117+ cells and lymphocytes, using lymphocytes as an internal control, observing the expression of CD117+ myeloblast, and no obvious abnormality is found in T and NK lymphocytes and myeloblast.

Figure 17:
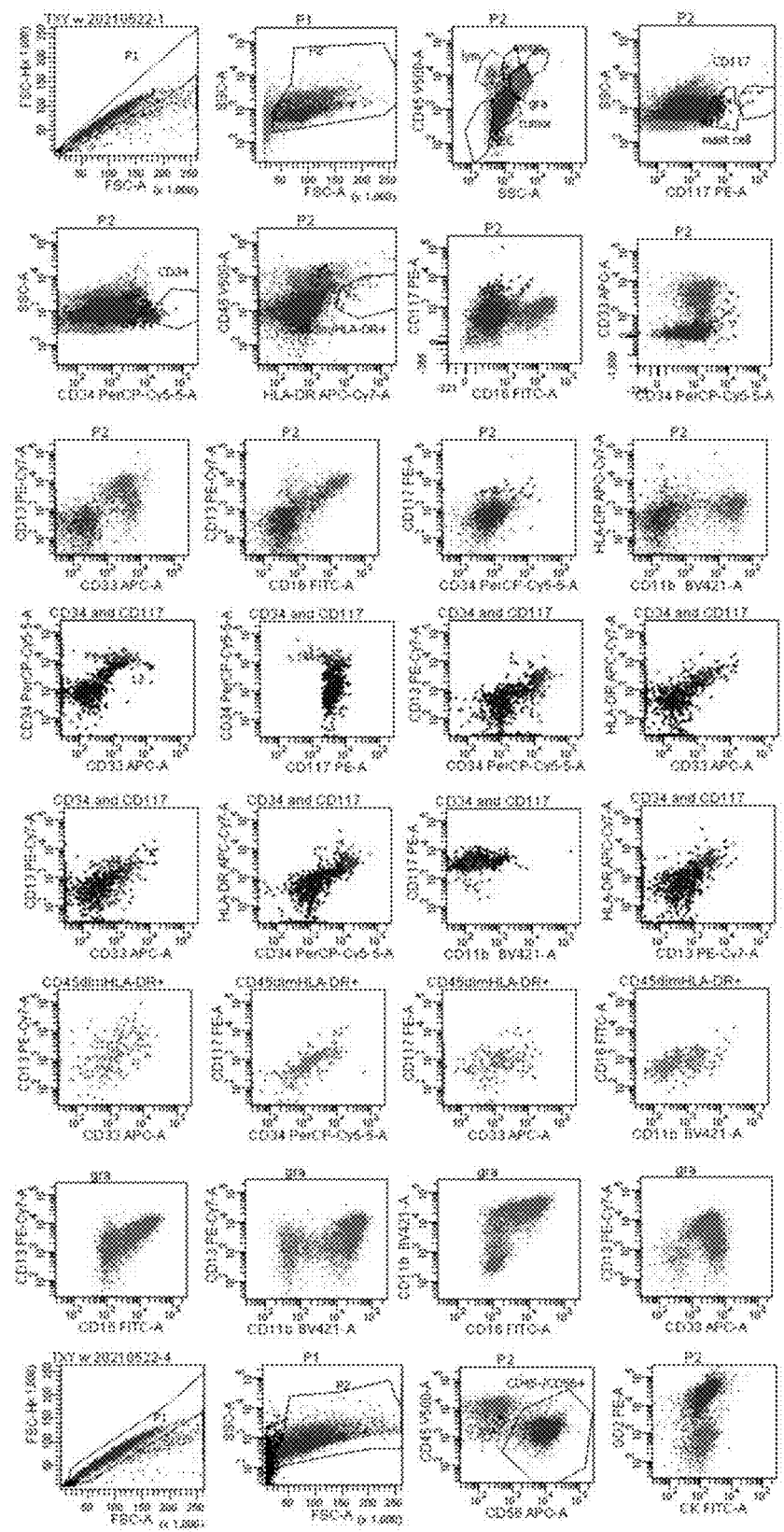

FIG. 17 shows the analysis result of tube II in bone marrow specimen from the patient with metastatic carcinoma (neuroblastoma) and MBL. Set in order: ① Using FSC-A/H to set the single (nonadherent) cell gate P1, and obtain the single cells; ② Using FSC/SSC to set the live cell gate P2, and obtain the single live cells; ③ In the P2 gate, using CD45/SSC to set the blood cell gate, and obtain lymphocytes (lym), granulocytes (Gra), monocytes (mono), nucleated erythrocytes (NEC), and eosinophil (eo) gates, respectively; tumor cells can be seen with CD45 negative/ large SSC, and tumor cell gate (tumor) are set by CD45/ SSC. Maglinant cells are negative for CD34, CD117, HLA-DR, CD16, CD11b, CD13, and CD33; ④ In the P2 gate, using CD117/SSC to set the immature myeloid gate; ⑤ In the P2 gate, using CD117bri/SSC to set mast cell gate; ⑥ In the P2 gate, using CD34/SSC medium and HLA-DR/ CD45dim to set immature cell gate; ⑦ In the P2 gate, using CD11b/HLA-DR to correct the monocyte gate, and confirm that the CD11b+/HLA-DR+ cells are all within the monocyte gate (mono) in CD45/SSC dot plot; ⑧ Observing CD34+ and CD117+ immature cells simultaneously, finding no obvious abnormality; ⑨ Observing the CD45dim/HLA-DR+ immature cells and confirm that they are basically the same as the CD117+ immature myeloid, finding no obvious abnormality; ⑩ Observing the cells in the granulocyte gate (Gra) set by CD45/SSC, finding no obvious dysplasia and abnormal expression.

Figure 18:
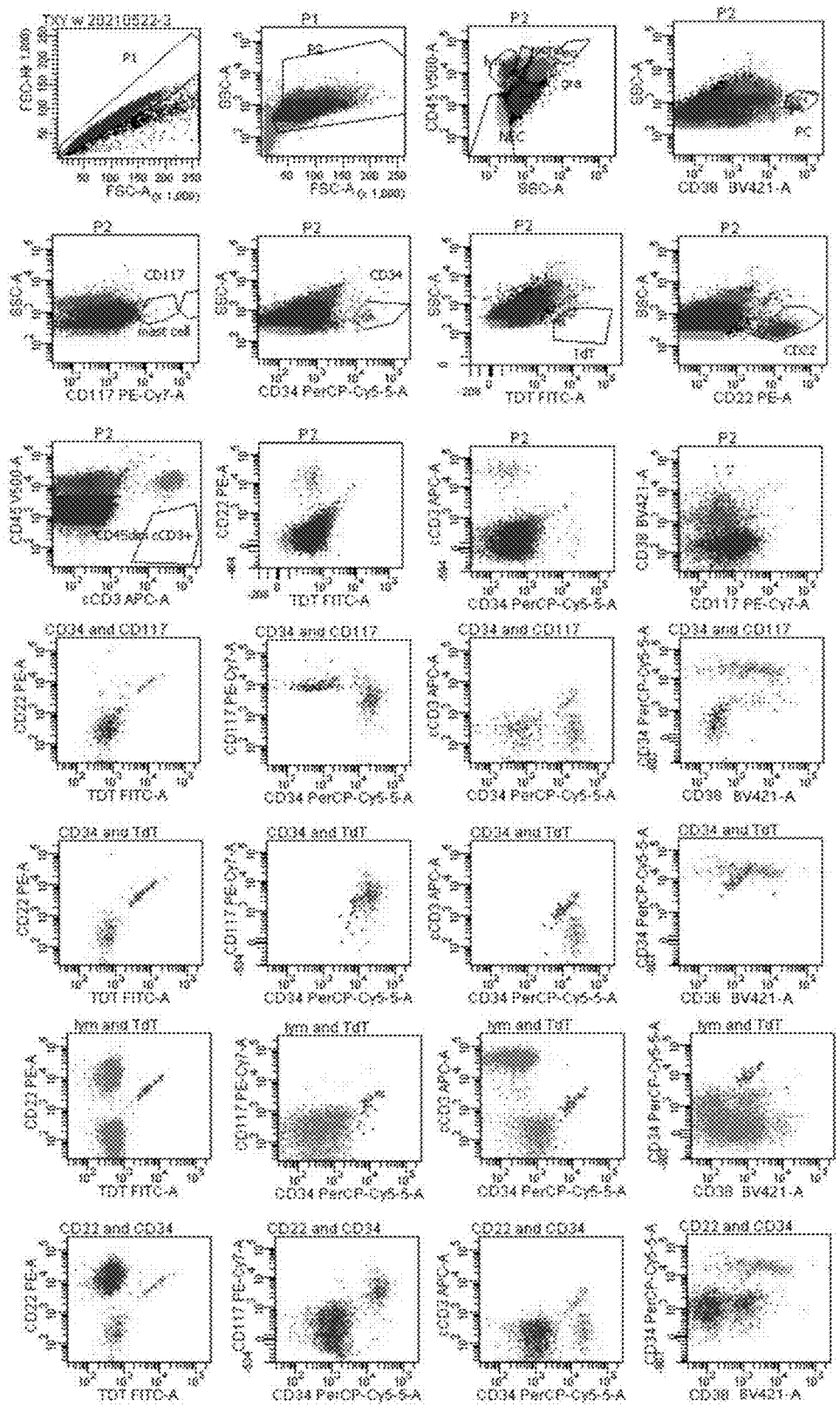

FIG. 18 shows the analysis result of tube III in bone marrow specimen from the patient with metastatic carcinoma (neuroblastoma) and MBL. Set in order: ① Using FSC-A/H to set the single (nonadherent) cell gate P1, and obtain the single cells; ② Using FSC/SSC to set the live cell gate P2, and obtain the single live cells; ③ In the P2 gate, using CD45/SSC to set the blood cell gate, and obtain lymphocytes (lym), granulocytes (Gra), monocytes (mono), nucleated erythrocytes (NEC), and eosinophil (eo) gates, respectively; tumor cells can be seen with CD45 negative/ large SSC, and tumor cell gate (tumor) are set by CD45/ SSC. Maglinant cells are negative for TdT, CD22, cCD3, CD38, CD34, and CD117; ④ Using CD117/SSC to set the myeloid naive cell gate in the P2 gate; ⑤ Using CD117bri/ SSC to set mast cell gate in P2 gate; ⑥ Using CD34+/SSC medium to set blast gate in P2 gate; ⑦ Using TdT/SSC in the P2 gate to set the lymphoblast gate; ⑧ Using CD22/SSC to set the B cell gate in the P2 gate; ⑨ Using CD45/cCD3 in the P2 gate to confirm that there are no cCD3+ cells outside the lymphocyte gate (lym) in CD45/SSC dot plot, there are no CD45dim/cCD3+ cells; ⑩ Simultaneously observing CD34+ and CD117+ cells, finding no obvious abnormality; ⑪ Simultaneously observing the lymphocyte gate (lym) and TdT+ cells, finding no obvious abnormality; ⑫ Simultaneously observing CD22+B cells and CD34bri/ SSC middle myeloblast, finding no obvious abnormality.

Figure 19:
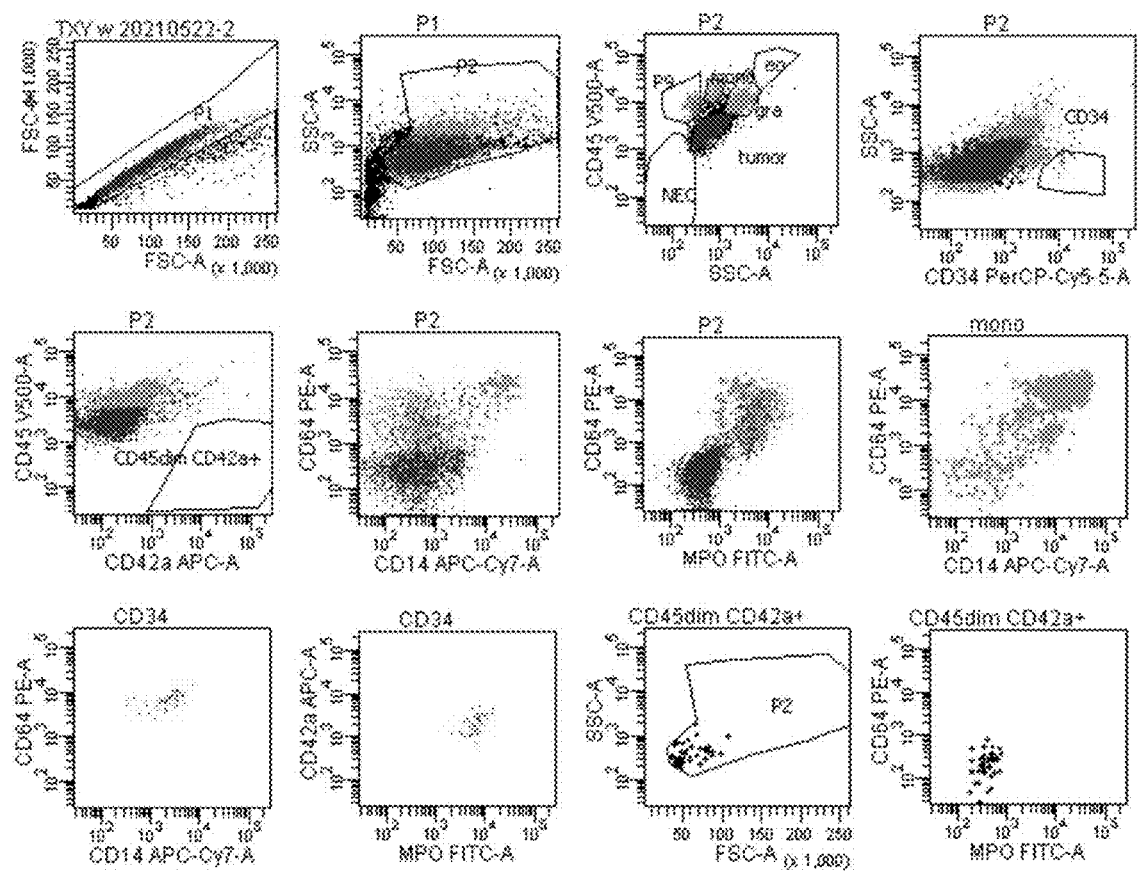

FIG. 19 shows the analysis result of tube IV in bone marrow specimen from the patient with metastatic carcinoma (neuroblastoma) and MBL. Set in order: ① Using FSC-A/H to set the single (nonadherent) cell gate P1, and obtain the single cells; ② Using FSC/SSC to set the live cell gate P2, and obtain the single live cells; ③ In the P2 gate, using CD45/SSC to set the blood cell gate, and obtain lymphocytes (lym), granulocytes (Gra), monocytes (mono), nucleated erythrocytes (NEC), and eosinophil (eo) gates, respectively; tumor cells can be seen with CD45 negative/ large SSC, and tumor cell gate (tumor) are set by CD45/ SSC. Maglinant cells are negative for MPO, CD64, CD14, CD34, and CD42a; ④ Using CD34+/SSC medium to set blast gate in P2 gate; ⑤ Using CD42a/CD45 in the P2 gate to set the platelet/megakaryocyte gate; ⑥ In the P2 gate, using MPO/CD64, CD14/CD64 to correct the granulocyte gate (Gra) and monocyte gate (mono) set by CD45/SSC, determine the granulocyte express moderate intensity of MPO+/CD64+, and determine monocyte are CD14+/ CD64bri; ⑦ Observing cells in the monocyte gate are mainly CD14+/CD64bri cells, and confirm that there are no CD14 negative cells; ⑧ Observing CD34+ cells which do not express MPO, CD64, CD42a, CD14; ⑨ Observing CD45dim/CD42a+ cells, which shows that FSC/SSC is small, and MPO and CD64 are not expressed.

Figure 20:
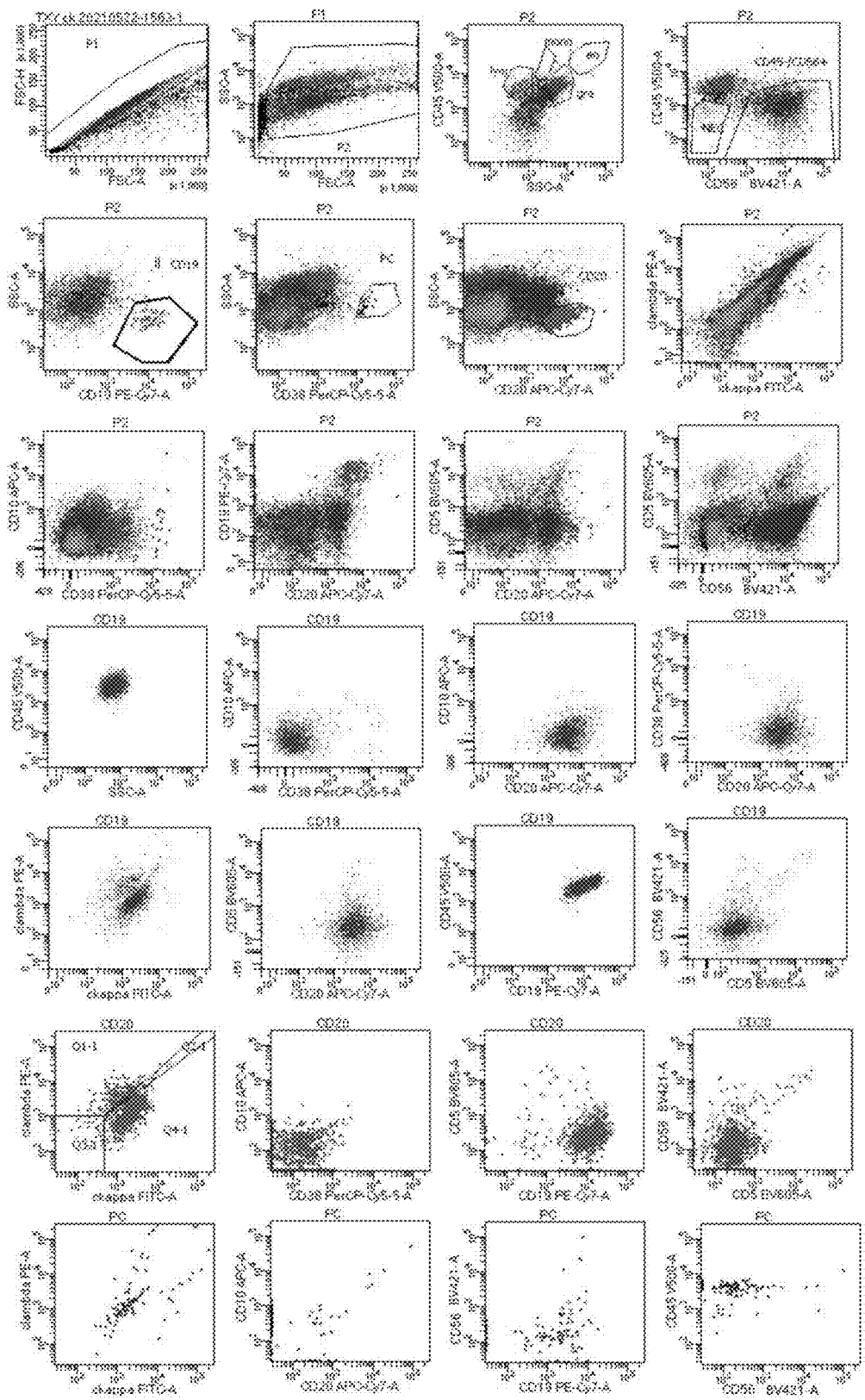

FIG. 20 shows the analysis result of tube V in bone marrow specimen from the patient with metastatic carcinoma (neuroblastoma) and MBL. Set in order: ① Using FSC-A/H to set the single (nonadherent) cell gate P1, and obtain the single cells; ② Using FSC/SSC to set the live cell gate P2, and obtain the single live cells; ③ In the P2 gate, using CD45/SSC to set the blood cell gate, and obtain lymphocytes (lym), granulocytes (Gra), monocytes (mono), nucleated erythrocytes (NEC), and eosinophil (eo) gates, respectively. ④ Using CD19/SSCdim to set the B cell gate in the P2 gate; ⑤ Using CD20/SSCdim to set the mature B cell gate in the P2 gate; ⑥ Using CD38/SSC and/or CD38/CD45 to set the plasma cell gate in the P2 gate; ⑦ Using CD45dim or −/CD56+ to set the gate in the P2 gate, obvious tumor cells can be seen, with negative of cκ, cλ, CD10, CD19, CD20, CD38, and CD5; ⑧ In the CD19+B cell gate, mature B cells express CD20, express monoclonal cκ, but do not express cλ, CD5, CD10, CD38, and CD56. They are monoclonal mature B cells; ⑨ CD20+ mature B cells are monoclonal mature B cells; ⑩ The proportion of CD38bri plasma cells is extremely low, without obvious abnormality.

Clinical verification using the method of this example: Hebei Yanda Lu Daopei Hospital started to use it in September 2020, and by the end of June 2021, had completed 4,995 cases for one-step screening/diagnosis detection of clonal diseases and other diseases, included 655 cases of chronic myeloid neoplasms (MDS, MPN, MDS/MPN), 180 cases of AA, 653 cases of AML, 51 cases of T-ALL/LBL, 267 cases of B-ALL/LBL, 41 cases of MPAL, 149 cases of MM, 293 cases of B-CLPD or MBL, 72 cases of T-CLPD, 36 cases of NK-CLPD, 15 cases of metastatic cancer, 7 cases of FCγ receptor IIIβ gene mutation, 12 cases of hemophagocytic syndrome with immunodeficiency, 22 cases of PNH, and 2 cases of BPDCN. Combined with morphological, genetic, clinical manifestations and other methods simultaneously to validate the diagnosis and follow-up of 1 to 9 months, the sensitivity of detecting tumor cells is $10^{-4}$, and the coverage and specificity are nearly 100%. The false positive rate and false negative rate are both nearly 0. The present disclosure cannot cover only one CD56negative epithelial-derived metastatic cancer in malignant tumor cases, but non-hematopoietic cells are found by CD45/SSC, because the proportion is 10%, which does not cause misdiagnosis. Although after the tumor is determined, some additional antibodies are needed for subtype diagnosis and definite diagnosis, such as for T and NK cell lymphomas, TRBC1, CD57, CD30, ki67, and TCRγδ need to be conducted. If it is TCRγδ lymphoma, TCRVδ1 and TCRVδ1 need to be conducted. If it is CD4+T lymphoma, CD26, CD25 and CD279 need to be conducted. If it is CD4/CD8 double positive, TCL1, CD1a, and CD99 need to be conducted. If it is NK lymphoma, CD57, CD30, ki67, TCRγδ, CD159a, CD159c, CD94, CD161, CD158a, CD158b, and CD158e need to be conducted. If it is B-cell lymphoma, ki67, CD23, CD79b, FMC7, CD103, and CD200 need to be conducted. If it is plasma cell neoplasms, ki67, CD229, and CD138 need to be conducted. If it is metastatic cancer, CD326, cytokeratin, CD81, and CD9 need to be conducted. If it is BPDCN, CD123, CD303, and CD304 need to be conducted. However, compared with the individualized two-step panel of Hebei Yanda Lu Daopei Hospital in the past few years, the proportion of additional antibodies in addition to the charging standard has been reduced by 23% (from 6.5% to 5%). To finish the same number of specimen tests, manpower is saved by 33%; the missed diagnosis rate by the staff worked for 5 to 8 years when they made the decision after the first step has been reduced from the initial 5%-10% to less than 1%. It can be seen that the present disclosure is an important detection and analysis panel for improving the efficiency, saving costs and reducing the missed diagnosis rate for the entire clinical diagnosis field.

What is claimed is:

1. An antibody combination, comprising: a first group of antibodies, a second group of antibodies, a third group of antibodies, a fourth group of antibodies, a fifth group of antibodies, a sixth group of antibodies, a seventh group of antibodies and an eighth group of antibodies, wherein:
the first group of antibodies comprises anti-CD7 antibody, anti-CD117 antibody, anti-CD3 antibody, anti-CD4 antibody, anti-CD5 antibody, anti-CD8 antibody, anti-CD56 antibody, anti-CD45 antibody, and anti-CD2 antibody;
the second group of antibodies comprises anti-CD16 antibody, anti-CD117 antibody, anti-CD34 antibody, anti-CD13 antibody, anti-CD33 antibody, anti-HLA-DR antibody, anti-CD11b antibody, and anti-CD45 antibody;
the third group of antibodies comprises anti-CD22 antibody, anti-CD34 antibody, anti-CD117 antibody, anti-CD38 antibody, and anti-CD45 antibody;
the fourth group of antibodies comprises anti-CD64 antibody, anti-CD34 antibody, anti-CD42a antibody, anti-CD14 antibody, and anti-CD45 antibody;
the fifth group of antibodies comprises group A of antibodies and/or group B of antibodies;
the group A of antibodies comprises anti-CD38 antibody, anti-CD19 antibody, anti-CD10 antibody, anti-CD20 antibody, anti-CD56 antibody, anti-CD45 antibody and anti-CD5 antibody;
the group B of antibodies comprises anti-CD34 antibody, anti-CD19 antibody, anti-CD10 antibody, anti-CD20 antibody, anti-CD38 antibody, and anti-CD45 antibody;
the sixth group of antibodies comprises anti-nuclear TdT antibody and anti-cytoplasmic CD3 antibody;
the seventh group of antibodies comprises anti-cytoplasmic MPO antibody;
the eighth group of antibodies comprises anti-cytoplasmic κ antibody and anti-cytoplasmic λ antibody;
the antibody combination is a set of flow cytometry detection panels for one-step screening and/or diagnosis of clonal diseases, and 5-tube parallel is used for one sample, the first group of antibodies and the second group of antibodies are used for samples in different flow cytometry tubes, the third group of antibodies and the sixth group of antibodies are used for samples in a same flow cytometry tube, the fourth group of antibodies and the seventh group of antibodies are used for samples in the same flow cytometry tube, and the fifth group of antibodies and the eighth group of antibodies are used for samples in the same flow cytometry tube.

2. The antibody combination of claim 1, wherein the anti-cytoplasmic κ antibody and the anti-cytoplasmic λ antibody are polyclonal antibodies, and other antibodies are monoclonal antibodies.

3. The antibody combination of claim 1, wherein each antibody is a fluorescence-labeled antibody;
in the first group of antibodies, anti-CD7 antibody, anti-CD117 antibody, anti-CD3 antibody, anti-CD4 antibody, anti-CD5 antibody, anti-CD8 antibody, anti-CD56 antibody, anti-CD45 antibody and anti-CD2 antibody are labeled with fluorescence in an order of FITC, PE, PerCP-Cy5.5, PE-Cy7, APC, APC-Cy7, BV421, V500, and BV605;
in the second group of antibodies, anti-CD16 antibody, anti-CD117 antibody, anti-CD34 antibody, anti-CD13 antibody, anti-CD33 antibody, anti-HLA-DR antibody, anti-CD11b antibody, and anti-CD45 antibody are labeled with fluorescence in the order of FITC, PE, PerCP-Cy5.5, PE-Cy7, APC, APC-Cy7, BV421, and V500;
in the third group of antibodies, anti-CD22, anti-CD34, anti-CD117, anti-CD38, and anti-CD45 antibodies are labeled with fluorescence in the order of PE, PerCP-Cy5.5, PE-Cy7, BV421, and V500;
in the fourth group of antibodies, anti-CD64 antibody, anti-CD34 antibody, anti-CD42a antibody, anti-CD14 antibody, and anti-CD45 antibody are labeled with fluorescence in an order of PE, PerCP-Cy5.5, APC, APC-Cy7, and V500;
in the fifth group of antibodies, anti-CD38 antibody, anti-CD19 antibody, anti-CD10 antibody, anti-CD20 antibody, anti-CD56 antibody, anti-CD45 antibody and anti-CD5 antibody in the group A of antibodies are labeled with fluorescence in an order of PerCP-Cy5.5, PE-Cy7, APC, APC-Cy7, BV421, V500, and BV605; anti-CD34 antibody, anti-CD19 antibody, anti-CD10 antibody, anti-CD20 antibody, anti-CD38 antibody, and anti-CD45 antibody in the group B of antibodies are labeled with fluorescence in an order of PerCP-Cy5.5, PE-Cy7, APC, APC-Cy7, BV421, and V500;
in the sixth group of antibodies, anti-nuclear TdT antibody and anti-cytoplasmic CD3 antibody are labeled with fluorescence in an order of FITC and APC;
in the seventh group of antibodies, anti-cytoplasmic MPO antibody is labeled with fluorescence FITC; and
in the eighth group of antibodies, anti-cytoplasmic κ antibody and anti-cytoplasmic λ antibody are labeled with fluorescence in the order of FITC and PE.

4. The antibody combination of claim 1, wherein:
the first group of antibodies is a mixture of anti-CD7 antibody, anti-CD117 antibody, anti-CD3 antibody, anti-CD4 antibody, anti-CD5 antibody, anti-CD8 antibody, anti-CD56 antibody, anti-CD45 antibody, and anti-CD2 antibody in a volume ratio of 5:5:5:3:2:3:3:3:3;
the second group of antibodies is a mixture of anti-CD16 antibody, anti-CD117 antibody, anti-CD34 antibody, anti-CD13 antibody, anti-CD33 antibody, anti-HLA-DR antibody, anti-CD11b antibody, and anti-CD45 antibody in a volume ratio of 5:5:5:3:2:3:3:3;
the third group of antibodies is a mixture of anti-CD22 antibody, anti-CD34 antibody, anti-CD117 antibody, anti-CD38 antibody, and anti-CD45 antibody in a volume ratio of 5:5:3:3:3;
the fourth group of antibodies is a mixture of anti-CD64 antibody, anti-CD34 antibody, anti-CD42a antibody, anti-CD14 antibody, and anti-CD45 antibody in a volume ratio of 5:5:2:3:3;
in the fifth group of antibodies, the group A of antibodies is a mixture of anti-CD38 antibody, anti-CD19 antibody, anti-CD10 antibody, anti-CD20 antibody, anti-CD56 antibody, anti-CD45 antibody and anti-CD5 antibody in a volume ratio of 5:3:2:3:3:3:3; the group B of antibodies is a mixture of anti-CD34 antibody, anti-CD19 antibody, anti-CD10 antibody, anti-CD20 antibody, anti-CD38 antibody, and anti-CD45 antibody in a volume ratio of 5:3:2:3:3:3;
the sixth group of antibodies is a mixture of anti-nuclear TdT antibody and anti-cytoplasmic CD3 antibody in a volume ratio of 1:1; and
the eighth group of antibodies is a mixture of anti-cytoplasmic κ antibody and anti-cytoplasmic λ antibody in a volume ratio of 1:1.

5. A kit, comprising a first container, a second container, a third container, a fourth container, a fifth container, a sixth container, a seventh container, and an eighth container, wherein each container respectively contains the first group of antibodies, the second group of antibodies, the third group of antibodies, the fourth group of antibodies, the fifth group of antibodies, the sixth group of antibodies, the seventh group of antibodies, and the eighth group of antibodies of the antibody combination of claim 1.

6. The kit of claim 5, wherein the kit further comprises one or more accessories used in flow cytometry: lysing agent, permeabilization reagent, buffer, and tubes.

7. A method of applying the antibody combination of claim 1 in a preparation of a sample on a flow cytometry for one-step screening and/or diagnosis of clonal diseases.

8. The method of claim 7, wherein preparing the sample on the flow cytometer for one-step screening and/or diagnosing clonal diseases comprises the following steps:
step 1: adding samples to be tested to five flow cytometry tubes of tube I, tube II, tube III, tube IV, and tube V, respectively, making them into the single nonadherent cell suspension, and ensuring the number of cells is 1×106 to 1×107 cells per tube;
step 2: adding phosphate buffer to tube IV and tube V, mixing well, incubating at 37° C., and removing supernatant by centrifugation;
step 3: adding the first group of antibodies in the antibody combination of claim 1 to the tube I obtained in step 1, adding the second group of antibodies in the antibody combination of claim 1 to the tube II obtained in step 1, adding the third group of antibodies in the antibody combination of claim 1 to the tube III obtained in step 1, adding the fourth group of antibodies in the antibody combination of claim 1 to the tube IV obtained in step 2, adding the group A or group B of antibodies in the fifth group of antibodies in the antibody combination of claim 1 to the tube V obtained in step 2, and incubating each flow tube in dark at room temperature;
step 4: adding permeabilization reagent α to the tube III, the tube IV, and the tube V after incubation in step 3, and continuing to incubate in dark at room temperature;
step 5: adding 1×lysing agent to the tube I and the tube II after incubation in step 3, adding 1×lysing agent to the tube III, the tube IV, and the tube V after incubation in step 4, and continuing to incubate in dark at room temperature;
step 6: centrifuging each flow tube after incubated in step 5 and removing the supernatant;
step 7: adding permeabilization reagent β and the sixth group of antibodies in the antibody combination of claim 1 to the tube III after removing the supernatant in step 6, adding the permeabilization reagent β and the seventh group of antibodies in the antibody combination of claim 1 to the tube IV after removing the supernatant in step 6, adding the permeabilization reagent β and the eighth group of antibodies in the antibody combination of claim 1 to the tube V after removing the supernatant in step 6, and incubating in dark at room temperature; and
step 8: adding PBS buffer to the tube I and the tube II after removing the supernatant in step 6, and adding PBS buffer to the tube III, the tube IV, and the tube V after incubation in step 7, removing the supernatant after centrifugation, resuspending cells in PBS buffer to obtain the sample on the flow cytometer.

9. A device for one-step screening and/or diagnosis of clonal diseases, comprising a detection unit and an analysis unit, wherein:
the detection unit comprises a set of reagents to detect different cells from an individual sample by flow cytometry, and obtain the data;
the reagents are the antibody combinations of claim 1; and
the analysis unit is protocols to analyze data obtained by the detection unit.

10. A method of detecting different cells from an individual sample by flow cytometry comprises, comprising:
using the antibody combination of claim 1 to process samples waiting for examination, prepare the cells for being acquired by flow cytometer;
performing flow cytometry detection;
when performing flow cytometry detection, gating a tube I according to the following methods: setting a single nonadherent cell gate P1 and a live cell gate P2 to obtain single live cells; using CD45/SSC to set each blood cell gate in the P2 gate; in the P2 gate, gating with CD117/SSC to detect immature myeloid, and gating with CD117 strong expression/SSC to detect mast cells, setting lymphocyte gate with CD45/SSC to observe expression patterns formed by CD2/CD7, CD4/CD3, CD4/CD8, and CD3/CD5 in it to detect T cells, CD3/CD56, CD4/CD8, CD2/CD7, and CD3/CD5 in it to detect NK cells, gating with SSC medium/CD4dim to detect dendritic cells and monocytes, gating with CD45dim or –/CD56+ to detect metastatic carcinoma, plasma cell neoplasm, blastic plasmacytoid dendritic cell neoplasm, acute leukemia, or chronic lymphoproliferative disorders;
when performing flow cytometry detection, gating a tube II according to the following methods: setting the single cell gate P1 and the live cell gate P2 to obtain the single live cells; using CD45/SSC to set each blood cell gate in the P2 gate; in the P2 gate, gating with CD117/SSC to detect immature myeloid, gating with CD117 strong expression/SSC to detect mast cells, and gating with CD34/SSC and HLA-DR/CD45 to detect hematopoietic stem cells, lymphoblasts, and myeloblasts, gating with CD45/SSC to detect granulocytes in differentiation stage, and gating with CD45/SSC and correction with HLA-DR/CD45 and CD11b/HLA-DR to detect monocytes;
when performing flow cytometry detection, gating a tube III according to the following methods: setting the single cell gate P1 and the live cell gate P2 in sequence, and in the P2 gate, using CD45/SSC to set each blood cell gate; in the P2 gate, gating with CD117/SSC to detect immature myeloid, gating with CD117 strong expression/SSC to detect mast cells; gating with CD34/SSC to detect hematopoietic stem cells, lymphoblasts, and myeloblasts; gating with TdT/SSC to detect lymphoblasts; gating with CD22/SSC to detect B cells; using CD45/cCD3 to modify the lymphocyte gate set by CD45/SSC to detect T cells;
when performing flow cytometry detection, gating a tube IV according to the following methods: setting the single cell gate P1 and the live cell gate P2 in sequence, and in the P2 gate, using CD45/SSC to set each blood cell gate, gating with CD42a/CD45 to observe platelets/megakaryocytes, and gating with CD34/SSC to observe hematopoietic stem cells, lymphoblasts, and myeloblasts;

when performing flow cytometry detection, gating a tube V according to the following methods:

the tube V stained with antibodies of group A: setting the single cell gate P1 and the live cell gate P2 to obtain the single live cells; using CD45/SSC to set each blood cell gate in the P2 gate; in the P2 gate, gating with CD19/SSC to detect B cells; gating with CD20/SSC to detect mature B cells; gating with CD38bri/SSC and/or CD38bri/CD45dim to detect plasma cells; gating with CD45dim or −/CD56+ to detect metastatic carcinomas, plasma cell neoplasm, blastic plasmacytoid dendritic cell neoplasm, and cells associated with acute leukemia and chronic lymphoproliferative disorders; or the tube V stained with antibodies of group B: setting the single cell gate P1 and the live cell gate P2 to obtain the single live cells; using CD45/SSC to set each blood cell gate in the P2 gate; in the P2 gate, gating with CD19/SSC to detect B cells; gating with CD20/SSC to detect mature B cells; gating with CD38bri/SSC and/or CD38bri/CD45dim to detect plasma cells; gating with CD34/SSC to detect hematopoietic stem cells, lymphoblasts, and myeloblasts.

* * * * *